United States Patent
Ho et al.

(10) Patent No.: US 12,057,585 B2
(45) Date of Patent: Aug. 6, 2024

(54) CONDUCTIVE COMPOSITION FOR SECONDARY BATTERY

(71) Applicant: GRST International Limited, Hong Kong (CN)

(72) Inventors: Kam Piu Ho, Hong Kong (CN); Yingkai Jiang, Shenzhen (CN); Xinying Sun, Hong Kong (HK)

(73) Assignee: GRST International Limited, Hong Kong (CN)

( * ) Notice: Subject to any disclaimer, the term of this patent is extended or adjusted under 35 U.S.C. 154(b) by 128 days.

(21) Appl. No.: 17/798,885

(22) PCT Filed: Jun. 2, 2021

(86) PCT No.: PCT/CN2021/097996
§ 371 (c)(1),
(2) Date: Aug. 10, 2022

(87) PCT Pub. No.: WO2021/254155
PCT Pub. Date: Dec. 23, 2021

(65) Prior Publication Data
US 2023/0343963 A1    Oct. 26, 2023

(30) Foreign Application Priority Data

Jun. 17, 2020   (WO) ................ PCT/CN2020/096672

(51) Int. Cl.
*H01M 4/62* (2006.01)
(52) U.S. Cl.
CPC ........... *H01M 4/625* (2013.01); *H01M 4/622* (2013.01)

(58) Field of Classification Search
CPC ........ H01M 4/625; H01M 4/622; H01M 4/62; H01M 4/624; Y02E 60/10; C08F 220/06; C08F 220/44; C08F 220/56; C08L 33/00
See application file for complete search history.

(56) References Cited

U.S. PATENT DOCUMENTS

| 2014/0038047 A1* | 2/2014 | Chung | H01M 4/622 |
| | | | 252/182.1 |
| 2022/0013785 A1* | 1/2022 | Nakano | C08F 20/28 |
| 2022/0367875 A1* | 11/2022 | Motoki | H01M 4/622 |

FOREIGN PATENT DOCUMENTS

| CN | 107834019 A | * | 3/2018 | ........ H01M 10/0525 |
| CN | 107834019 A | | 3/2018 | |

(Continued)

OTHER PUBLICATIONS

International Search Report of PCT Patent Application No. PCT/CN2021/097996 issued on Aug. 27, 2021.

*Primary Examiner* — Mark Kopec
*Assistant Examiner* — Jaison P Thomas

(57) ABSTRACT

A conductive composition for a secondary battery, a slurry comprising the same, an electrode comprising the same and a method of preparing the conductive composition are provided. The conductive composition comprises a polymeric material, a carbon nanomaterial and an anionic stabilizing agent. The polymeric material comprises a copolymer comprising a structural unit derived from an acid group-containing monomer and a structural unit derived from a polar group-containing monomer. The conductive composition exhibits an improved stability and dispersibility in water. In addition, battery cells comprising a cathode prepared using the conductive composition disclosed herein exhibit impressive electrochemical performances.

20 Claims, 4 Drawing Sheets

(56) References Cited

FOREIGN PATENT DOCUMENTS

| | | | | |
|---|---|---|---|---|
| CN | 108183223 A | | 6/2018 | |
| CN | 110387162 A | | 10/2019 | |
| CN | 110885650 A | | 3/2020 | |
| CN | 110970620 A | | 4/2020 | |
| CN | 110885650 B | * | 6/2022 | ............ C08F 220/56 |
| JP | 6590034 B1 | * | 10/2019 | ............. B01J 23/78 |
| KR | 20190088330 A | | 7/2019 | |
| WO | 2009098986 A1 | | 8/2009 | |
| WO | WO-2020137523 A1 | * | 7/2020 | ............. C08F 20/06 |

* cited by examiner (A)

(B)

(A)

(B)

(A)

(B)

(A)            (B)

CONDUCTIVE COMPOSITION FOR SECONDARY BATTERY

CROSS-REFERENCE TO RELATED APPLICATIONS

This is a U.S. national stage application of the International Patent Application No. PCT/CN2021/097996, filed Jun. 2, 2021, which claims the benefit under 35 U.S.C. § 365(c) of International Patent Application No. PCT/CN2020/096672, filed Jun. 17, 2020, the content of which is incorporated herein by reference in its entirety.

FIELD OF THE INVENTION

The present invention relates to the field of batteries. In particular, this invention relates to a conductive composition for lithium-ion batteries, a slurry and an electrode comprising the same and a method for preparing the conductive composition.

BACKGROUND OF THE INVENTION

Over the past decades, lithium-ion batteries (LIBs) have become to be widely utilized in various applications, especially consumer electronics, because of their outstanding energy density, long cycle life and high discharging capability. Due to rapid market development of electric vehicles (EV) and grid energy storage, high-performance, low-cost LIBs are currently offering one of the most promising options for large-scale energy storage devices.

Generally, lithium-ion battery electrodes are manufactured by casting an organic-based slurry onto a metallic current collector. The slurry contains electrode active material, conductive carbon, and binder in an organic solvent. The binder, most commonly polyvinylidene fluoride (PVDF), is dissolved in the solvent and provides a good electrochemical stability and high adhesion to the electrode materials and current collectors. However, PVDF can only dissolve in some specific organic solvents such as N-methyl-2-pyrrolidone (NMP) which is flammable and toxic and hence requires specific handling.

An NMP recovery system must be in place during the drying process to recover NMP vapors. This will generate significant costs in the manufacturing process since it requires a large capital investment. The use of less expensive and more environmentally-friendly solvents, such as aqueous solvents, most commonly water, is preferred in the present invention since it can reduce the large capital cost of the recovery system. The attempts to replace the organic NMP-based coating process with a water-based coating process have been successful for the negative electrode. A typical water-based slurry for anode coating comprises carboxymethyl cellulose (CMC) and styrene-butadiene rubber (SBR). Within the battery, cathodes are at high voltage. Most rubbers including SBR are only stable at the low voltage of the anode and will decompose at high voltage. Therefore, contrary to anodes, water-based coating for cathodes is much of a challenge.

Carbon-based materials such as amorphous carbon, graphene, carbon black, carbon nanotubes, carbon nanofibers and fullerene have been widely used as conductive agents in the field due to their excellent electrical properties and thermal conductivity. Particularly, carbon nanotubes, are tube-type carbon with very high aspect ratios, and are expected to be the emerging conductive agent in various fields. The carbon nanotubes consist of carbon network with honeycomb arrangements of the carbon atoms in the graphite sheets, with interlocking hexagons of six carbons, bonded to have a tubular structure. The exceptional mechanical and electrical properties of the carbon nanotubes stem from their quasi-one-dimensional structure and the graphite-like arrangement of the carbon atoms. In addition, their high thermal conductivity promotes heat dissipation during battery charge/discharge cycle, improving the performance of battery at high and low temperatures, and thus extending the service life of battery.

However, despite such usefulness of carbon nanotubes, the above-described performance cannot be fully exhibited as other components, such as an aqueous binder or polymeric material, is/are incorporated to the mixture. The presence of the polymeric material is likely to pose an additional challenge to the stability of the system and dispersion of carbon nanotubes due to properties of various functional groups present in the polymeric material.

In view of such a problem, methods of dispersing carbon nanotubes using various types of solvents have been proposed.

KR Patent Application Publication No. 20190088330 A discloses manufacturing methods for a carbon nanotube-electrode active material composite powder and an electrode comprising the same which aim to improve the electrical conductivity and battery performance. In attempt to achieve uniform carbon nanotube dispersion, carbon nanotube is dispersed in N-methyl-2-pyrrolidone (NMP) solvent and stirred through a stirrer to prevent agglomeration between carbon nanotubes. Polymeric binder, for example, polyvinylidene fluoride (PVDF) and the like may be further incorporated in the preparation of the electrode slurry. However, the application of this method is limited by its slather use of expensive and toxic organic solvent NMP. The use of aqueous solutions instead of organic solvents is preferred for significantly reducing the manufacturing cost and environmental impacts and therefore water-based processing has been adopted in the present invention. In addition, the above method does not teach how to stabilize carbon nanotubes in an aqueous system.

Specifically, for example, following the incorporation of carbon nanotubes with an aqueous polymeric material in the making of a cathode slurry in the present invention, instability arises within the system and agglomeration of carbon nanotubes occurs. With respect to the stability between carbon nanotubes and polymeric material as well as dispersibility of the carbon nanotubes due to the constituents of the aqueous polymeric material, and hence the influence on the performance of the batteries comprising the conductive composition, no research whatsoever has been carried out to date.

In view of the above, the present inventors have intensively studied on the subject and have found that a carbon nanotube-based conductive composition containing an anionic stabilizing agent and polymeric material containing specific ranges of functional groups in the copolymer exhibits exceptional stability and thus improving carbon nanotubes dispersibility with an enhanced electrical conductivity (and reduced interface resistance). Furthermore, it has been found that if a cathode slurry containing the conductive composition disclosed herein is used, the secondary battery produced has an improved performance.

SUMMARY OF THE INVENTION

The aforementioned needs are met by various aspects and embodiments disclosed herein. In one aspect, provided herein is a conductive composition for a secondary battery, comprising a polymeric material, a carbon nanomaterial and an anionic stabilizing agent.

In some embodiments, the polymeric material comprises a copolymer comprising a structural unit derived from an acid group-containing monomer and a structural unit derived from a polar group-containing monomer. In certain embodiments, the polar group-containing monomer is selected from the group consisting of a nitrile group-containing monomer, an amide group-containing monomer, a hydroxyl group-containing monomer, an ester group-containing monomer, an epoxy group-containing monomer, a fluorine-containing monomer, an amine group-containing monomer, an ether group-containing monomer, a carbonyl group-containing monomer and combinations thereof.

In another aspect, provided herein is a slurry for a secondary battery, comprising an electrode active material and the conductive composition. In some embodiments, the slurry further comprises a conductive agent.

In further aspect, provided herein is an electrode for a secondary battery, comprising an electrode active material and the conductive composition.

In further aspect, provided herein is a method of preparing a conductive composition for a secondary battery, comprising the steps of:
1) dispersing a carbon nanomaterial in an aqueous solvent to form a first suspension;
2) dispersing an anionic stabilizing agent in the first suspension to form a second suspension;
3) dispersing a polymeric material in the second suspension to form a conductive composition;
wherein the polymeric material comprises a copolymer comprising a structural unit derived from an acid group-containing monomer and a structural unit derived from a polar group-containing monomer.

DETAILED DESCRIPTION OF THE INVENTION

Figure 1:
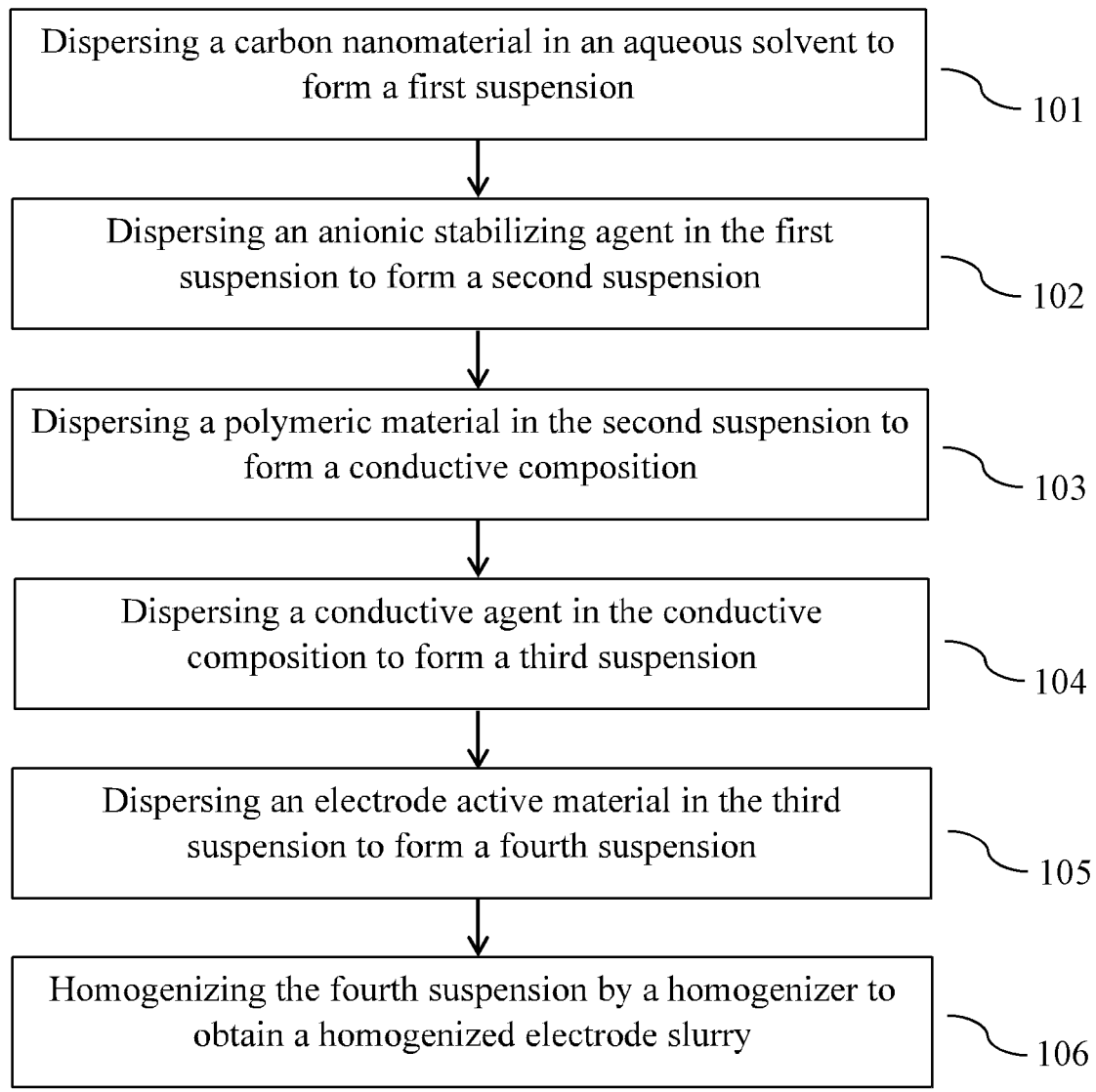
FIG. 1 is a flow chart of an embodiment illustrating the steps for preparing an aqueous electrode slurry comprising the conductive composition as disclosed herein.

The term "electrode" refers to a "cathode" or an "anode."

The term "positive electrode" is used interchangeably with cathode. Likewise, the term "negative electrode" is used interchangeably with anode.

The term "polymeric material", "binder", "polymeric binder" or "binder material" refers to a chemical compound, mixture of compounds, or polymer that is used to hold an electrode material and/or a conductive agent in place and adhere them onto a metal part or a current collector to form an electrode. In some embodiments, the metal part is conductive or non-conductive. In some embodiments, the electrode does not comprise any conductive agent. In some embodiments, the polymeric material forms a colloid, solution or dispersion in an aqueous solvent such as water.

The term "polymeric composition" refers to a colloid, dispersion or solution comprising the polymeric material and an aqueous solvent. In some embodiments, the aqueous solvent is water.

The term "conductive agent" refers to a material that has good electrical conductivity. Therefore, the conductive agent is often mixed with an electrode active material at the time of forming an electrode to improve electrical conductivity of the electrode. In some embodiments, the conductive agent is chemically active. In certain embodiments, the conductive agent is chemically inactive.

The term "carbon nanomaterial" refers to carbon-based material of which a single unit has a diameter of from about 1 to about 100 nm in size. In some embodiments, the carbon nanomaterial consists of carbon atoms arranged in a hexagonal lattice. Some non-limiting examples of carbon nanomaterial include carbon nanotube, graphene, carbon nanofiber and the like.

The term "carbon nanotube" refers to a hollow cylindrical carbon structure consisting of a hexagonal lattice of carbon atoms with diameters typically measured in nanometers.

The term "polymer" refers to a compound prepared by polymerizing monomers, whether of the same or a different type. The generic term "polymer" embraces the terms "homopolymer" as well as "copolymer".

The term "homopolymer" refers to a polymer prepared by the polymerization of the same type of monomer.

The term "copolymer" refers to a polymer prepared by the polymerization of two or more different types of monomers.

The term "unsaturated" as used herein, refers to a moiety having one or more units of unsaturation.

The term "alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, $(C_1-C_8)$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1- pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

The term "alkoxy" refers to an alkyl group, as previously defined, attached to the principal carbon chain through an oxygen atom. Some non-limiting examples of the alkoxy group include methoxy, ethoxy, propoxy, butoxy, and the like. And the alkoxy defined above may be substituted or unsubstituted, wherein the substituent may be, but is not limited to, deuterium, hydroxy, amino, halo, cyano, alkoxy, alkyl, alkenyl, alkynyl, mercapto, nitro, and the like.

The term "cycloalkyl" or "cycloalkyl group" refers to a saturated or unsaturated cyclic non-aromatic hydrocarbon radical having a single ring or multiple condensed rings. Examples of cycloalkyl groups include, but are not limited to, ($C_3$-$C_7$)cycloalkyl groups, such as cyclopropyl, cyclobutyl, cyclopentyl, cyclohexyl, and cycloheptyl, and saturated cyclic and bicyclic terpenes and ($C_3$-$C_7$)cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

The term "alkenyl" refers to an unsaturated straight chain, branched chain, or cyclic hydrocarbon radical that contains one or more carbon-carbon double bonds. Examples of alkenyl groups include, but are not limited to, ethenyl, 1-propenyl, and 2-propenyl, which may optionally be substituted on one or more of the carbon atoms of the radical.

The term "aryl" or "aryl group" refers to an organic radical derived from a monocyclic or polycyclic aromatic hydrocarbon by removing a hydrogen atom. Non-limiting examples of the aryl group include phenyl, naphthyl, benzyl, tolanyl, sexiphenyl, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

The term "aliphatic" refers to a $C_1$ to $C_{30}$ alkyl group, a $C_2$ to $C_{30}$ alkenyl group, a $C_2$ to $C_{30}$ alkynyl group, a $C_1$ to $C_{30}$ alkylene group, a $C_2$ to $C_{30}$ alkenylene group, or a $C_2$ to $C_{30}$ alkynylene group. In some embodiments, the alkyl group contains at least 2, 3, 4, 5, 6, 7, or 8 carbon atoms.

The term "aromatic" refers to groups comprising aromatic hydrocarbon rings, optionally including heteroatoms or substituents. Examples of such groups include, but are not limited to, phenyl, tolyl, biphenyl, o-terphenyl, m-terphenyl, p-terphenyl, naphthyl, anthryl, phenanthryl, pyrenyl, triphenylenyl, and derivatives thereof.

The term "substituted" as used to describe a compound or chemical moiety refers to that at least one hydrogen atom of that compound or chemical moiety is replaced with a second chemical moiety. Examples of substituents include, but are not limited to, halogen; alkyl; heteroalkyl; alkenyl; alkynyl; aryl; heteroaryl; hydroxyl; alkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; —$CO_2CH_3$; —$CONH_2$; —$OCH_2CONH_2$; —$NH_2$; —$SO_2NH_2$; —$OCHF_2$; —$CF_3$; —$OCF_3$; —NH(alkyl); —N(alkyl)$_2$; —NH(aryl); —N(alkyl)(aryl); —N(aryl)$_2$; —CHO; —CO(alkyl); —CO(aryl); —$CO_2$(alkyl); and —$CO_2$(aryl); and such moieties can also be optionally substituted by a fused-ring structure or bridge, for example —$OCH_2O$—. These substituents can optionally be further substituted with a substituent selected from such groups. All chemical groups disclosed herein can be substituted, unless it is specified otherwise.

The term "halogen" or "halo" refers to F, Cl, Br or I.

The term "olefin" refers to an unsaturated hydrocarbon-based compound with at least one carbon-carbon double bond.

The term "stabilizing agent" refers to an agent in assisting the stabilization and dispersion of carbon nanomaterials or/and polymeric material in an aqueous solvent.

The term "agglomerate" refers to an entangled and/or clustered mass of carbon nanomaterials or carbon nanotubes.

The term "monomeric unit" refers to the constitutional unit contributed by a single monomer to the structure of a polymeric material.

The term "structural unit" refers to the total monomeric units contributed by the same monomer type in a polymeric material.

The term "acid salt group" refers to a functional group derived from an acid functional group, wherein the proton of the acid functional group is replaced by another cation. In some embodiments, the proton of the acid is replaced with a metal cation. In some embodiments, the proton of the acid is replaced with an ammonium ion. In some embodiments, acid salt group is formed when an acid reacts with water.

The term "homogenizer" refers to an equipment that can be used for homogenization of materials. The term "homogenization" refers to a process of distributing the materials uniformly throughout a fluid. Any conventional homogenizers can be used for the method disclosed herein. Some non-limiting examples of the homogenizer include stirring mixers, planetary mixers, blenders and ultrasonicators.

The term "planetary mixer" refers to an equipment that can be used to mix or stir different materials for producing a homogeneous mixture, which consists of blades conducting a planetary motion within a vessel. In some embodiments, the planetary mixer comprises at least one planetary blade and at least one high-speed dispersion blade. The planetary and the high-speed dispersion blades rotate on their own axes and also rotate continuously around the vessel. The rotation speed can be expressed in unit of rotations per minute (rpm) which refers to the number of rotations that a rotating body completes in one minute.

The term "applying" refers to an act of laying or spreading a substance on a surface.

The term "current collector" refers to any conductive substrate, which is in contact with an electrode layer and is capable of conducting an electrical current flowing to electrodes during discharging or charging a secondary battery. Some non-limiting examples of the current collector include a single conductive metal layer or substrate and a single conductive metal layer or substrate with an overlying conductive coating layer, such as a carbon black-based coating layer. The conductive metal layer or substrate may be in the form of a foil or a porous body having a three-dimensional network structure, and may be a polymeric or metallic material or a metalized polymer. In some embodiments, the three-dimensional porous current collector is covered with a conformal carbon layer.

The term "electrode layer" refers to a layer, which is in contact with a current collector, that comprises an electrochemically active material. In some embodiments, the electrode layer is made by applying a coating on to the current collector. In some embodiments, the electrode layer is located on one side or both sides of the current collector. In other embodiments, the three-dimensional porous current collector is coated conformally with an electrode layer.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "particle size $D_{50}$" refers to a volume-based accumulative 50% size ($D_{50}$), which is a particle size at a point of 50% on an accumulative curve (i.e., a diameter of a particle in the 50th percentile (median) of the volumes of particles) when the accumulative curve is drawn so that a particle size distribution is obtained on the volume basis and the whole volume is 100%. Further, with respect to the cathode active material of the present invention, the particle size D50 means a volume-averaged particle size of secondary particles which can be formed by mutual agglomeration of primary particles, and in a case where the particles are composed of the primary particles only, it means a volume-averaged particle size of the primary particles.

The term "solid content" refers to the amount of non-volatile material remaining after evaporation.

The term "peeling strength" refers to the amount of force required to separate a current collector and an electrode active material coating that are bonded to each other. It is a measure of the binding strength between such two materials and is usually expressed in N/cm.

The term "adhesive strength" refers to the amount of force required to separate a current collector and a polymeric material coating that are bonded to each other. It is a measure of the binding strength between such two materials and is usually expressed in N/cm.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3,600 coulombs of electrical charge. Similarly, the term "milliampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight, usually expressed in Ah/kg or mAh/g.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 0 percent to 100 percent. Moreover, any numerical range defined by two R numbers as defined in the above is also specifically disclosed.

Conductive agents are commonly employed in cathode formulations to enhance the electrical conductivity of cathode. Carbon-based materials, particularly carbon nanotubes, have been widely used as conductive agents due to their attractive mechanical properties, namely tensile strength and elastic modulus, still remarkable flexibility, excellent thermal and electrical conductivities, low percolation threshold (loading weight at which a sharp drop in resistivity occurs), small size and high aspect ratios (length to diameter ratio). Addition of carbon nanotubes in cathode observably improves the electrochemical performance of electrode.

However, it has come to our attention that there has been an enhanced difficulty in dispersion of carbon nanotubes in aqueous medium following the incorporation of polymeric materials of the present invention to the mix, with or without mechanical means. Normally, the uniform dispersion of the carbon nanotubes can still be achieved with the introduction of conventional type of binder material e.g. polyacrylic acid (PAA). The heightened instability within the aqueous system disclosed herein stem from the properties of various monomers that assists in the construction of the polymeric material.

Following the application of a polymeric material in the formation of a conductive composition leads to the aggregation of the initially well-dispersed carbon nanotubes. Ionic group (e.g. an acid group) is a crucial functional group present in the aqueous polymeric material that is highly hydrophilic and has a tendency to lose a proton to form a negatively charged acid salt ion, such as a carboxylate ion (COO⁻). In view of the properties of the constituent functional groups in the polymeric material, it was speculated by the present inventors that, with a sufficient amount of acid groups in the polymeric material, introduction of an anionic stabilizing agent to the carbon nanotubes surface could provide an electrostatic repulsion force between the acid group of the aqueous polymeric material and the anionic stabilizing agent within the carbon nanotubes complex. This helps minimize the disruption initiated by the aqueous polymeric material and consequently restores stability within the conductive composition and gives rise to a uniform dispersion of carbon nanotubes.

Having extensively studied on the subject, the behavior between the constituent functional groups in the polymeric material and the anionic stabilizing agent has been validated by the present inventor. Since stabilizing agents that exhibit other properties (e.g. cationic or non-ionic in nature) do not contain negatively charged ions, they are not capable of providing the same repulsive effect as anionic stabilizing agents, and thus if any of cationic or non-ionic stabilizing agents were to be incorporated in the conductive composition, instability within the system would remain, and so is the aggregation of carbon nanotubes.

Evidently, an anionic stabilizing agent is primarily used to provide stability between polymeric material and carbon nanotubes within the aqueous system along with preventing agglomeration of carbon nanotubes. The resultant distribution of polymeric material and carbon nanotubes within the conductive composition largely depends on the type of stabilizing agent which is anchored to the surface of carbon nanotubes. Thus, stabilizing agent is the key to obtain a conductive composition of high stability in the presence of polymeric material of the present invention.

In the absence of an anionic stabilizing agent in the production of the conductive composition, stability between carbon nanotubes and polymeric material within the electrode slurry cannot be attained. The anionic stabilizing agent is generally of low molecular weight and can be used for surface coating of the carbon nanotubes. The amphiphilic anionic stabilizing agent interacts with carbon nanotubes with its hydrophobic part, whereas the anionic hydrophilic part is responsible for providing repulsive force against the acid group of the polymeric material in the conductive composition. It can penetrate easily inside the aggregates of carbon nanotubes and is useful for improving the exfoliation of carbon nanotubes and polymeric material.

Accordingly, the present invention provides a method of preparing a highly stable carbon nanotube-based conductive composition containing at least an anionic stabilizing agent and polymeric material containing specific ranges of functional groups in the copolymer, and a method of preparing a slurry comprising the same. FIG. 1 is a flow chart of an embodiment illustrating the steps of method 100 for preparing an aqueous electrode slurry comprising the conductive composition disclosed herein. It is found that the conductive composition described herein exhibits an enhanced adhesive capability as well as electrical conductivity and simultaneously has the unexpected effect of improving the capacity and electrochemical performance of electrode formed therefrom.

In some embodiments, a first suspension is formed by dispersing a carbon nanomaterial in an aqueous solvent in step 101.

In some embodiments, the carbon nanomaterial can be selected from the group consisting of carbon nanotube, graphene, carbon nanofiber and combinations thereof.

In some embodiments, the carbon nanotube can be selected from the group consisting of multi-walled carbon nanotube, few-walled carbon nanotube, double-walled carbon nanotube, single-walled carbon nanotube and combinations thereof.

The carbon nanotube is a carbon structure in which honeycomb patterns, with interlocking hexagons of six carbons, are bonded to have a tube shape. The carbon nanotube is excellent in mechanical properties, heat resistance, chemical resistance and the like, and thus has been frequently used as a filler for cathode slurry.

In addition, the carbon nanotube has a diameter of several nanometers or several tens of nm and a length of several tens of m, and as a result has a large aspect ratio. In some embodiments, the aspect ratio (ratio of length to diameter) of the carbon nanotube is from about $1\times10$ to about $1\times10^4$, from about $1\times10$ to about $5\times10^3$, from about $1\times10$ to about $1\times10^3$, from about $1\times10$ to about $8\times10^2$, from about $1\times10$ to about $6\times10^2$, from about $1\times10$ to about $4\times10^2$, from about $1\times10$ to about $2\times10^2$, from about $1\times10$ to about $1\times10^2$, from about $5\times10$ to about $1\times10^4$, from about $1\times10^2$ to about $1\times10^4$, from about $1\times10^2$ to about $5\times10^3$, from about $1\times10^2$ to about $1\times10^3$ or from about $5\times10$ to about $5\times10^3$. In certain embodiments, the aspect ratio of the carbon nanotube is lower than $1\times10^4$, lower than $7.5\times10^3$, lower than $5\times10^3$, lower than $2.5\times10^3$, lower than $1\times10^3$, lower than $7.5\times10^2$, lower than $5\times10^2$, lower than $2.5\times10^2$, lower than $1\times10^2$, lower than $7.5\times10$, lower than $5\times10$ or lower than $2.5\times10$. In some embodiments, the aspect ratio of the carbon nanotube is more than $1\times10$, more than $2.5\times10$, more than $5\times10$, more than $7.5\times10$, more than $1\times10^2$, more than $2.5\times10^2$, more than $5\times10^2$, more than $7.5\times10^2$, more than $1\times10^3$, more than $2.5\times10^3$, more than $5\times10^3$ or more than $7.5\times10^3$.

In some embodiments, the diameter of the carbon nanotube is from about 1 nm to about 100 nm, from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30 nm, from about 1 nm to about 20 nm or from about 1 nm to about 10 nm. In some embodiments, the diameter of the carbon nanotube is less than 100 nm, less than 90 nm, less than 80 nm, less than 70 nm, less than 60 nm, less than 50 nm, less than 40 nm, less than 30 nm, less than 20 nm, less than 10 nm or less than 5 nm. In some embodiments, the diameter of the carbon nanotube is more than 1 nm, more than 5 nm, more than 10 nm, more than 20 nm, more than 30 nm, more than 40 nm, more than 50 nm, more than 60 nm, more than 70 nm, more than 80 nm or more than 90 nm.

In some embodiments, the length of the carbon nanotube is from about 0.1 µm to about 100 µm, from about 0.1 µm to about 90 µm, from about 0.1 µm to about 80 µm, from about 0.1 µm to about 70 µm, from about 0.1 µm to about 60 µm, from about 0.1 µm to about 50 µm, from about 0.1 µm to about 40 µm, from about 0.1 µm to about 30 µm, from about 0.1 µm to about 20 am, from about 0.1 µm to about 10 am, from about 0.5 µm to about 50 am, from about 1 µm to about 50 µm or from about 0.5 µm to about 70 µm. In certain embodiments, the length of the carbon nanotube is less than 100 am, less than 90 am, less than 80 am, less than 70 am, less than 60 am, less than 50 am, less than 40 am, less than 30 am, less than 20 am, less than 10 µm or less than 5 µm. In some embodiments, the length of the carbon nanotube is more than 0.1 am, more than 1 am, more than 5 am, more than 10 m, more than 15 m, more than 20 µm, more than 30 µm, more than 40 µm, more than 50 µm, more than 60 µm, more than 70 µm, more than 80 µm or more than 90 µm.

In some embodiments, the BET specific surface area of the carbon nanotube is from about 50 $m^2/g$ to about 1000 $m^2/g$, from about 50 $m^2/g$ to about 900 $m^2/g$, from about 50 $m^2/g$ to about 800 $m^2/g$, from about 50 $m^2/g$ to about 700 $m^2/g$, from about 50 $m^2/g$ to about 600 $m^2/g$, from about 100 $m^2/g$ to about 600 $m^2/g$, from about 150 $m^2/g$ to about 600 $m^2/g$ or from about 200 $m^2/g$ to about 600 $m^2/g$. In certain embodiments, the BET specific surface area of the carbon nanotube is higher than 50 $m^2/g$, higher than 150 $m^2/g$, higher than 250 $m^2/g$, higher than 350 $m^2/g$, higher than 450 $m^2/g$, higher than 550 $m^2/g$, higher than 650 $m^2/g$, higher than 750 $m^2/g$, higher than 850 $m^2/g$ or higher than 950 $m^2/g$. In some embodiments, the BET specific surface area of the carbon nanotube is lower than 1000 m$^2$/g, lower than 900 m$^2$/g, lower than 800 m$^2$/g, lower than 700 m$^2$/g, lower than 600 m$^2$/g, lower than 500 m$^2$/g, lower than 400 m$^2$/g, lower than 300 m$^2$/g, lower than 200 m$^2$/g or lower than 100 m$^2$/g.

An aqueous solvent corresponds to the medium in which the particles of the disperse phase, i.e. carbon nanomaterials in the present invention, are distributed.

In some embodiments, the aqueous solvent is a solution containing water as the major component and a volatile solvent, such as alcohols, lower aliphatic ketones, lower alkyl acetates or the like, as the minor component in addition to water. In some embodiments, the proportion of water in the aqueous solvent is from about 51% to about 100%, from about 51% to about 90%, from about 51% to about 80%, from about 51% to about 70%, from about 60% to about 100%, from about 60% to about 90%, from about 60% to about 80%, from about 70% to about 100%, from about 70% to about 90% or from about 80% to about 100% by weight.

In some embodiments, the proportion of water in the aqueous solvent is more than 50%, more than 60%, more than 70%, more than 80% or more than 90% by weight. In some embodiments, the proportion of water in the aqueous solvent is less than 55%, less than 65%, less than 75%, less than 85% or less than 95% by weight. In some embodiments, the aqueous solvent consists solely of water, that is, the proportion of water in the aqueous solvent is 100% by weight.

Some non-limiting examples of water include tap water, bottled water, purified water, pure water, distilled water, de-ionized water, D$_2$O, or a combination thereof. In some embodiments, the aqueous solvent is de-ionized water.

Any water-miscible solvents or volatile solvents can be used as the minor component (i.e. solvents other than water) of the aqueous solvent. Some non-limiting examples of the water-miscible solvents or volatile solvents include alcohols, lower aliphatic ketones, lower alkyl acetates and combinations thereof. The addition of alcohol can improve the dispersibility of the carbon nanomaterials and lower the freezing point of water. Some non-limiting examples of the alcohol include C$_1$-C$_4$ alcohols, such as methanol, ethanol, isopropanol, n-propanol, tert-butanol, n-butanol and combinations thereof. Some non-limiting examples of the lower aliphatic ketones include acetone, dimethyl ketone, methyl ethyl ketone (MEK) and combinations thereof. Some non-limiting examples of the lower alkyl acetates include ethyl acetate (EA), isopropyl acetate, propyl acetate, butyl acetate (BA) and combinations thereof. In some embodiments, the aqueous solvent does not comprise an alcohol, a lower aliphatic ketone, a lower alkyl acetate or combinations thereof.

Figure 2:
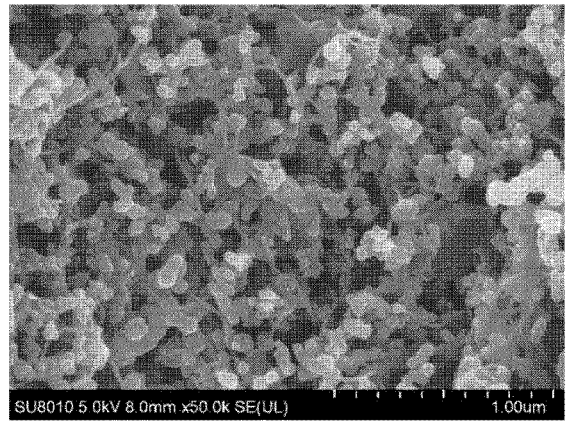
FIGS. 2A and 2B illustrate the SEM images of the morphology of cathode with and without the incorporation of carbon nanotubes and anionic stabilizing agent respectively.
Figure 2:
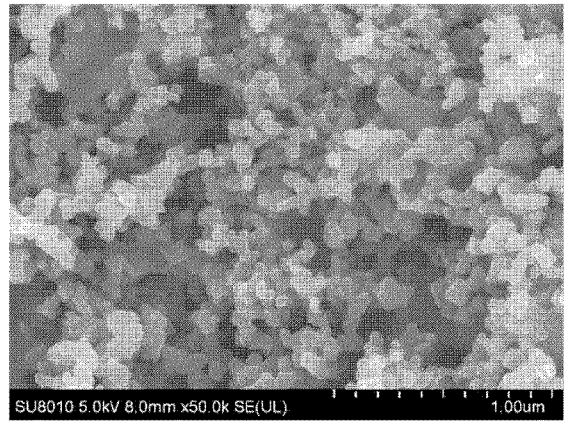

FIGS. 2A and 2B illustrate the SEM images of the morphology of cathode with and without the incorporation of carbon nanotubes and anionic stabilizing agent respectively. As illustrated in FIG. 2A, strands of carbon nanotubes are embedded throughout the matrix, which helps improve the electrical contact between particles in cathodes. This shows that with the aid of an anionic stabilizing agent, homogenous dispersion of carbon nanotubes and polymeric material arising from a stable conductive composition is achieved in the cathode.

In some embodiments, the first suspension may be mixed for a time period from about 5 minutes (mins) to about 180 mins, from about 10 mins to about 180 mins, from about 20 mins to about 180 mins, from about 40 mins to about 180 mins, from about 50 mins to about 180 mins, from about 50 mins to about 170 mins, from about 50 mins to about 150 mins, from about 50 mins to about 130 mins, from about 60 mins to about 120 mins, from about 40 mins to about 140 mins, from about 100 mins to about 140 mins or from about 50 mins to about 120 mins. In some embodiments, the first suspension may be mixed for a time period of more than 5 mins, more than 20 mins, more than 35 mins, more than 50 mins, more than 65 mins, more than 80 mins, more than 95 mins, more than 110 mins, more than 125 mins, more than 150 mins or more than 165 mins. In some embodiments, the first suspension may be mixed for a time period of less than 180 mins, less than 160 mins, less than 140 mins, less than 120 mins, less than 100 mins, less than 80 mins, less than 60 mins, less than 40 mins, less than 20 mins or less than 10 mins. This allows sufficient time for carbon nanotubes to be well-dispersed in the first suspension.

In some embodiments, a second suspension is formed by dispersing an anionic stabilizing agent in the first suspension in step 102. The second suspension is mixed thoroughly before the addition of polymeric material at the next stage. This allows the formation of a stable protective barrier surrounding the carbon nanotubes with the help of an anionic stabilizing agent prior to introduction of polymeric material to the second suspension.

Stabilizing agent serves as an aid in stabilizing the interactions between polymeric material and carbon nanotubes in an aqueous solvent which in turn improves the dispersibility of carbon nanotubes and polymeric material within the conductive composition. In this disclosure, an anionic stabilizing agent is used to attain a stabilized conductive composition and consequently a uniformly dispersed carbon nanomaterials and polymeric material in electrode slurry, for further improving electrode performance.

An anionic stabilizing agent may be used to enhance the stability of the conductive composition. Cationic and non-ionic stabilizing agents, combined or standalone, are incapable of attaining both stability of conductive composition and uniform dispersion of carbon nanotubes due to the absence of negatively charged ions in their structures to provide repulsive force against an acid group of the aqueous polymeric material.

The anionic stabilizing agent can be used in the form of corresponding salts, with alkali metal ions, alkaline earth metal ions, ammonium ions, mono-/di- or tri-alkyl ammonium ions and mono-/di- or tri-(hydroxyalkyl)ammonium ions as the counterions. Non-limiting examples of anionic stabilizing agent include C$_2$ to C$_{30}$ alkyl sulphates, C$_2$ to C$_{30}$ alkyl ether sulfates, C$_2$ to C$_{30}$ alkyl phosphates, C$_2$ to C$_{30}$ alkyl ether phosphates, C$_2$ to C$_{30}$ alkyl sulfonates, C$_2$ to C$_{30}$ alkyl ether sulfonates, C$_2$ to C$_{30}$ alkyl carboxylate, C$_2$ to C$_{30}$ alkyl ether carboxylate, and mixtures thereof.

In some embodiments, the anionic stabilizing agent may be selected from the group consisting of alkyl sulfate, alkyl sulfonate, alkyl carboxylate, alkyl phosphate, alkyl phosphonate, alkyl aromatic sulfate, alkyl aromatic sulfonate, alkyl aromatic carboxylate, alkyl aromatic phosphate, alkyl aromatic phosphonate, alkyl alkoxy sulfate, alkyl alkoxy sulfonate, alkyl alkoxy carboxylate, alkyl alkoxy phosphate, alkyl alkoxy phosphonate, alkyl ester sulfate, alkyl ester sulfonate, alkyl ester carboxylate, alkyl ester phosphate, alkyl ester phosphonate and combinations thereof. In some embodiments, the anionic stabilizing agent is selected from the group consisting of metal dodecyl sulfate, metal dodecyl sulfonate, metal dodecyl carboxylate, metal dodecyl phosphate, metal dodecyl phosphonate, metal dodecyl ether sulfate, metal dodecyl ether sulfonate, metal dodecyl ether carboxylate, metal dodecyl ether phosphate, metal dodecyl ether phosphonate, metal dodecyl benzene sulfate, metal dodecyl benzene sulfonate, metal dodecyl benzene carboxylate, metal dodecyl benzene phosphate, metal dodecyl benzene phosphonate, metal stearate, olefin sulfonate, alpha olefin sulfonate and combinations thereof.

In some embodiments, the anionic stabilizing agent is selected from the group consisting of sodium dodecyl sulphate (SDS), lithium dodecyl sulphate (LDS), sodium lauryl ether sulfate (SLES), lithium dodecyl benzene sulfonate, sodium dodecyl benzene sulfonate (SDBS), paraffin sulfonate, ammonium or other alkali or alkaline-earth metal sarcosinate, ammonium or other alkali or alkaline-earth metal sulfosuccinate, ammonium or other alkali or alkaline-earth metal isethionate, ammonium or other alkali or alkaline-earth metal taurate, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric acid monoglyceride sodium sulfate, sodium lauryl sulfate, sodium laureth sulfate, potassium lauryl sulfate, potassium laureth sulfate, sodium lauryl phosphate, sodium tridecyl phosphate, sodium behenyl phosphate, sodium laureth-2 phosphate, sodium dilauryl phosphate, sodium ditridecyl phosphate, sodium lauroyl sarcosinate, lauroyl sarcosine, cocoyl sarcosine, ammonium cosyl sulfate, sodium cosyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium lauryl sulfate, potassium cosyl sulfate, potassium lauryl sulfate, monoethanolamine cosyl sulfate, sodium tridecylbenzenesulfonate, ether sulfonate, lithium stearate, sodium stearate and combinations thereof.

Figure 3:
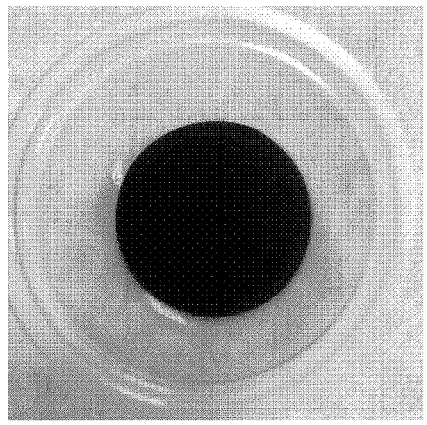
FIGS. 3A and 3B depict the distribution of a conductive composition with and without the anionic stabilizing agent respectively.
Figure 3:
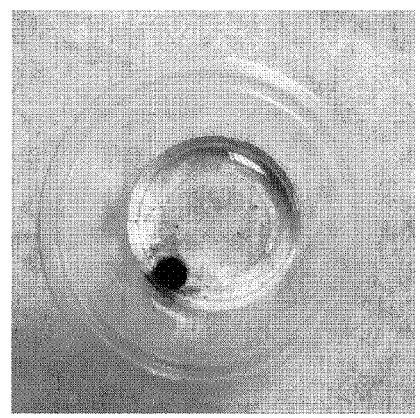
Figure 4:
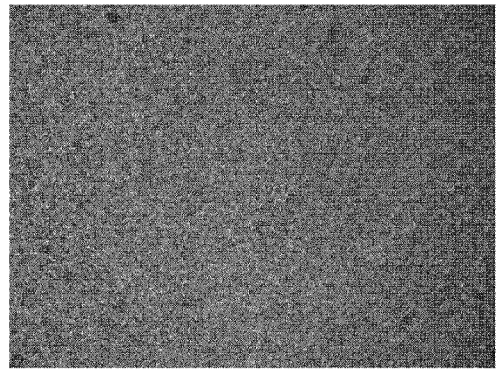
FIGS. 4A and 4B depict the morphology of a conductive composition at 100× magnification with and without the anionic stabilizing agent respectively.
Figure 4:
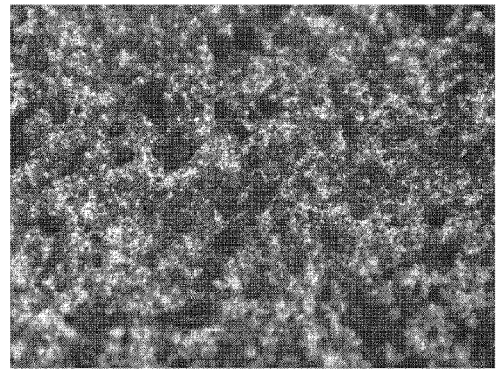

FIGS. 3A and 3B depict the distribution of a conductive composition with and without the anionic stabilizing agent respectively, whereas FIGS. 4A and 4B depict the morphology of a conductive composition at 100× magnification with and without the anionic stabilizing agent respectively. It can be seen that the mixture is unstable, has aggregated significantly and cannot be dispersed properly without the anionic stabilizing agent in the mix, while the mixture containing an anionic stabilizing agent is stable, well-dispersed, consistently smooth and uniform. This shows that the particles of the conductive composition of the present invention do not agglomerate and maintain a high and stable level of dispersion. This not only improves the electrical conductivity of the electrode slurry made therefrom, but also improves the adhesion of the electrode slurry with the current collector, the performance and lifespan of the lithium-ion batteries.

Any appropriate amount of time may be used in mixing the second suspension. In some embodiments, the second suspension may be mixed for a time period from about 5 mins to about 60 mins. This allows sufficient time for adhesion of the anionic stabilizing agent onto carbon nanotubes surface to form a stable protective barrier surrounding the carbon nanotubes against polymeric material that may be introduced at the next stage.

In some embodiments, a conductive composition is formed by dispersing a polymeric material in the second suspension in step 103.

The polymeric material performs a role of adhering the active battery material and the conductive agent together with the current collector to form a continuous electrical conduction path. With the polymeric material disclosed herein exhibiting an enhanced adhesive capability, which strengthen the conductive network between various components within the electrode, it is capable of facilitating electron and ion transportation to reduce the impedance between the current collector and the electrode materials and have sufficient elasticity to prevent the electrode from swelling due to volume expansion and contraction during charging and discharging.

In some embodiments, the polymeric material comprises a copolymer. In some embodiments, the copolymer comprises a structural unit (a) derived from an acid group-containing monomer and a structural unit (b) derived from a nitrile group-containing monomer. In some embodiments, the copolymer further comprises a structural unit (c) derived from an amide group-containing monomer, a structural unit (d) derived from a hydroxyl group-containing monomer, a structural unit (e) derived from an ester group-containing monomer, a structural unit (f) derived from an epoxy group-containing monomer, a structural unit (g) derived from a fluorine-containing monomer or combinations thereof. In some embodiments, the copolymer does not comprise a structural unit (c) derived from an amide group-containing monomer, a structural unit (d) derived from a hydroxyl group-containing monomer, a structural unit (e) derived from an ester group-containing monomer, a structural unit (f) derived from an epoxy group-containing monomer, a structural unit (g) derived from a fluorine-containing monomer or combinations thereof. With an appropriate amount of each functional group-containing monomer unit in the copolymer, the adhesive strength of the electrode slurry to the current collector can be enhanced, and as a result, the life characteristics of the secondary battery can be improved.

In some embodiments, the copolymer comprises a structural unit derived from an acid group-containing monomer and a structural unit derived from a polar group-containing monomer.

Any monomer that has at least one polar group may be used as polar group-containing monomer without any specific limitations. In some embodiments, the polar group-containing monomer is a nitrile group-containing monomer. In some embodiments, the polar group-containing monomer is selected from the group consisting of a nitrile group-containing monomer, an amide group-containing monomer, a hydroxyl group-containing monomer, an ester group-containing monomer, an epoxy group-containing monomer, a fluorine-containing monomer, an amine group-containing monomer, an ether group-containing monomer, a carbonyl group-containing monomer or combinations thereof.

In some embodiments, the proportion of structural unit derived from a polar group-containing monomer is from about 15% to about 85%, from about 15% to about 80%, from about 15% to about 75%, from about 15% to about 70%, from about 15% to about 65%, from about 15% to about 60%, from about 15% to about 55%, from about 15% to about 50%, from about 15% to about 45%, from about 20% to about 85%, from about 20% to about 80%, from about 20% to about 75%, from about 20% to about 70%, from about 20% to about 65%, from about 20% to about 60%, from about 20% to about 55%, from about 20% to about 50%, from about 25% to about 85%, from about 25% to about 80%, from about 25% to about 75%, from about 25% to about 70%, from about 25% to about 65%, from about 25% to about 60%, from about 25% to about 55%, from about 30% to about 85%, from about 30% to about 80%, from about 30% to about 75%, from about 30% to about 70%, from about 30% to about 65% or from about 30% to about 60% by mole, based on the total number of moles of monomeric units in the copolymer in the polymeric material.

In some embodiments, the proportion of structural unit derived from a polar group-containing monomer is less than 85%, less than 80%, less than 75%, less than 70%, less than 65%, less than 60%, less than 55%, less than 50%, less than 45%, less than 40%, less than 35%, less than 30%, less than 25% or less than 20% by mole, based on the total number of moles of monomeric units in the copolymer in the polymeric material. In some embodiments, the proportion of structural unit derived from a polar group-containing monomer is more than 15%, more than 20%, more than 25%, more than 30%, more than 35%, more than 40%, more than 45%, more than 50%, more than 55%, more than 60%, more than 65%, more than 70% or more than 75% by mole, based on the total number of moles of monomeric units in the copolymer in the polymeric material.

In some embodiments, the polar group-containing monomer comprises a polar group-containing monomer (a) and a polar group-containing monomer (b). Any monomer that has at least one polar aprotic group may be used as polar group-containing monomer (a) without any specific limitations. In some embodiments, the polar group containing monomer (a) is selected from the group consisting of a nitrile group-containing monomer, an ester group-containing monomer, an epoxy group-containing monomer, a fluorine-containing monomer, an ether group-containing monomer, a carbonyl group-containing monomer and combinations thereof. Any monomer that has at least one polar protic group may be used as polar group-containing monomer (b) without any specific limitations. In some embodiments, the polar group containing monomer (b) is selected from the group consisting of an amide group-containing monomer, a hydroxyl group-containing monomer, an amine group-containing monomer and combinations thereof.

In some embodiments, the copolymer comprises a structural unit derived from an acid group-containing monomer, a structural unit derived from a polar group-containing monomer (a) and a structural unit derived from a polar group-containing monomer (b).

In some embodiments, the proportion of structural unit derived from each of a polar group-containing monomer (a) and a polar group-containing monomer (b) is independently from about 0% to about 85%, from about 0% to about 75%, from about 0% to about 65%, from about 0% to about 55%, from about 0% to about 45%, from about 0% to about 35%, from about 2% to about 35%, from about 5% to about 35%, from about 10% to about 85%, from about 10% to about 75%, from about 10% to about 65%, from about 10% to about 55%, from about 10% to about 45%, from about 10% to about 35%, from about 12% to about 35%, from about 14% to about 35%, from about 16% to about 35%, from about 18% to about 35%, from about 20% to about 35%, from about 20% to about 34%, from about 20% to about 32%, from about 20% to about 30%, from about 0% to about 34%, from about 0% to about 32%, from about 0% to about 30%, from about 1% to about 28%, from about 1% to about 26%, from about 1% to about 24%, from about 1% to about 22%, from about 1% to about 20%, from about 5% to about 30% or from about 10% to about 30% by mole, based on the total number of moles of monomeric units in the copolymer in the polymeric material.

In some embodiments, the proportion of structural unit derived from each of a polar group-containing monomer (a) and a polar group-containing monomer (b) is independently less than 85%, less than 80%, less than 75%, less than 70%, less than 65%, less than 60%, less than 55%, less than 50%, less than 45%, less than 40%, less than 35%, less than 30% or less than 25% by mole, based on the total number of moles of monomeric units in the copolymer in the polymeric material. In some embodiments, the proportion of structural unit derived from each of a polar group-containing monomer (a) and a polar group-containing monomer (b) is independently more than 15%, more than 20%, more than 25%, more than 30%, more than 35%, more than 40%, more than 45%, more than 50%, more than 55%, more than 60%, more than 65%, more than 70% or more than 75% by mole, based on the total number of moles of monomeric units in the copolymer in the polymeric material.

In further embodiments, incorporation of the polymeric material may pose an additional challenge to the stabilization of the conductive composition as well as dispersion of the carbon nanotubes due to the properties and the proportions of the functional groups contained in the copolymer. Accordingly, substantial effort has been made by the inventors of the present invention in advancing the formulation of the polymeric material and determining the optimal stabilizing agent that stabilize the carbon nanotubes-polymeric material interactions and subsequently aids the dispersion of carbon nanotubes and polymeric material. The highly stable conductive composition disclosed herein exhibits excellent dispersion property as a result.

Structural unit (a) is derived from an acid group-containing monomer. Any monomer that has at least one acid group may be used as acid group-containing monomer without any specific limitations.

In some embodiments, the acid group-containing monomer is a carboxylic acid group-containing monomer. In some embodiments, the carboxylic acid group-containing monomer is acrylic acid, methacrylic acid, crotonic acid, 2-butyl crotonic acid, cinnamic acid, maleic acid, maleic anhydride, fumaric acid, itaconic acid, itaconic anhydride, tetraconic acid or a combination thereof. In certain embodiments, the carboxylic acid group-containing monomer is 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, 3-trans-aryloxyacrylic acid, α-chloro-β-E-methoxyacrylic acid or a combination thereof. In some embodiments, the carboxylic acid group-containing monomer is methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate or a combination thereof. In some embodiments, the carboxylic acid group-containing monomer is maleic anhydride, methyl maleic anhydride, dimethyl maleic anhydride, acrylic anhydride, methacrylic anhydride, methacrolein, methacryloyl chloride, methacryloyl fluoride, methacryloyl bromide, or a combination thereof.

In some embodiments, the carboxylic acid group-containing monomer is in the form of a carboxylic acid, a carboxylic salt or a combination thereof. In some embodiments, the carboxylic salt can be a salt of a carboxylic acid group-containing monomer listed above. In some embodiments, the carboxylic salt can be in the form of an alkali metal carboxylic salt, an ammonium carboxylic salt or a combination thereof. Examples of an alkali metal forming the alkali metal carboxylic salt include lithium, sodium and potassium.

In some embodiments, the acid group-containing monomer is a sulfonic acid group-containing monomer. In some embodiments, the sulfonic acid group-containing monomer is vinylsulfonic acid, methylvinylsulfonic acid, allylvinylsulfonic acid, allylsulfonic acid, methallylsulfonic acid, styrenesulfonic acid, 2-sulfoethyl methacrylic acid, 2-methylprop-2-ene-1-sulfonic acid, 2-acrylamido-2-methyl-1-propane sulfonic acid, 3-allyloxy-2-hydroxy-1-propane sulfonic acid or a combination thereof.

In some embodiments, the sulfonic acid group-containing monomer is in the form of a sulfonic acid, a sulfonic salt or a combination thereof. In some embodiments, the sulfonic salt can be a salt of a sulfonic acid group-containing monomer listed above. In some embodiments, the sulfonic salt can be in the form of an alkali metal sulfonic salt, an ammonium sulfonic salt or a combination thereof. Examples of an alkali metal forming the alkali metal sulfonic salt include lithium, sodium and potassium.

In some embodiments, the acid group-containing monomer is a phosphonic acid group-containing monomer. In some embodiments, the phosphonic acid group-containing monomer is vinyl phosphonic acid, allyl phosphonic acid, vinyl benzyl phosphonic acid, acrylamide alkyl phosphonic acid, methacrylamide alkyl phosphonic acid, acrylamide alkyl diphosphonic acid, acryloylphosphonic acid, 2-methacryloyloxyethyl phosphonic acid, bis(2-methacryloyloxyethyl) phosphonic acid, ethylene 2-methacryloyloxyethyl phosphonic acid, ethyl-methacryloyloxyethyl phosphonic acid or a combination thereof.

In some embodiments, the phosphonic acid group-containing monomer is in the form of a phosphonic acid, a phosphonic salt or a combination thereof. In some embodiments, the phosphonic salt can be a salt of a phosphonic acid group-containing monomer listed above. In some embodiments, the phosphonic salt can be in the form of an alkali metal phosphonic salt, an ammonium phosphonic salt or a combination thereof. Examples of an alkali metal forming the alkali metal phosphonic salt include lithium, sodium and potassium.

In some embodiments, the acid group-containing monomer is a phosphoric acid group-containing monomer. In some embodiments, the phosphoric acid group-containing monomer is allyl hydrogen phosphate, vinyl hydrogen phosphate, allyl hydrogen pyrophosphate, vinyl hydrogen pyrophosphate, allyl hydrogen tripolyphosphate, vinyl hydrogen tripolyphosphate, allyl hydrogen tetrapolyphosphate, vinyl hydrogen tetrapolyphosphate, allyl hydrogen trimetaphosphate, vinyl hydrogen trimetaphosphate, isopentenyl phosphate, isopentenyl pyrophosphate, or a combination thereof.

In some embodiments, the phosphoric acid group-containing monomer is in the form of a phosphoric acid, a phosphoric salt or a combination thereof. In some embodiments, the phosphoric salt can be a salt of a phosphoric acid group-containing monomer listed above. In some embodiments, the phosphoric salt can be in the form of an alkali metal phosphoric salt, an ammonium phosphoric salt or a combination thereof. Examples of an alkali metal forming the alkali metal phosphoric salt include lithium, sodium and potassium.

In some embodiments, the acid group-containing monomer is a nitric acid group-containing monomer. In some embodiments, the nitric acid group-containing monomer is allyl hydrogen nitrate, ethenyl hydrogen nitrate or a combination thereof.

In some embodiments, the nitric acid group-containing monomer is in the form of a nitric acid, a nitric salt or a combination thereof. In some embodiments, the nitric salt can be a salt of a nitric acid group-containing monomer listed above. In some embodiments, the nitric salt can be in the form of an alkali metal nitric salt, an ammonium nitric salt or a combination thereof. Examples of an alkali metal forming the alkali metal nitric salt include lithium, sodium and potassium.

In some embodiments, the acid group-containing monomer is a sulphuric acid group-containing monomer. In some embodiments, the sulphuric acid group-containing monomer is allyl hydrogen sulfate, vinyl hydrogen sulfate, 4-allyl phenol sulphate or a combination thereof.

In some embodiments, the sulphuric acid group-containing monomer is in the form of a sulphuric acid, a sulphuric salt or a combination thereof. In some embodiments, the sulphuric salt can be a salt of a sulphuric acid group-containing monomer listed above. In some embodiments, the sulphuric salt can be in the form of an alkali metal sulphuric salt, an ammonium sulphuric salt or a combination thereof. Examples of an alkali metal forming the alkali metal sulphuric salt include lithium, sodium and potassium.

In some embodiments, the acid group-containing monomer is selected from the group consisting of a carboxylic acid group-containing monomer, a sulfonic acid group-containing monomer, a phosphonic acid group-containing monomer, a phosphoric acid group-containing monomer, a nitric acid group-containing monomer, a sulphuric acid group-containing monomer and combinations thereof.

In some embodiments, the acid group-containing monomer is in the form of an acid, an acid salt or a combination thereof. In some embodiments, the acid salt can be a salt of an acid group-containing monomer listed above. In some embodiments, the acid salt can be in the form of an alkali metal acid salt, an ammonium acid salt or a combination thereof. Examples of an alkali metal forming the alkali metal acid salt include lithium, sodium and potassium.

Structural unit (b) is derived from a nitrile group-containing monomer. Any monomer that has at least one nitrile group may be used as nitrile group-containing monomer without any specific limitations. In some embodiments, the nitrile group-containing monomer include α,β-ethylenically unsaturated nitrile monomers. In some embodiments, the nitrile group-containing monomer is acrylonitrile, α-halogenoacrylonitrile, α-alkylacrylonitrile or a combination thereof. In some embodiments, the nitrile group-containing monomer is α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl)acrylonitrile, vinylidene cyanide, or a combination thereof.

In some embodiments, the proportion of each of a structural unit (a) derived from an acid group-containing monomer and a structural unit (b) derived from a nitrile group-containing monomer is independently from about 15% to about 85%, from about 15% to about 75%, from about 15% to about 70%, from about 15% to about 65%, from about 15% to about 60%, from about 15% to about 55%, from about 15% to about 50%, from about 20% to about 85%, from about 25% to about 85%, from about 30% to about 85%, from about 35% to about 85%, from about 40% to about 85%, from about 45% to about 85%, from about 50% to about 85%, from about 55% to about 85%, from about 20% to about 80%, from about 20% to about 75%, from about 20% to about 70%, from about 20% to about 65%, or from about 20% to about 60% by mole, based on the total number of moles of monomeric units in the copolymer in the polymeric material. If the proportion of the acid group-containing monomer unit in the copolymer is not less than the above lower limit, there is a sufficient quantity of acid salt ions derived from the acid group to repel the anionic stabilizing agent on the carbon nanotubes surface, which averts the possible disruption caused by the structural unit derived from a polar group-containing monomer and allow a uniform dispersion of carbon nanotubes.

In some embodiments, the proportion of each of a structural unit (a) derived from an acid group-containing monomer and a structural unit (b) derived from a nitrile group-containing monomer is independently less than 85%, less than 80%, less than 75%, less than 70%, less than 65%, less than 60%, less than 55%, less than 50%, less than 45%, less than 40%, less than 35%, less than 30% or less than 25% by mole, based on the total number of moles of monomeric units in the copolymer in the polymeric material. In some embodiments, the proportion of each of a structural unit (a) derived from an acid group-containing monomer and a structural unit (b) derived from a nitrile group-containing monomer is independently more than 15%, more than 20%, more than 25%, more than 30%, more than 35%, more than 40%, more than 45%, more than 50%, more than 55%, more than 60%, more than 65%, more than 70% or more than 75% by mole, based on the total number of moles of monomeric units in the copolymer in the polymeric material.

In some embodiments, the molar ratio of the acid group-containing monomer to the nitrile group-containing monomer in the copolymer in the polymeric material is from about 0.15 to about 6.5, from about 0.15 to about 6, from about 0.15 to about 5.5, from about 0.15 to about 5, from about 0.15 to about 4.5, from about 0.15 to about 4, from about 0.15 to about 3.5, from about 0.15 to about 3, from about 0.15 to about 2.5, from about 0.2 to about 6.5, from about 0.2 to about 6, from about 0.2 to about 5.5, from about 0.2 to about 5, from about 0.2 to about 4.5, from about 0.2 to about 4, from about 0.2 to about 3.5, from about 0.2 to about 3, from about 0.2 to about 2.5, from about 0.25 to about 6.5, from about 0.3 to about 6.5, from about 0.25 to about 5, from about 0.3 to about 5, from about 0.25 to about 4 or from about 0.25 to about 5.

In some embodiments, the molar ratio of the acid group-containing monomer to the nitrile group-containing monomer in the copolymer in the polymeric material is more than 0.15, more than 0.25, more than 0.5, more than 1, more than 1.5, more than 2, more than 2.5, more than 3, more than 3.5, more than 4, more than 4.5, more than 5, more than 5.5 or more than 6. In some embodiments, the molar ratio of the acid group-containing monomer to the nitrile group-containing monomer in the copolymer in the polymeric material is less than 6.5, less than 6, less than 5.5, less than 5, less than 4.5, less than 4, less than 3.5, less than 3, less than 2.5, less than 2, less than 1.5, less than 1, less than 0.5 or less than 0.25.

Structural unit (c) is derived from an amide group-containing monomer. Any monomer that has at least one amide group may be used as amide group-containing monomer without any specific limitations. In some embodiments, the amide group-containing monomer is acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl)methacrylamide, N-(ethoxymethyl) methacrylamide, N-(propoxymethyl)methacrylamide, N-(butoxymethyl)methacrylamide, N,N-dimethyl methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide or a combination thereof.

In some embodiments, the proportion of structural unit (c) derived from an amide group-containing monomer is from about 0% to about 85%, from about 0% to about 75%, from about 0% to about 65%, from about 0% to about 55%, from about 0% to about 45%, from about 0% to about 35%, from about 2% to about 35%, from about 5% to about 35%, from about 10% to about 85%, from about 10% to about 75%, from about 10% to about 65%, from about 10% to about 55%, from about 10% to about 45%, from about 10% to about 35%, from about 12% to about 35%, from about 14% to about 35%, from about 16% to about 35%, from about 18% to about 35%, from about 20% to about 35%, from about 20% to about 34%, from about 20% to about 32%, from about 20% to about 30%, from about 0% to about 34%, from about 0% to about 32%, from about 0% to about 30%, from about 1% to about 28%, from about 1% to about 26%, from about 1% to about 24%, from about 1% to about 22%, from about 1% to about 20%, from about 5% to about 30% or from about 10% to about 30% by mole, based on the total number of moles of monomeric units in the copolymer in the polymeric material.

In some embodiments, the proportion of structural unit (c) derived from an amide group-containing monomer is less than 85%, less than 75%, less than 65%, less than 55%, less than 45%, less than 35%, less than 33%, less than 31%, less than 30%, less than 28%, less than 26%, less than 24%, less than 22%, less than 20%, less than 18%, less than 16%, less than 14%, less than 12%, less than 10%, less than 8%, less than 6% or less than 4% by mole, based on the total number of moles of monomeric units in the copolymer in the polymeric material. In some embodiments, the proportion of structural unit (c) derived from an amide group-containing monomer is more than 0%, more than 2%, more than 4%, more than 6%, more than 8%, more than 10%, more than 12%, more than 14%, more than 16%, more than 18%, more than 20%, more than 22%, more than 24%, more than 26%, more than 28%, more than 30%, more than 32%, more than 35%, more than 45%, more than 55%, more than 65% or more than 75% by mole, based on the total number of moles of monomeric units in the copolymer in the polymeric material.

Structural unit (d) is derived from a hydroxyl group-containing monomer. Any monomer that has at least one hydroxyl group may be used as hydroxyl group-containing monomer without any specific limitations. In some embodiments, the hydroxyl group-containing monomer is a $C_1$ to $C_{20}$ alkyl group or a $C_5$ to $C_{20}$ cycloalkyl group-containing methacrylate having a hydroxyl group. In some embodiments, the hydroxyl group-containing monomer is 2-hydroxyethylacrylate, 2-hydroxyethyl methacrylate, 2-hydroxypropyl acrylate, 2-hydroxypropyl methacrylate, 2-hydroxybutyl methacrylate, 3-hydroxypropylacrylate, 3-hydroxypropylmethacrylate, 4-hydroxybutyl methacrylate, 5-hydroxypentylacrylate, 6-hydroxyhexyl methacrylate, 1,4-cyclohexanedimethanol mono(meth)acrylate, 3-chloro-2-hydroxypropyl methacrylate, diethylene glycol mono(meth)acrylate, allyl alcohol or a combination thereof.

Structural unit (e) is derived from an ester group-containing monomer. Any monomer that has at least one ester group may be used as ester group-containing monomer without any specific limitations. In some embodiments, the ester group-containing monomer is $C_1$ to $C_{20}$ alkyl acrylate, $C_1$ to $C_{20}$ alkyl methacrylate, cycloalkyl acrylate or a combination thereof. In some embodiments, the ester group-containing monomer is methyl acrylate, ethyl acrylate, n-propyl acrylate, isopropyl acrylate, n-butyl acrylate, sec-butyl acrylate, tert-butyl acrylate, pentyl acrylate, hexyl acrylate, heptyl acrylate, octyl acrylate, 3,3,5-trimethylhexyl acrylate, 2-ethylhexyl acrylate, nonyl acrylate, decyl acrylate, lauryl acrylate, n-tetradecyl acrylate, octadecyl acrylate, cyclohexyl acrylate, phenyl acrylate, methoxymethyl acrylate, methoxyethyl acrylate, ethoxymethyl acrylate, ethoxyethyl acrylate, perfluorooctyl acrylate, stearyl acrylate or a combination thereof. In some embodiments, the ester group-containing monomer is cyclohexyl acrylate, cyclohexyl methacrylate, isobornyl acrylate, isobornyl methacrylate, 3,3,5-trimethylcyclohexylacrylate, or a combination thereof. In some embodiments, the ester group-containing monomer is methyl methacrylate, ethyl methacrylate, n-propyl methacrylate, isopropyl methacrylate, n-butyl methacrylate, sec-butyl methacrylate, tert-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, 2,2,2-trifluoroethyl methacrylate, phenyl methacrylate, benzyl methacrylate, or a combination thereof.

Structural unit (f) is derived from an epoxy group-containing monomer. Any monomer that has at least one epoxy group may be used as epoxy group-containing monomer without any specific limitations. In some embodiments, the epoxy group-containing monomer is vinyl glycidyl ether, allyl glycidyl ether, allyl 2,3-epoxypropyl ether, butenyl glycidyl ether, butadiene monoepoxide, chloroprene monoepoxide, 3,4-epoxy-1-butene, 4,5-epoxy-2-pentene, 3,4-epoxy-1-vinylcyclohexane, 1,2-epoxy-4-vinylcyclohexane, 3,4-epoxy cyclohexylethylene, epoxy-4-vinylcyclohexene, 1,2-epoxy-5,9-cyclododecadiene or a combination thereof. In some embodiments, the epoxy group-containing monomer is 3,4-epoxy-1-butene, 1,2-epoxy-5-hexene, 1,2-epoxy-9-decene, glycidyl acrylate, glycidyl methacrylate, glycidyl crotonate, glycidyl 2,4-dimethyl pentenoate, glycidyl 4-hexenoate, glycidyl 4-heptenoate, glycidyl 5-methyl-4-heptenoate, glycidyl sorbate, glycidyl linoleate, glycidyl oleate, glycidyl 3-butenoate, glycidyl 3-pentenoate, glycidyl-4-methyl-3-pentenoate or a combination thereof.

Structural unit (g) is derived from a fluorine-containing monomer. Any monomer that has at least one fluorine atom may be used as fluorine-containing monomer without any specific limitations. In some embodiments, the fluorine-containing monomer is a $C_1$ to $C_{20}$ alkyl group-containing acrylate, methacrylate or a combination thereof having at least one fluorine atom. In some embodiments, the fluorine-containing monomer is perfluoro alkyl acrylate such as perfluoro dodecyl acrylate, perfluoro n-octyl acrylate, perfluoro n-butyl acrylate, perfluoro hexylethyl acrylate and perfluoro octylethyl acrylate; perfluoro alkyl methacrylate such as perfluoro dodecyl methacrylate, perfluoro n-octyl methacrylate, perfluoro n-butyl methacrylate, perfluoro hexylethyl methacrylate and perfluoro octylethyl methacrylate; perfluoro oxyalkyl acrylate such as perfluoro dodecyloxyethyl acrylate and perfluoro decyloxyethyl acrylate; perfluoro oxyalkyl methacrylate such as perfluoro dodecyloxyethyl methacrylate and perfluoro decyloxyethyl methacrylate and combinations thereof. In some embodiments, the fluorine-containing monomer is a carboxylate containing at least one $C_1$ to $C_{20}$ alkyl group and at least one fluorine atom; wherein the carboxylate is selected from the group consisting of crotonate, malate, fumarate, itaconate and combinations thereof. In some embodiments, the fluorine-containing monomer is vinyl fluoride, trifluoroethylene, trifluorochloroethylene, fluoroalkyl vinyl ether, perfluoroalkyl vinyl ether, hexafluoropropylene, 2,3,3,3-tetrafluoropropene, vinylidene fluoride, tetrafluoroethylene, 2-fluoro acrylate and combinations thereof.

Structural unit (h) is derived from an amine group-containing monomer. Any monomer that has at least one amine group may be used as amine group-containing monomer without any specific limitations. In some embodiments, the amine group-containing monomer is allyl amine, vinyl amine, 4-pentenyl pentyl amine, 3-buten-1-amine, N-benzyl-N-(3-butenyl) amine, methylpent-4-enyl amine, 1,2-dimethyl-4-pentenyl amine, pent-4-en-1-amine, pent-3-en-2-amine, N-methylpent-4-en-1-amine or a combination thereof.

Structural unit (i) is derived from an ether group-containing monomer. Any monomer that has at least one ether group may be used as ether group-containing monomer without any specific limitations. In some embodiments, the ether group-containing monomer is vinyl ether, allyl ether, allyl vinyl ether, allyl glycidyl ether, 2H-hexafluoroisopropyl allyl ether, hydroxypolyethoxy (10) allyl ether, allyl phenethyl ether, ethyl vinyl ether, propyl vinyl ether, n-butyl vinyl ether or a combination thereof.

Structural unit (j) is derived from a carbonyl group-containing monomer. Any monomer that has at least one carbonyl group may be used as carbonyl group-containing monomer without any specific limitations. In some embodiments, the carbonyl group-containing monomer is methyl vinyl ketone, ethyl vinyl ketone, acrolein, acryloyl chloride, cinnamaldehyde, crotonaldehyde, 2-hexenal, oct-2-enal, 2-methylpent-2-enal, 4-methylpent-3-en-2-one, oct-1-en-3-one, 2-pentylbut-1-en-3-one or a combination thereof.

In some embodiments, the proportion of each of structural unit (d) derived from a hydroxyl group-containing monomer, structural unit (e) derived from an ester group-containing monomer, structural unit (f) derived from an epoxy group-containing monomer, structural unit (g) derived from a fluorine-containing monomer, structural unit (h) derived from an amine group-containing monomer, a structural unit (i) derived from an ether group-containing monomer and a structural unit (j) derived from a carbonyl group-containing monomer is independently from about 0% to about 80%, from about 0% to about 70%, from about 0% to about 60%, from about 0% to about 50%, from about 5% to about 50%, from about 10% to about 80%, from about 10% to about 70%, from about 10% to about 60%, from about 10% to about 50%, from about 15% to about 50%, from about 20% to about 50%, from about 20% to about 45%, from about 20% to about 40%, from about 0% to about 45%, from about 0% to about 40%, from about 0% to about 35%, from about 0% to about 30%, from about 2% to about 45%, from about 2% to about 40%, from about 2% to about 35%, from about 2% to about 30%, from about 2% to about 25%, from about 5% to about 45%, from about 5% to about 40%, from about 5% to about 35%, from about 5% to about 30%, from about 10% to about 45%, from about 10% to about 40%, from about 10% to about 35% or from about 10% to about 30% by mole, based on the total number of moles of monomeric units in the copolymer in the polymeric material.

In some embodiments, the proportion of each of structural unit (d) derived from a hydroxyl group-containing monomer, structural unit (e) derived from an ester group-containing monomer, structural unit (f) derived from an epoxy group-containing monomer, structural unit (g) derived from a fluorine-containing monomer, structural unit (h) derived from an amine group-containing monomer, a structural unit (i) derived from an ether group-containing monomer and a structural unit (j) derived from a carbonyl group-containing monomer is independently less than 80%, less than 70%, less than 60%, less than 50%, less than 45%, less than 40%, less than 35%, less than 30%, less than 25%, less than 20%, less than 15%, less than 10% or less than 5% by mole, based on the total number of moles of monomeric units in the copolymer in the polymeric material.

In some embodiments, the proportion of each of structural unit (d) derived from a hydroxyl group-containing monomer, structural unit (e) derived from an ester group-containing monomer, structural unit (f) derived from an epoxy group-containing monomer, structural unit (g) derived from a fluorine-containing monomer, structural unit (h) derived from an amine group-containing monomer, a structural unit (i) derived from an ether group-containing monomer and a structural unit (j) derived from a carbonyl group-containing monomer is independently more than 0%, more than 5%, more than 10%, more than 15%, more than 20%, more than 25%, more than 30%, more than 35%, more than 40%, more than 50%, more than 60% or more than 70% by mole, based on the total number of moles of monomeric units in the copolymer in the polymeric material.

In other embodiments, the copolymer may additionally comprise a structural unit derived from an olefin. Any hydrocarbon that has at least one carbon-carbon double bond may be used as an olefin without any specific limitations. In some embodiments, the olefin includes a $C_2$ to $C_{20}$ aliphatic compound, a $C_8$ to $C_{20}$ aromatic compound or a cyclic compound containing vinylic unsaturation, a $C_4$ to $C_{40}$ diene or a combination thereof. In some embodiments, the olefin is styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene, cyclooctene or a combination thereof. In some embodiments, the copolymer does not comprise a structural unit derived from an olefin. In some embodiments, the copolymer does not comprise styrene, ethylene, propylene, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, cyclobutene, 3-methyl-1-pentene, 4-methyl-1-pentene, 4,6-dimethyl-1-heptene, 4-vinylcyclohexene, vinyl cyclohexane, norbornene, norbornadiene, ethylidene norbornene, cyclopentene, cyclohexene, dicyclopentadiene or cyclooctene.

A conjugated diene group-containing monomer constitutes as an olefin. In some embodiments, a conjugated diene group-containing monomer is $C_4$ to $C_{40}$ dienes, aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene, substituted linear conjugated pentadienes, substituted side chain conjugated hexadienes or a combination thereof. In some embodiments, the copolymer does not comprise $C_4$ to $C_{40}$ dienes, aliphatic conjugated diene monomers such as 1,3-butadiene, 1,3-pentadiene, 1,4-hexadiene, 1,5-hexadiene, 1,7-octadiene, 1,9-decadiene, isoprene, myrcene, 2-methyl-1,3-butadiene, 2,3-dimethyl-1,3-butadiene, 2-chloro-1,3-butadiene, substituted linear conjugated pentadienes or substituted side chain conjugated hexadienes.

In other embodiments, the copolymer may additionally comprise a structural unit derived from an aromatic vinyl group-containing monomer. In some embodiments, the aromatic vinyl group-containing monomer is styrene, α-methylstyrene, vinyltoluene, divinylbenzene or a combination thereof. In some embodiments, the copolymer does not comprise a structural unit derived from an aromatic vinyl group-containing monomer. In some embodiments, the copolymer does not comprise styrene, α-methylstyrene, vinyltoluene or divinylbenzene.

In some embodiments, the viscosity of the polymeric composition is from about 1,000 mPa·s to about 100,000 mPa·s, from about 5,000 mPa·s to about 100,000 mPa·s, from about 5,000 mPa·s to about 30,000 mPa·s, from about 10,000 mPa·s to about 100,000 mPa·s, from about 10,000 mPa·s to about 50,000 mPa·s, from about 10,000 mPa·s to about 30,000 mPa·s, from about 10,000 mPa·s to about 15,000 mPa·s, from about 11,000 mPa·s to about 15,000 mPa·s, from about 12,000 mPa·s to about 15,000 mPa·s, from about 10,000 mPa·s to about 14,000 mPa·s, from about 10,000 mPa·s to about 13,000 mPa·s, from about 10,000 mPa·s to about 12,000 mPa·s, from about 10,000 mPa·s to about 11,000 mPa·s, from about 11,000 mPa·s to about 13,000 mPa·s, from about 11,000 mPa·s to about 14,000 mPa·s, from about 12,000 mPa·s to about 14,000 mPa·s or from about 12,000 mPa·s to about 13,000 mPa·s.

In some embodiments, the viscosity of the polymeric composition is less than 100,000 mPa·s, less than 50,000 mPa·s, less than 30,000 mPa·s, less than 15,000 mPa·s, less than 14,500 mPa·s, less than 14,000 mPa·s, less than 13,500 mPa·s, less than 13,000 mPa·s, less than 12,500 mPa·s, less than 12,000 mPa·s, less than 11,500 mPa·s, less than 11,000 mPa·s or less than 10,500 mPa·s. In some embodiments, the viscosity of the polymeric composition is more than 10,000 mPa·s, more than 10,500 mPa·s, more than 11,000 mPa·s, more than 11,500 mPa·s, more than 12,000 mPa·s, more than 12,500 mPa·s, more than 13,000 mPa·s, more than 13,500 mPa·s, more than 14,000 mPa·s, more than 14,500 mPa·s, more than 30,000 mPa·s, more than 50,000 mPa·s or more than 75,000 mPa·s.

In some embodiments, the weight average molecular weight of the polymeric material is from about 50,000 g/mol to about 200,000 g/mol, from about 60,000 g/mol to about 200,000 g/mol, from about 70,000 g/mol to about 200,000 g/mol, from about 80,000 g/mol to about 200,000 g/mol, from about 90,000 g/mol to about 200,000 g/mol, from about 90,000 g/mol to about 190,000 g/mol, from about 90,000 g/mol to about 180,000 g/mol, from about 90,000 g/mol to about 170,000 g/mol, from about 90,000 g/mol to about 160,000 g/mol, from about 95,000 g/mol to about 160,000 g/mol, from about 100,000 g/mol to about 160,000 g/mol, from about 100,000 g/mol to about 150,000 g/mol or from about 100,000 g/mol to about 140,000 g/mol.

In some embodiments, the weight average molecular weight of the polymeric material is less than 200,000 g/mol, less than 190,000 g/mol, less than 180,000 g/mol, less than 170,000 g/mol, less than 160,000 g/mol, less than 150,000 g/mol, less than 140,000 g/mol, less than 130,000 g/mol, less than 120,000 g/mol, less than 110,000 g/mol, less than 100,000 g/mol, less than 90,000 g/mol, less than 80,000 g/mol, less than 70,000 g/mol or less than 60,000 g/mol. In some embodiments, the weight average molecular weight of the polymeric material is more than 50,000 g/mol, more than 60,000 g/mol, more than 70,000 g/mol, more than 80,000 g/mol, more than 90,000 g/mol, more than 100,000 g/mol, more than 110,000 g/mol, more than 120,000 g/mol, more than 130,000 g/mol, more than 140,000 g/mol, more than 150,000 g/mol, more than 160,000 g/mol, more than 170,000 g/mol, more than 180,000 g/mol or more than 190,000 g/mol.

The polymeric material applied in the present invention exhibits exceptionally strong binding capability. One way in assessing the strength of the adhesion property of a polymeric material is via the adhesive strength between a polymeric material and a current collector. It is important for the polymeric material to have good adhesive strength to the current collector as it promotes the binding force of the electrode layer to the current collector in the making of battery electrode, prevents separation and enhances the mechanical stability of the electrode. In some embodiments, the adhesive strength between the polymeric material and the current collector is from about 2 N/cm to about 6 N/cm, from about 2 N/cm to about 5.5 N/cm, from about 2 N/cm to about 5 N/cm, from about 2 N/cm to about 4.5 N/cm, from about 2 N/cm to about 4 N/cm, from about 2 N/cm to about 3.9 N/cm, from about 2 N/cm to about 3.8 N/cm, from about 2 N/cm to about 3.7 N/cm, from about 2 N/cm to about 3.6 N/cm, from about 2 N/cm to about 3.5 N/cm, from about 2 N/cm to about 3.4 N/cm, from about 2 N/cm to about 3.3 N/cm, from about 2 N/cm to about 3.2 N/cm, from about 2 N/cm to about 3.1 N/cm, from about 2 N/cm to about 3 N/cm, from about 2.2 N/cm to about 6 N/cm, from about 2.4 N/cm to about 6 N/cm, from about 2.6 N/cm to about 6 N/cm, from about 2.8 N/cm to about 6 N/cm, from about 3 N/cm to about 6 N/cm, from about 3.2 N/cm to about 6 N/cm, from about 3.4 N/cm to about 6 N/cm, from about 3.6 N/cm to about 6 N/cm, from about 3.8 N/cm to about 6 N/cm, from about 4 N/cm to about 6 N/cm, from about 2.5 N/cm to about 5.5 N/cm, from about 2.5 N/cm to about 5 N/cm, from about 2.5 N/cm to about 4.5 N/cm, from about 2.5 N/cm to about 4 N/cm, from about 2.5 N/cm to about 3.5 N/cm, from about 3 N/cm to about 5 N/cm, from about 2.2 N/cm to about 4.2 N/cm or from about 2.2 N/cm to about 5.2 N/cm.

In some embodiments, the adhesive strength between the polymeric material and the current collector is less than 6 N/cm, less than 5.5 N/cm, less than 5 N/cm, less than 4.5 N/cm, less than 4 N/cm, less than 3.8 N/cm, less than 3.6 N/cm, less than 3.4 N/cm, less than 3.2 N/cm, less than 3 N/cm, less than 2.8 N/cm, less than 2.6 N/cm, less than 2.4 N/cm or less than 2.2 N/cm. In some embodiments, the adhesive strength between the polymeric material and the current collector is more than 2 N/cm, more than 2.2 N/cm, more than 2.4 N/cm, more than 2.6 N/cm, more than 2.8 N/cm, more than 3 N/cm, more than 3.2 N/cm, more than 3.4 N/cm, more than 3.6 N/cm, more than 3.8 N/cm, more than 4 N/cm, more than 4.2 N/cm, more than 4.4 N/cm, more than 4.6 N/cm, more than 4.8 N/cm, more than 5 N/cm or more than 5.5 N/cm.

In some embodiments, the conductive composition comprises a polymeric material, a carbon nanomaterial and an anionic stabilizing agent. In some embodiments, the conductive composition further comprises an aqueous solvent.

In some embodiments, the amount of polymeric material in the conductive composition is from about 40% to about 99.9%, from about 45% to about 99.9%, from about 50% to about 99.9%, from about 55% to about 99.9%, from about 60% to about 99.9%, from about 40% to about 96%, from about 45% to about 96%, from about 50% to about 96%, from about 55% to about 96%, from about 60% to about 96%, from about 40% to about 94%, from about 45% to about 94%, from about 50% to about 94%, from about 55% to about 94%, from about 60% to about 94%, from about 40% to about 92%, from about 45% to about 92%, from about 50% to about 92%, from about 55% to about 92%, from about 60% to about 92%, from about 40% to about 90%, from about 45% to about 90%, from about 50% to about 90%, from about 55% to about 90%, from about 60% to about 90%, from about 40% to about 85%, from about 45% to about 85% or from about 50% to about 85% by weight, based on the total weight of solids in the conductive composition.

In some embodiments, the amount of polymeric material in the conductive composition is more than 40%, more than 45%, more than 50%, more than 55%, more than 60%, more than 65%, more than 70%, more than 75%, more than 80%, more than 85%, more than 90% or more than 95% by weight, based on the total weight of solids in the conductive composition. In some embodiments, the amount of polymeric material in the conductive composition is less than 99.9%, less than 95%, less than 90%, less than 85%, less than 80%, less than 75%, less than 70%, less than 65%, less than 60%, less than 55%, less than 50% or less than 45% by weight, based on the total weight of solids in the conductive composition.

In some embodiments, the amount of polymeric material in the conductive composition is from about 1% to about 40%, from about 1% to about 35%, from about 1% to about 30%, from about 1% to about 25%, from about 1% to about 20%, from about 1% to about 18%, from about 1% to about 16%, from about 1% to about 14%, from about 1% to about 12%, from about 1% to about 10%, from about 5% to about 40%, from about 5% to about 35%, from about 5% to about 30%, from about 5% to about 25%, from about 5% to about 20%, from about 5% to about 18%, from about 5% to about 15%, from about 10% to about 40%, from about 10% to about 30%, from about 10% to about 20%, from about 15% to about 40% or from about 20% to about 40% by weight, based on the total weight of the conductive composition.

In certain embodiments, the amount of polymeric material in the conductive composition is less than 40%, less than 35%, less than 30%, less than 25%, less than 20%, less than 15%, less than 10% or less than 5% by weight, based on the total weight of the conductive composition. In some embodiments, the amount of polymeric material in the conductive composition is more than 1%, more than 3%, more than 5%, more than 10%, more than 15%, more than 20%, more than 25%, more than 30% or more than 35% by weight, based on the total weight of the conductive composition.

In some embodiments, the amount of carbon nanomaterial in the conductive composition is from about 0.1% to about 45%, from about 0.1% to about 40%, from about 0.1% to about 35%, from about 0.1% to about 30%, from about 0.1% to about 25%, from about 0.1% to about 20%, from about 0.1% to about 15%, from about 0.5% to about 45%, from about 0.5% to about 40%, from about 0.5% to about 35%, from about 0.5% to about 30%, from about 0.5% to about 25%, from about 0.5% to about 20%, from about 0.5% to about 15%, from about 1% to about 45%, from about 1% to about 40%, from about 1% to about 35%, from about 1% to about 30%, from about 1% to about 25%, from about 1% to about 20%, from about 2% to about 45%, from about 2% to about 40%, from about 2% to about 35%, from about 2% to about 30%, from about 2% to about 25%, from about 2% to about 20%, from about 4% to about 45%, from about 4% to about 40%, from about 4% to about 35%, from about 4% to about 30%, from about 4% to about 25% or from about 4% to about 20% by weight, based on the total weight of solids in the conductive composition.

In certain embodiments, the amount of carbon nanomaterial in the conductive composition is more than 0.1%, more than 0.5%, more than 1%, more than 2%, more than 4%, more than 6%, more than 8%, more than 10%, more than 15%, more than 20%, more than 25%, more than 30%, more than 35% or more than 40% by weight, based on the total weight of solids in the conductive composition. In some embodiments, the amount of carbon nanomaterial in the conductive composition is less than 45%, less than 43%, less than 40%, less than 38%, less than 36%, less than 34%, less than 32%, less than 30%, less than 25%, less than 20%, less than 15%, less than 10%, less than 5% or less than 1% by weight, based on the total weight of solids in the conductive composition.

In some embodiments, the amount of carbon nanomaterial in the conductive composition is from about 0.1% to about 5%, from about 0.1% to about 4.5%, from about 0.1% to about 4%, from about 0.1% to about 3.5%, from about 0.1% to about 3%, from about 0.2% to about 5%, from about 0.2% to about 4.5%, from about 0.2% to about 4%, from about 0.2% to about 3.5%, from about 0.2% to about 3%, from about 0.4% to about 5%, from about 0.4% to about 4.5%, from about 0.4% to about 4%, from about 0.4% to about 3.5%, from about 0.4% to about 3%, from about 0.5% to about 5%, from about 0.5% to about 4% or from about 0.5% to about 3% by weight, based on the total weight of the conductive composition.

In some embodiments, the amount of carbon nanomaterial in the conductive composition is more than 0.1%, more than 0.5%, more than 1%, more than 1.5%, more than 2%, more than 2.5%, more than 3%, more than 3.5%, more than 4% or more than 4.5% by weight, based on the total weight of the conductive composition. In some embodiments, the amount of carbon nanomaterial in the conductive composition is less than 5%, less than 4.5%, less than 4%, less than 3.5%, less than 3%, less than 2.5%, less than 2%, less than 1.5%, less than 1% or less than 0.5% by weight, based on the total weight of the conductive composition.

The amount of the anionic stabilizing agent applied is critical for the stability between the carbon nanotubes and polymeric material as well as homogeneous dispersion of carbon nanotubes. In general, if an inadequate quantity of anionic stabilizing agent is used, flocculation of carbon nanotubes will likely take place, and hence the full benefits of carbon nanotube as conductivity enhancer will not be realized. If an excessive quantity of anionic stabilizing agent is used, overcrowding of anionic stabilizing agent on the carbon nanotube surface and reduction in the breadth of the protective barrier will be resulted, and thus cathode produced therefrom will exhibit an inferior performance.

In some embodiments, the amount of the anionic stabilizing agent in the conductive composition is from about 0.6% to about 7%, from about 0.6% to about 6.8%, from about 0.6% to about 6.6%, from about 0.6% to about 6.4%, from about 0.6% to about 6.2%, from about 0.6% to about 6%, from about 0.6% to about 5.5%, from about 0.6% to about 5%, from about 0.6% to about 4.5%, from about 0.6% to about 4%, from about 0.6% to about 3.5%, from about 0.6% to about 3%, from about 0.6% to about 2.5%, from about 0.6% to about 2%, from about 0.7% to about 7%, from about 0.7% to about 6.8%, from about 0.7% to about 6.6%, from about 0.7% to about 6.4%, from about 0.7% to about 6.2%, from about 0.7% to about 6%, from about 0.7% to about 5.5%, from about 0.7% to about 5%, from about 0.7% to about 4.5%, from about 0.7% to about 4%, from about 0.7% to about 3.5%, from about 0.7% to about 3%, from about 0.7% to about 2.5%, from about 0.7% to about 2%, from about 0.8% to about 7%, from about 0.8% to about 6.8%, from about 0.8% to about 6.6%, from about 0.8% to about 6.4%, from about 0.8% to about 6.2%, from about 0.8% to about 6%, from about 0.8% to about 5.5%, from about 0.8% to about 5%, from about 0.8% to about 4.5%, from about 0.8% to about 4%, from about 0.8% to about 3.5%, from about 0.8% to about 3%, from about 0.8% to about 2.5%, from about 0.8% to about 2%, from about 1% to about 7%, from about 1% to about 6% or from about 1% to about 4% by weight, based on the total weight of solids in the conductive composition.

In some embodiments, the amount of the anionic stabilizing agent in the conductive composition is more than 0.6%, more than 0.7%, more than 0.8%, more than 0.9%, more than 1%, more than 1.5%, more than 2%, more than 2.5%, more than 3%, more than 3.5%, more than 4%, more than 4.5%, more than 5%, more than 5.5%, more than 6% or more than 6.5% by weight, based on the total weight of solids in the conductive composition. In some embodiments, the amount of the anionic stabilizing agent in the conductive composition is less than 7%, less than 6.5%, less than 6%, less than 5.5%, less than 5%, less than 4.5%, less than 4%, less than 3.5%, less than 3%, less than 2.5%, less than 2%, less than 1.5%, less than 1%, less than 0.9% or less than 0.8% by weight, based on the total weight of solids in the conductive composition.

In some embodiments, the amount of the anionic stabilizing agent in the conductive composition is from about 0.08% to about 0.6%, from about 0.08% to about 0.58%, from about 0.08% to about 0.56%, from about 0.08% to about 0.54%, from about 0.08% to about 0.52%, from about 0.08% to about 0.5%, from about 0.08% to about 0.48%, from about 0.08% to about 0.46%, from about 0.08% to about 0.44%, from about 0.08% to about 0.42%, from about 0.08% to about 0.4%, from about 0.08% to about 0.38%, from about 0.08% to about 0.36% to about 0.08% to about 0.34%, from about 0.08% to about 0.32%, from about 0.08% to about 0.3%, from about 0.1% to about 0.6%, from about 0.1% to about 0.58%, from about 0.1% to about 0.56%, from about 0.1% to about 0.54%, from about 0.1% to about 0.52%, from about 0.1% to about 0.5%, from about 0.1% to about 0.48%, from about 0.1% to about 0.46%, from about 0.1% to about 0.44%, from about 0.1% to about 0.42%, from about 0.1% to about 0.4%, from about 0.1% to about 0.38%, from about 0.1% to about 0.36%, from about 0.1% to about 0.34%, from about 0.1% to about 0.32% or from about 0.1% to about 0.3% by weight, based on the total weight of the conductive composition.

In some embodiments, the amount of the anionic stabilizing agent in the conductive composition is less than 0.6%, less than 0.56%, less than 0.52%, less than 0.48%, less than 0.44%, less than 0.4%, less than 0.36%, less than 0.32%, less than 0.28%, less than 0.24%, less than 0.2% or less than 0.16% by weight, based on the total weight of the conductive composition. In some embodiments, the amount of anionic stabilizing agent in the conductive composition is more than 0.08%, more than 0.12%, more than 0.16%, more than 0.2%, more than 0.24%, more than 0.28%, more than 0.32%, more than 0.36%, more than 0.4%, more than 0.44%, more than 0.48% or more than 0.52% by weight, based on the total weight of the conductive composition.

In some embodiments, the weight ratio of the polar group-containing monomer that assists in the construction of the polymeric material to the carbon nanomaterial is from about 0.1 to about 20, from about 0.1 to about 15, from about 0.1 to about 10, from about 0.1 to about 9.5, from about 0.1 to about 9, from about 0.1 to about 8.5, from about 0.1 to about 8, from about 0.1 to about 7.5, from about 0.1 to about 7, from about 0.2 to about 7, from about 0.3 to about 7, from about 0.4 to about 7, from about 0.5 to about 7, from about 0.6 to about 7, from about 0.7 to about 7, from about 0.8 to about 7, from about 0.9 to about 7, from about 1 to about 20, from about 1 to about 15, from about 1 to about 10, from about 1 to about 7, from about 1 to about 5, from about 2 to about 20, from about 2 to about 10, from about 2 to about 7 or from about 3 to about 6.

In certain embodiments, the weight ratio of the polar group-containing monomer that assists in the construction of the polymeric material to the carbon nanomaterial is less than 20, less than 15, less than 10, less than 9.5, less than 9, less than 8.5, less than 8, less than 7.5, less than 7, less than 6.5, less than 6, less than 5.5, less than 5, less than 4.5, less than 4, less than 3.5, less than 3, less than 2.5, less than 2, less than 1.5, less than 1 or less than 0.5. In certain embodiments, the weight ratio of the polar group-containing monomer that assists in the construction of the polymeric material to the carbon nanomaterial is more than 0.1, more than 0.5, more than 1, more than 1.5, more than 2, more than 2.5, more than 3, more than 3.5, more than 4, more than 4.5, more than 5, more than 5.5, more than 6, more than 6.5, more than 7, more than 7.5, more than 8, more than 8.5, more than 9 or more than 9.5.

In some embodiments, the weight ratio of the acid group-containing monomer that assists in the construction of the polymeric material to the anionic stabilizing agent is from about 4.5 to about 65, from about 4.5 to about 60, from about 4.5 to about 55, from about 4.5 to about 50, from about 4.5 to about 45, from about 4.5 to about 40, from about 4.5 to about 35, from about 4.5 to about 30, from about 5 to about 65, from about 5 to about 60, from about 5 to about 55, from about 5 to about 50, from about 5 to about 45, from about 5 to about 40, from about 5 to about 35, from about 5 to about 30, from about 7 to about 65, from about 7 to about 60, from about 7 to about 55, from about 7 to about 50, from about 7 to about 45, from about 7 to about 40, from about 7 to about 35, from about 7 to about 30, from about 10 to about 65, from about 10 to about 60, from about 10 to about 55, from about 10 to about 50, from about 10 to about 45, from about 10 to about 40, from about 10 to about 35, from about 10 to about 30, from about 15 to about 65, from about 15 to about 60, from about 15 to about 55, from about 15 to about 50, from about 15 to about 45, from about 15 to about 40, from about 20 to about 65, from about 20 to about 60, from about 20 to about 55, from about 20 to about 50, from about 20 to about 45 or from about 20 to about 40.

In certain embodiments, the weight ratio of the acid group-containing monomer that assists in the construction of the polymeric material to the anionic stabilizing agent is less than 65, less than 60, less than 55, less than 50, less than 45, less than 40, less than 35, less than 30, less than 25, less than 20, less than 15, less than 10 or less than 5. In certain embodiments, the weight ratio of the acid group-containing monomer that assists in the construction of the polymeric material to the anionic stabilizing agent is more than 4.5, more than 6, more than 10, more than 15, more than 20, more than 25, more than 30, more than 35, more than 40, more than 45, more than 50, more than 55 or more than 60.

In some embodiments, the weight ratio of the anionic stabilizing agent to carbon nanomaterial is from about 0.1% to about 45%, from about 0.1% to about 40%, from about 0.1% to about 35%, from about 0.1% to about 30%, from about 0.1% to about 25%, from about 0.1% to about 20%, from about 1% to about 45%, from about 1% to about 40%, from about 1% to about 35%, from about 1% to about 30%, from about 1% to about 25%, from about 1% to about 20%, from about 3% to about 45%, from about 3% to about 40%, from about 3% to about 35%, from about 3% to about 30%, from about 3% to about 25%, from about 3% to about 20%, from about 5% to about 45%, from about 5% to about 40%, from about 5% to about 35%, from about 5% to about 30%, from about 5% to about 25%, from about 5% to about 20%, from about 7% to about 25%, from about 7% to about 20%, from about 9% to about 25%, from about 9% to about 20% or from about 11% to about 25%. By further reducing proportion of anionic stabilizing agent below this range, the assisted stabilization and dispersion effect is inadequate, thus leading to flocculation of the polymeric material surrounding the carbon nanotubes. With increasing anionic stabilizing agent content beyond this range, the slurry exhibits higher viscosity with increasingly severe foaming effect of the anionic stabilizing agent that cannot be applied as a normal coating.

In some embodiments, the weight ratio of the anionic stabilizing agent to carbon nanomaterial is less than 45%, less than 40%, less than 35%, less than 30%, less than 28%, less than 26%, less than 24%, less than 22%, less than 20%, less than 18%, less than 16%, less than 14% or less than 12%. In some embodiments, the weight ratio of anionic stabilizing agent to carbon nanomaterial is more than 0.1%, more than 1%, more than 2%, more than 4%, more than 6%, more than 8%, more than 10%, more than 12%, more than 14%, more than 16% or more than 18%.

Figure 5:
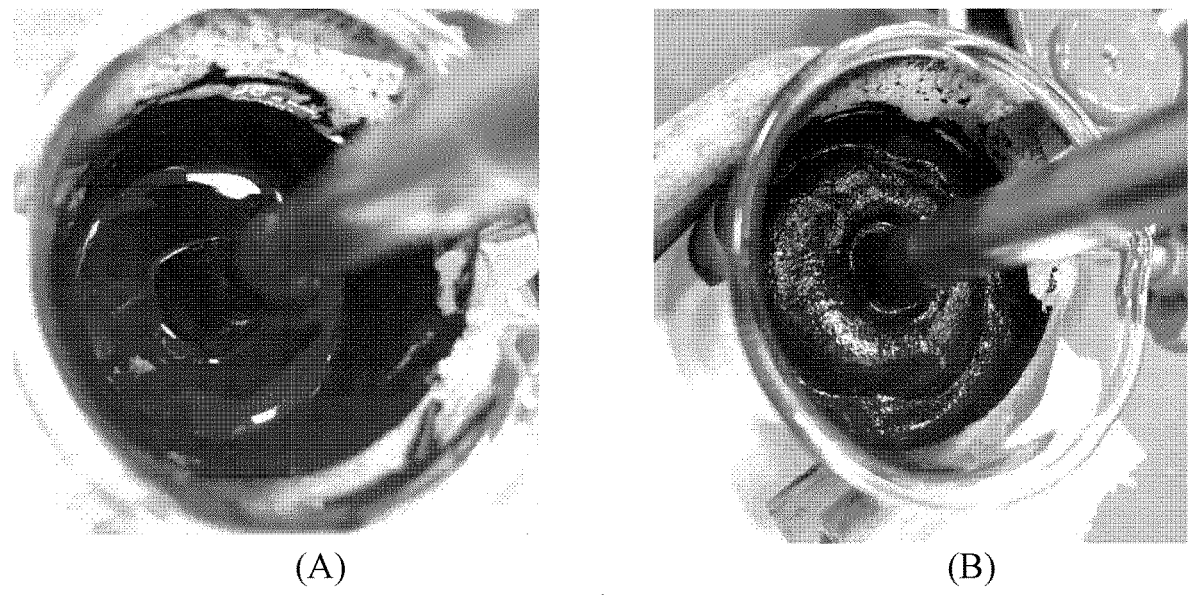
FIGS. 5A and 5B depict the cathode slurry with the weight ratio of anionic stabilizing agent to carbon nanotubes being 10% and 50% respectively.

FIGS. 5A and 5B depict the cathode slurry with the ratio of anionic stabilizing agent to carbon nanotubes being 10% and 50% by weight respectively. It can be seen that the cathode slurry of the present invention with the anionic stabilizing agent to carbon nanotubes ratio of 10% by weight can regulate interactions between the carbon nanotubes and polymeric material, which results in a smooth, stable and well-dispersed slurry. With an anionic stabilizing agent to carbon nanotubes ratio of 50% by weight, the cathode slurry exhibits high viscosity with severe foaming.

In certain embodiments, the weight ratio of the polymeric material to anionic stabilizing agent is from about 11 to about 155, from about 11 to about 125, from about 11 to about 100, from about 11 to about 90, from about 11 to about 80, from about 15 to about 155, from about 15 to about 125, from about 15 to about 100, from about 15 to about 90, from about 15 to about 80, from about 20 to about 155, from about 20 to about 125, from about 20 to about 100, from about 20 to about 90, from about 20 to about 80, from about 25 to about 155, from about 25 to about 125, from about 25 to about 100, from about 25 to about 80, from about 30 to about 155, from about 30 to about 125, from about 30 to about 100, from about 30 to about 80, from about 35 to about 155, from about 40 to about 125, from about 40 to about 100, from about 40 to about 80, from about 45 to about 155, from about 45 to about 125, from about 45 to about 100, from about 45 to about 80.

In some embodiments, the weight ratio of the polymeric material to the anionic stabilizing agent is less than 155, less than 145, less than 135, less than 125, less than 115, less than 105, less than 95, less than 85, less than 75, less than 65, less than 55, less than 45, less than 35, less than 25 or less than 15. In some embodiments, the weight ratio of the polymeric material to the anionic stabilizing agent is more than 11, more than 15, more than 25, more than 35, more than 45, more than 55, more than 65, more than 75, more than 85, more than 95, more than 105, more than 115, more than 125, more than 135 or more than 145.

In some embodiments, the weight ratio of the polymeric material to carbon nanomaterial is from about 0.5 to about 30, from about 0.5 to about 25, from about 0.5 to about 20, from about 0.5 to about 15, from about 0.5 to about 10, from about 1 to about 30, from about 1 to about 25, from about 1 to about 20, from about 1 to about 15, from about 1 to about 10, from about 2 to about 30, from about 2 to about 25, from about 2 to about 20, from about 2 to about 15, from about 2 to about 10, from about 5 to about 30, from about 5 to about 25, from about 5 to about 20, from about 5 to about 15 or from about 5 to about 10.

In some embodiments, the weight ratio of the polymeric material to carbon nanomaterial is less than 30, less than 26, less than 22, less than 18, less than 14, less than 10, less than 6 or less than 4. In some embodiments, the weight ratio of the polymeric material to carbon nanomaterial is more than 0.5, more than 1, more than 2, more than 6, more than 10, more than 14, more than 18, more than 22 or more than 26.

Exposing carbon nanomaterials to acidic condition is discovered to intensify agglomeration tendency. For that reason, the pH of the conductive composition is an important feature in governing the extent of dispersion of carbon nanomaterials. In some embodiments, the pH of the conductive composition is from about 7 to about 14, from about 7.5 to about 14, from about 8 to about 14, from about 8 to about 13.5, from about 8 to about 13, from about 8 to about 12.5, from about 8 to about 12, from about 8 to about 11.5, from about 8 to about 11, from about 8 to about 10.5, from about 8 to about 10, from about 8 to about 9, from about 9 to about 14, from about 9 to about 13, from about 9 to about 12, from about 9 to about 11, from about 10 to about 14, from about 10 to about 13, from about 10 to about 12, from about 10 to about 11, from about 10.5 to about 14, from about 10.5 to about 13.5, from about 10.5 to about 13, from about 10.5 to about 12.5, from about 10.5 to about 12, from about 10.5 to about 11.5, from about 11 to about 14, from about 11 to about 13, from about 11 to about 12, from about 11.5 to about 12.5, from about 11.5 to about 12, or from about 12 to about 14.

In certain embodiments, the pH of the conductive composition is less than 14, less than 13.5, less than 13, less than 12.5, less than 12, less than 11.5, less than 11, less than 10.5, less than 10, less than 9.5, less than 9, less than 8.5, less than 8 or less than 7.5. In some embodiments, the pH of the conductive composition is more than 7, more than 7.5, more than 8, more than 8.5, more than 9, more than 9.5, more than 10, more than 10.5, more than 11, more than 11.5, more than 12, more than 12.5, more than 13 or more than 13.5.

The conductive composition has a viscosity range very suitable to be made as an electrode slurry. In some embodiments, the viscosity of the conductive composition is from about 1,000 mPa·s to about 50,000 mPa·s, from about 3,000 mPa·s to about 15,000 mPa·s, from about 4,000 mPa·s to about 15,000 mPa·s, from about 5,000 mPa·s to about 15,000 mPa·s, from about 6,000 mPa·s to about 15,000 mPa·s, from about 6,000 mPa·s to about 14,000 mPa·s, from about 6,000 mPa·s to about 13,000 mPa·s, from about 6,000 mPa·s to about 12,000 mPa·s, from about 7,000 mPa·s to about 14,000 mPa·s, from about 7,000 mPa·s to about 13,000 mPa·s, from about 8,000 mPa·s to 14,000 mPa·s, from about 8,000 mPa·s to about 13,000 mPa·s or from about 8,000 mPa·s to about 12,000 mPa·s.

In certain embodiments, the viscosity of the conductive composition is less than 50,000 mPa·s, less than 30,000 mPa·s, less than 15,000 mPa·s, less than 14,000 mPa·s, less than 13,000 mPa·s, less than 12,000 mPa·s, less than 11,000 mPa·s, less than 10,000 mPa·s, less than 9,000 mPa·s, less than 8,000 mPa·s, less than 7,000 mPa·s, less than 6,000 mPa·s or less than 5,000 mPa·s. In some embodiments, the viscosity of the conductive composition is more than 3,000 mPa·s, more than 4,000 mPa·s, more than 5,000 mPa·s, more than 6,000 mPa·s, more than 7,000 mPa·s, more than 8,000 mPa·s, more than 9,000 mPa·s, more than 10,000 mPa·s, more than 11,000 mPa·s, more than 12,000 mPa·s, more than 13,000 mPa·s, more than 14,000 mPa·s, more than 30,000 mPa·s or more than 45,000 mPa·s.

In some embodiments, the conductive composition may be mixed for a time period from about 5 mins to about 120 mins, from about 5 mins to about 110 mins, from about 5 mins to about 100 mins, from about 5 mins to about 90 mins, from about 5 mins to about 80 mins, from about 15 mins to about 80 mins, from about 25 mins to about 80 mins, from about 35 mins to about 80 mins, from about 45 mins to about 80 mins, from about 30 mins to about 90 mins or from about 40 mins to about 80 mins.

In some embodiments, the conductive composition may be mixed for a time period of more than 5 mins, more than 15 mins, more than 25 mins, more than 35 mins, more than 45 mins, more than 55 mins, more than 65 mins, more than 75 mins, more than 85 mins, more than 95 mins, more than 105 mins or more than 115 mins. In some embodiments, the conductive composition may be mixed for a time period of less than 120 mins, less than 110 mins, less than 100 mins, less than 90 mins, less than 80 mins, less than 70 mins, less than 60 mins, less than 50 mins, less than 40 mins, less than 30 mins, less than 20 mins or less than 10 mins. This allows sufficient time for uniform and stable dispersion of the carbon nanomaterials (and thus the conductive composition) following the addition of polymeric material.

In certain embodiments, the conductive composition may be mixed at a temperature from about 5° C. to about 50° C., from about 5° C. to about 40° C., from about 5° C. to about 30° C., from about 5° C. to about 25° C., from about 5° C. to about 20° C., from about 10° C. to about 30° C., from about 10° C. to about 25° C., or from about 10° C. to about 20° C. In some embodiments, the conductive composition may be mixed at a temperature of less than 50° C., less than 40° C., less than 30° C., less than 25° C., less than 20° C., less than 15° C. or less than 10° C. In some embodiments, the conductive composition may be mixed at a temperature of more than 5° C., more than 10° C., more than 15° C., more than 20° C., more than 25° C., more than 30° C. or more than 40° C.

The sequence of addition of the anionic stabilizing agent, the carbon nanomaterial and the polymeric material as disclosed in the present invention is crucial in governing the stabilization of the conductive composition, which in turn affects its dispersibility. The carbon nanomaterial should be mixed/pre-mixed with the anionic stabilizing agent prior to the incorporation of polymeric material. Addition of polymeric material to either a stand-alone carbon nanomaterial or anionic stabilizing agent would most likely result in an agglomerated conductive composition, and thus is not recommended in the present invention.

In some embodiments, an anionic stabilizing agent is dispersed in an aqueous solvent to form a first suspension. A carbon nanomaterial is then dispersed in the first suspension to form a second suspension. Subsequently, a polymeric material is dispersed in the second suspension to form a conductive composition.

In some embodiments, a carbon nanomaterial and an anionic stabilizing agent are dispersed in an aqueous solvent to form a first suspension. A polymeric material is then dispersed in the first suspension to form a conductive composition.

In some embodiments, a polymeric material is dispersed in an aqueous solvent to form a first suspension. Subsequently, a carbon nanomaterial and an anionic stabilizing agent are dispersed in an aqueous solvent to form a second suspension which is then dispersed in the first suspension to form a conductive composition.

In some embodiments, a third suspension is formed by dispersing a conductive agent in the conductive composition in step 104.

The conductive agent in the slurry is for enhancing the electrically-conducting property of an electrode. Any suitable material can act as the conductive agent. In some embodiments, the conductive agent is a carbonaceous material. Some non-limiting examples include carbon, carbon black, graphite, expanded graphite, graphene, graphene nanoplatelets, carbon fibers, carbon nano-fibers, graphitized carbon flake, carbon tubes, activated carbon, Super P, 0-dimensional KS6, 1-dimensional vapor grown carbon fibers (VGCF), mesoporous carbon and combinations thereof. In further embodiments, zero-dimensional carbon-based particles can only provide electronic pathways through point-to-point contact between particles and active materials, which demonstrates limited electrical conductivity. To take advantage of shape synergistic effect, carbon nanomaterials or carbon nanotubes can be applied in conjunction with zero-dimensional carbon-based particles to help further improve the electrical contact between various particles in cathodes by forming a three-dimensional conductive network.

To attain full utilization of the synergistic effect of carbon nanomaterial and conductive agent in cathode manufacturing, the carbon nanomaterial to conductive agent weight ratio in the slurry mix is critical. In some embodiments, the weight ratio of the carbon nanomaterial to the conductive agent is from about 1% to about 35%, from about 1% to about 30%, from about 1% to about 25%, from about 1% to about 20%, from about 1% to about 18%, from about 1% to about 16%, from about 2% to about 35%, from about 2% to about 30%, from about 2% to about 25%, from about 2% to about 20%, from about 2% to about 18%, from about 2% to about 16%, from about 3% to about 35%, from about 3% to about 30%, from about 3% to about 25%, from about 3% to about 20%, from about 3% to about 18%, from about 3% to about 16%, from about 4% to about 20%, from about 4% to about 15%, from about 5% to about 20%, from about 5% to about 15%, from about 6% to about 20%, from about 6% to about 15%, from about 7% to about 20%, from about 7% to about 15%, from about 8% to about 20% or from about 8% to about 15%.

In some embodiments, the weight ratio of the carbon nanomaterial to the conductive agent is less than 35%, less than 30%, less than 25%, less than 20%, less than 18%, less than 16%, less than 14%, less than 12%, less than 10%, less than 9%, less than 8%, less than 7%, less than 6%, less than 5% or less than 4%. In some embodiments, the weight ratio of the carbon nanomaterial to the conductive agent is more than 1%, more than 2%, more than 3%, more than 4%, more than 5%, more than 6%, more than 7%, more than 8%, more than 9%, more than 10%, more than 12%, more than 14%, more than 16%, more than 18%, more than 20%, more than 22%, more than 24% or more than 26%.

Figure 6:
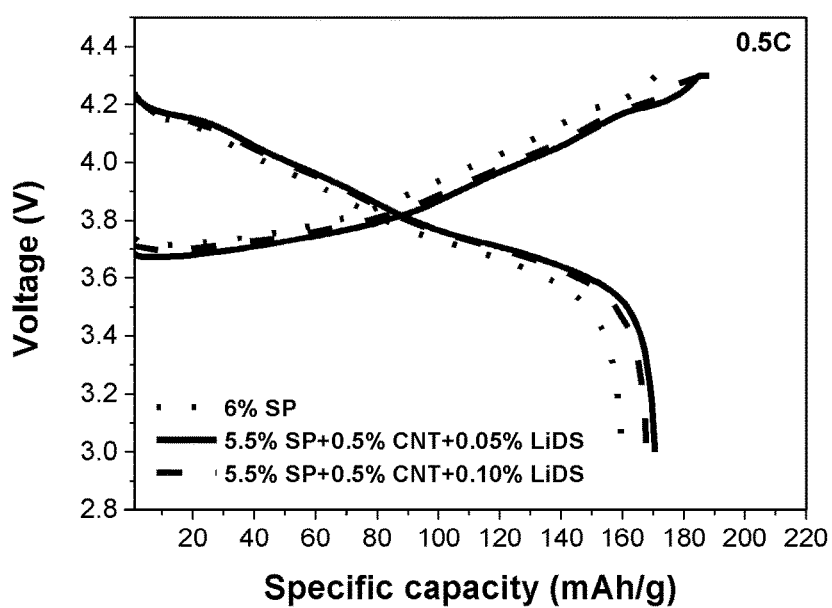
FIG. 6 shows the $1^{st}$ charge/discharge cycle curves of three batteries comprising a cathode prepared respectively (1) using only super P as conductive agent in the absence of carbon nanotubes and anionic stabilizing agent; using super P and carbon nanotubes as conductive agents in the presence of an anionic stabilizing agent with the anionic stabilizing agent to carbon nanotubes weight ratio of (2) 10% and (3) 20%.

FIG. 6 shows the $1^{st}$ charge/discharge cycle curves of three batteries comprising a cathode prepared respectively (1) using only super P as conductive agent in the absence of carbon nanotubes and anionic stabilizing agent; using super P and carbon nanotubes as conductive agents in the presence of an anionic stabilizing agent with the anionic stabilizing agent to carbon nanotubes weight ratio of (2) 10% and (3) 20%. As illustrated in the graph, the batteries with the carbon nanotubes conductive agent of the present invention exhibits a lower charge voltage platform and higher discharge platform, indicating a higher electrical conductivity and lower polarization during cycling than the battery without the carbon nanotubes conductive agent. The results also reveal that the performance of the battery prepared with the anionic stabilizing agent to carbon nanotubes weight ratio of 10% surpasses that of 20%. This might be due to the occurrence of slight foaming in slurry at 20% anionic stabilizing agent to carbon nanotubes weight ratio. Yet, it still exhibits a better performance than that of cathode prepared without carbon nanotubes conductive agent and an anionic stabilizing agent.

Figure 7:
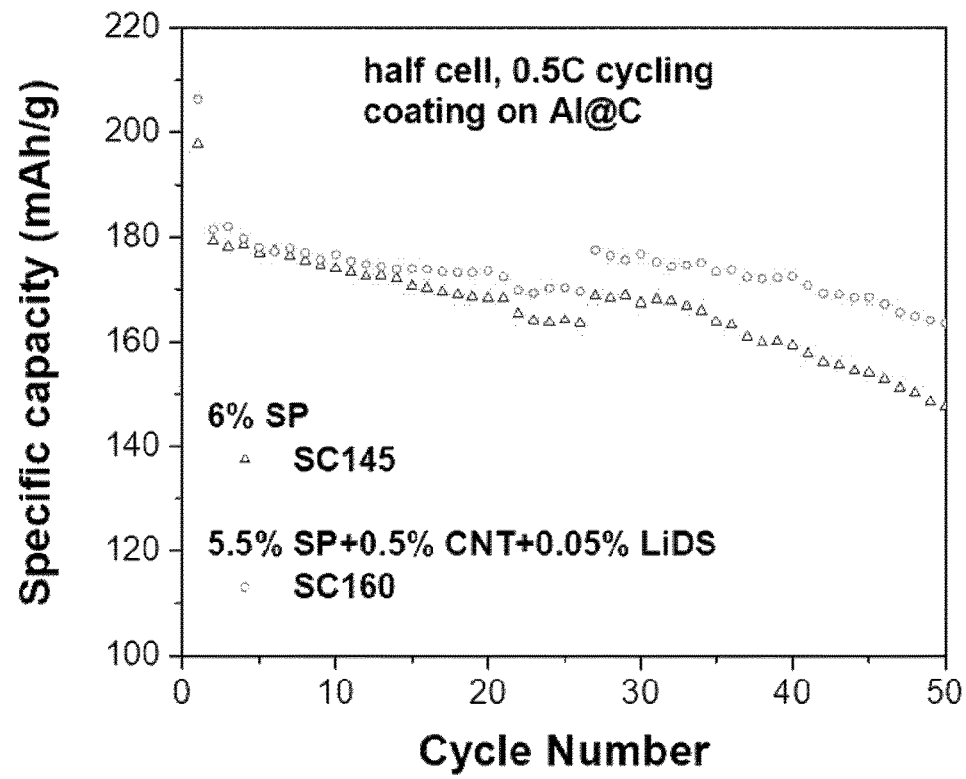
FIG. 7 shows the 0.5 C cycling performance curves of two batteries comprising a cathode prepared respectively (1) using only super P as conductive agent in the absence of carbon nanotubes and anionic stabilizing agent; and (2) using super P and carbon nanotubes as conductive agents in the presence of an anionic stabilizing agent with the anionic stabilizing agent to carbon nanotubes weight ratio of 10%.
Figure 8:
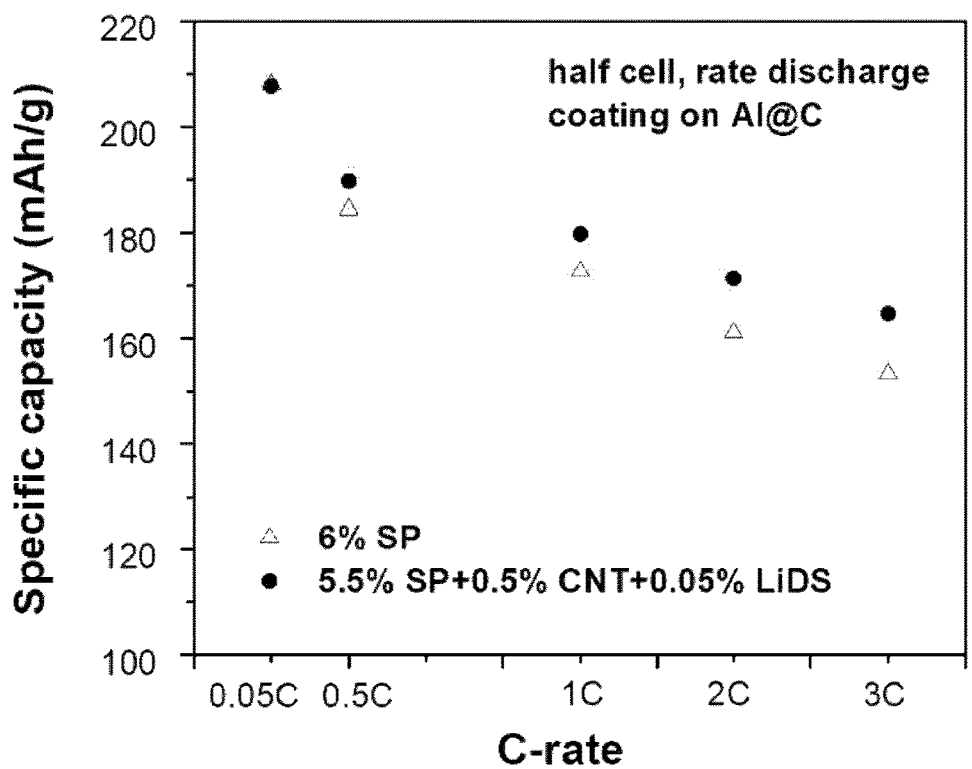
FIG. 8 shows rate discharge performance of two batteries comprising a cathode prepared respectively (1) using only super P as conductive agent in the absence of carbon nanotubes and anionic stabilizing agent; and (2) using super P and carbon nanotubes as conductive agents in the presence of an anionic stabilizing agent with the anionic stabilizing agent to carbon nanotubes weight ratio of 10%.

FIG. 7 shows the 0.5 C cycling performance curves of two batteries comprising a cathode prepared respectively (1) using only super P as conductive agent in the absence of carbon nanotubes and anionic stabilizing agent; and (2) using super P and carbon nanotubes as conductive agents in the presence of an anionic stabilizing agent with the anionic stabilizing agent to carbon nanotubes weight ratio of 10%. FIG. 8 shows rate discharge performance of two batteries comprising a cathode prepared respectively (1) using only super P as conductive agent in the absence of carbon nanotubes and anionic stabilizing agent; and (2) using super P and carbon nanotubes as conductive agents in the presence of an anionic stabilizing agent with the anionic stabilizing agent to carbon nanotubes weight ratio of 10%. The battery with the carbon nanotubes conductive agent of the present invention exhibits better performance in both cell cycling retention and rate discharge than the battery without the carbon nanotubes conductive agent. This result provides further evidence that incorporating the conductive composition into cathode preparation of the present invention improves the electrochemical performance of the battery.

In some embodiments, a fourth suspension is formed by dispersing an electrode active material in the third suspension in step 105.

In some embodiments, each of the second, third and fourth suspensions may be independently mixed for a time period from about 5 mins to about 60 mins, from about 5 mins to about 55 mins, from about 5 mins to about 50 mins, from about 5 mins to about 45 mins, from about 5 mins to about 40 mins, from about 5 mins to about 35 mins, from about 10 mins to about 45 mins, from about 15 mins to about 45 mins, from about 20 mins to about 45 mins, from about 25 mins to about 45 mins, from about 25 mins to about 40 mins or from about 25 mins to about 35 mins.

In some embodiments, each of the second, third and fourth suspensions may be independently mixed for a time period of more than 5 mins, more than 10 mins, more than 15 mins, more than 20 mins, more than 25 mins, more than 30 mins, more than 35 mins, more than 40 mins, more than 45 mins, more than 50 mins or more than 55 mins. In some embodiments, each of the second, third and fourth suspensions may be independently mixed for a time period of less than 60 mins, less than 55 mins, less than 50 mins, less than 45 mins, less than 40 mins, less than 35 mins, less than 30 mins, less than 25 mins, less than 20 mins, less than 15 mins or less than 10 mins.

In some embodiments, each of the first, second, third and fourth suspensions may be independently mixed at a temperature from about 5° C. to about 50° C., from about 5° C. to about 40° C., from about 5° C. to about 30° C., from about 5° C. to about 25° C., from about 5° C. to about 20° C., from about 10° C. to about 30° C., from about 10° C. to about 25° C., or from about 10° C. to about 20° C. In some embodiments, each of the first, second, third and fourth suspensions may be independently mixed at a temperature of less than 50° C., less than 40° C., less than 30° C., less than 25° C., less than 20° C., less than 15° C. or less than 10° C. In some embodiments, each of the first, second, third and fourth suspensions may be independently mixed at a temperature of more than 5° C., more than 10° C., more than 15° C., more than 20° C., more than 25° C., more than 30° C. or more than 40° C.

In some embodiments, the electrode active material and the conductive agent are simultaneously added to the conductive composition which comprises the carbon nanomaterial and the polymeric material.

In certain embodiments, the electrode active material and the conductive agent are not added directly to the conductive composition, but mixed separately as a separate suspension which is then homogenized with the conductive composition by a homogenizer to obtain a homogenized electrode slurry. Mixing the conductive agent and the electrode active material simultaneously or sequentially in the separate suspension can be done while dispersing the polymeric material in the second suspension to form a conductive composition. This is advantageous as it allows quicker processing and better dispersion of materials in the electrode slurry. However, this is by no means required.

In some embodiments, the battery electrode active material is a cathode active material, wherein the cathode active material is selected from the group consisting of $LiCoO_2$, $LiNiO_2$, $LiNi_xMn_yO_2$, $LiCo_xNi_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, and combinations thereof, wherein each x is independently from 0.1 to 0.9; each y is independently from 0 to 0.9; and each z is independently from 0 to 0.4. In certain embodiments, each x in the above general formula is independently selected from 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each y in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875 and 0.9; each z in the above general formula is independently selected from 0, 0.025, 0.05, 0.075, 0.1, 0.125, 0.15, 0.175, 0.2, 0.225, 0.25, 0.275, 0.3, 0.325, 0.35, 0.375 and 0.4. In some embodiments, each x, y and z in the above general formula independently has a 0.01 interval.

In certain embodiments, the cathode active material is selected from the group consisting of $LiCoO_2$, $LiNiO_2$, $LiNi_xMn_yO_2$, $Li_{1+z}Ni_xMn_yCo_{1-x-y}O_2$ (NMC), $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, $LiCo_xNi_yO_2$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode active material is not $LiNi_xMn_yO_2$, $Li_{1+z}Ni_xMn_yCo_{1-x-y}O_2$, $LiNi_xCo_yAl_zO_2$ or $LiCo_xNi_yO_2$, wherein each x is independently from 0.1 to 0.9; each y is independently from 0 to 0.45; and each z is independently from 0 to 0.2. In certain embodiments, the cathode active material is $Li_{1+x}Ni_aMn_bCo_cAl_{(1-a-b-c)}O_2$; wherein −0.2≤x≤0.2, 0≤a<1, 0≤b<1, 0≤c<1, and a+b+c≤1. In some embodiments, the cathode active material has the general formula $Li_{1+x}Ni_aMn_bCo_cAl_{(1-a-b-c)}O_2$, with 0.33≤a≤0.92, 0.33≤a≤0.9, 0.33≤a≤0.8, 0.4≤a≤0.92, 0.4≤a≤0.9, 0.4≤a≤0.8, 0.5≤a≤0.92, 0.5≤a≤0.9, 0.5≤a≤0.8, 0.6≤a≤0.92, or 0.6≤a≤0.9; 0≤b≤0.5, 0≤b≤0.4, 0≤b≤0.3, 0≤b≤0.2, 0.1≤b≤0.5, 0.1≤b≤0.4, 0.1≤b≤0.3, 0.1≤b≤0.2, 0.2≤b≤0.5, 0.2≤b≤0.4, or 0.2≤b≤0.3; 0≤c≤0.5, 0≤c≤0.4, 0≤c≤0.3, 0.1≤c≤0.5, 0.1≤c≤0.4, 0.1≤c≤0.3, 0.1≤c≤0.2, 0.2≤c≤0.5, 0.2≤c≤0.4, or 0.2≤c≤0.3. In some embodiments, the cathode active material has the general formula $LiMPO_4$, wherein M is selected from the group consisting of Fe, Co, Ni, Mn, Al, Mg, Zn, Ti, La, Ce, Sn, Zr, Ru, Si, Ge and combinations thereof. In some embodiments, the cathode active material is selected from the group consisting of $LiFePO_4$, $LiCoPO_4$, $LiNiPO_4$, $LiMnPO_4$, $LiMnFePO_4$, $LiMn_xFe_{(1-x)}PO_4$ and combinations thereof; wherein 0<x<1. In some embodiments, the cathode active material is $LiN_{i_x}Mn_yO_4$; wherein 0.1≤x≤0.9 and 0≤y≤2. In certain embodiments, the cathode active material is $xLi_2MnO_3·(1-x)LiMO_2$, wherein M is selected from the group consisting of Ni, Co, Mn and combinations thereof; and wherein 0<x<1. In some embodiments, the cathode active material is $Li_3V_2(PO_4)_3$, $LiVPO_4F$ and combinations thereof. In certain embodiments, the cathode active material has the general formula $Li_2MSiO_4$, wherein M is selected from the group consisting of Fe, Co, Mn, Ni, and combinations thereof.

In certain embodiments, the cathode active material is doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In some embodiments, the dopant is not Co, Cr, V, Mo, Nb, Pd, F, Na, Fe, Ni, Mn, Mg, Zn, Ti, La, Ce, Ru, Si, or Ge. In certain embodiments, the dopant is not Al, Sn, or Zr.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$ (NMC811), $LiNi_{0.92}Mn_{0.04}Co_{0.04}O_2$, $LiNi_{0.8}Co_{0.15}Al_{0.05}O_2$ (NCA), $LiNiO_2$ (LNO), and combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.7}Mn_{0.1}Co_{0.2}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiCO_aNi_bO_2$, $LiMn_aNi_bO_2$, and combinations thereof; wherein $-0.2 \leq x \leq 0.2$, $0 \leq a < 1$, $0 \leq b < 1$, $0 \leq c < 1$, and $a+b+c \leq 1$. In certain embodiments, each x in the above general formula is independently selected from -0.2, -0.175, -0.15, -0.125, -0.1, -0.075, -0.05, -0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiments, each x, a, b and c in the above general formula independently has a 0.01 interval. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxide or oxides in the core and the shell may be the same, or they may be different or partially different. In some embodiments, the two or more lithium transition metal oxides are uniformly distributed over the core. In certain embodiments, the two or more lithium transition metal oxides are not uniformly distributed over the core. In some embodiments, the cathode active material is not a core-shell composite.

In some embodiments, each of the lithium transition metal oxides in the core and the shell is independently doped with a dopant selected from the group consisting of Co, Cr, V, Mo, Nb, Pd, F, Na, Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core and/or the shell. In certain embodiments, the two or more doped lithium transition metal oxides are not uniformly distributed over the core and/or the shell.

In some embodiments, the cathode active material comprises or is a core-shell composite comprising a core comprising a lithium transition metal oxide and a shell comprising a transition metal oxide. In certain embodiments, the lithium transition metal oxide is selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiCO_aNi_bO_2$, $LiMn_aNi_bO_2$, and combinations thereof; wherein $-0.2 \leq x \leq 0.2$, $0 \leq a < 1$, $0 \leq b < 1$, $0 \leq c < 1$, and $a+b+c \leq 1$. In certain embodiments, each x in the above general formula is independently selected from -0.2, -0.175, -0.15, -0.125, -0.1, -0.075, -0.05, -0.025, 0, 0.025, 0.05, 0.075, 0.1, 0.125, 0.15, 0.175 and 0.2; each a in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each b in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975; each c in the above general formula is independently selected from 0, 0.025, 0.05, 0.075, 0.1, 0.125, 0.15, 0.175, 0.2, 0.225, 0.25, 0.275, 0.3, 0.325, 0.35, 0.375, 0.4, 0.425, 0.45, 0.475, 0.5, 0.525, 0.55, 0.575, 0.6, 0.625, 0.65, 0.675, 0.7, 0.725, 0.75, 0.775, 0.8, 0.825, 0.85, 0.875, 0.9, 0.925, 0.95 and 0.975. In some embodiments, each x, a, b and c in the above general formula independently has a 0.01 interval. In some embodiments, the transition metal oxide is selected from the group consisting of $Fe_2O_3$, $MnO_2$, $Al_2O_3$, $MgO$, $ZnO$, $TiO_2$, $La_2O_3$, $CeO_2$, $SnO_2$, $ZrO_2$, $RuO_2$, and combinations thereof. In certain embodiments, the shell comprises a lithium transition metal oxide and a transition metal oxide.

In some embodiments, the diameter of the core is from about 1 μm to about 15 μm, from about 3 μm to about 15 μm, from about 3 μm to about 10 μm, from about 5 μm to about 10 μm, from about 5 μm to about 45 μm, from about 5 μm to about 35 μm, from about 5 μm to about 25 μm, from about 10 μm to about 45 μm, from about 10 μm to about 40 μm, or from about 10 μm to about 35 μm, from about 10 μm to about 25 μm, from about 15 μm to about 45 μm, from about 15 μm to about 30 μm, from about 15 μm to about 25 μm, from about 20 μm to about 35 μm, or from about 20 μm to about 30 μm. In certain embodiments, the thickness of the shell is from about 1 μm to about 45 μm, from about 1 μm to about 35 μm, from about 1 μm to about 25 μm, from about 1 μm to about 15 μm, from about 1 μm to about 10 μm, from about 1 μm to about 5 μm, from about 3 μm to about 15 μm, from about 3 μm to about 10 μm, from about 5 μm to about 10 μm, from about 10 μm to about 35 μm, from about 10 μm to about 20 μm, from about 15 μm to about 30 μm, from about 15 μm to about 25 μm, or from about 20 μm to about 35 μm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

In some embodiments, the electrode active material is an anode active material, wherein the anode active material is selected the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is doped with a metallic element or a nonmetal element. In some embodiments, the metallic element is selected from the group consisting of Fe, Ni, Mn, Al, Mg, Zn, Ti, La, Ce, Sn, Zr, Ru and combinations thereof. In some embodiments, the nonmetal element is B, Si, Ge, N, P, F, S, Cl, I, Se and combinations thereof.

In some embodiments, the anode active material comprises or is a core-shell composite having a core and shell structure, wherein the core and the shell each is independently selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the core-shell composite comprises a core comprising a carbonaceous material and a shell coated on the carbonaceous material core. In some embodiments, the carbonaceous material is selected from the group consisting of soft carbon, hard carbon, natural graphite particulate, synthetic graphite particulate, mesocarbon microbeads, Kish graphite, pyrolytic carbon, mesophase pitches, mesophase pitch-based carbon fiber, and combinations thereof. In certain embodiments, the shell is selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is not doped with a metallic element or a nonmetal element. In some embodiments, the anode active material is not doped with Fe, Ni, Mn, Al, Mg, Zn, Ti, La, Ce, Sn, Zr, Ru, B, Si, Ge, N, P, F, S, Cl, I, or Se.

In some embodiments, before homogenization of the fourth suspension, the fourth suspension is degassed under a reduced pressure for a short period of time to remove air bubbles trapped in the suspension. In some embodiments, the fourth suspension is degassed at a pressure from about 1 kPa to about 20 kPa, from about 1 kPa to about 15 kPa, from about 1 kPa to about 10 kPa, from about 5 kPa to about 20 kPa, from about 5 kPa to about 15 kPa, or from 10 kPa to about 20 kPa. In certain embodiments, the fourth suspension is degassed at a pressure less than 20 kPa, less than 15 kPa, or less than 10 kPa. In some embodiments, the fourth suspension is degassed for a time period from about 30 mins to about 4 hours, from about 1 hour to about 4 hours, from about 2 hours to about 4 hours, or from about 30 mins to about 2 hours. In certain embodiments, the fourth suspension is degassed for a time period of less than 4 hours, less than 2 hours, or less than 1 hour.

In some embodiments, a homogenized electrode slurry is obtained by homogenizing the fourth suspension by a homogenizer in step 106.

In certain embodiments, the fourth suspension is degassed after homogenization, which may be performed at the pressures and for the time durations stated in the step of degassing the fourth suspension before homogenization.

In certain embodiments, the amount of carbon nanomaterial in the slurry is from about 0.01% to about 3.0%, from about 0.01% to about 2.6%, from about 0.01% to about 2.2%, from about 0.01% to about 1.8%, from about 0.01% to about 1.6%, from about 0.01% to about 1.4%, from about 0.01% to about 1.2%, from about 0.01% to about 1.0%, from about 0.01% to about 0.8%, from about 0.01% to about 0.6%, from about 0.01% to about 0.4%, from about 0.05% to about 3.0%, from about 0.05% to about 2.6%, from about 0.05% to about 2.2%, from about 0.05% to about 1.8%, from about 0.05% to about 1.6%, from about 0.05% to about 1.4%, from about 0.05% to about 1.2%, from about 0.05% to about 1.0%, from about 0.05% to about 0.8%, from about 0.05% to about 0.6%, from about 0.05% to about 0.4%, from about 0.1% to about 3.0%, from about 0.1% to about 2.6%, from about 0.1% to about 2.2%, from about 0.1% to about 1.8%, from about 0.1% to about 1.6%, from about 0.1% to about 1.4%, from about 0.1% to about 1.2%, from about 0.1% to about 1.0%, from about 0.1% to about 0.8% or from about 0.1% to about 0.6% by weight, based on the total weight of the slurry.

In some embodiments, the amount of carbon nanomaterial in the slurry is lower than 3.0%, lower than 2.8%, lower than 2.6%, lower than 2.4%, lower than 2.2%, lower than 2.0%, lower than 1.8%, lower than 1.6%, lower than 1.4%, lower than 1.2%, lower than 1.0%, lower than 0.8%, lower than 0.6% or lower than 0.4% by weight, based on the total weight of the slurry. In some embodiments, the amount of carbon nanomaterial in the slurry is higher than 0.01%, higher than 0.05%, higher than 0.1%, higher than 0.2%, higher than 0.4%, higher than 0.8%, higher than 1.2%, higher than 1.6%, higher than 2.0%, higher than 2.4% or higher than 2.6% by weight, based on the total weight of the slurry.

In some embodiments, the amount of polymeric material in the slurry is from about 0.1% to about 5%, from about 0.1% to about 4.5%, from about 0.1% to about 4%, from about 0.1% to about 3.5%, from about 0.1% to about 3%, from about 0.1% to about 2.5%, from about 0.1% to about 2%, from about 0.4% to about 5%, from about 0.4% to about 4.5%, from about 0.4% to about 4%, from about 0.4% to about 3.5%, from about 0.4% to about 3%, from about 0.4% to about 2.5%, from about 0.4% to about 2%, from about 0.7% to about 5%, from about 0.7% to about 4.5%, from about 0.7% to about 4%, from about 0.7% to about 3.5%, from about 0.7% to about 3%, from about 0.7% to about 2.5%, from about 0.7% to about 2%, from about 1% to about 5%, from about 1% to about 4.5%, from about 1% to about 4%, from about 1% to about 3.5%, from about 1% to about 3%, from about 1% to about 2.5%, from about 1% to about 2%, from about 1.2% to about 5%, from about 1.2% to about 4%, from about 1.2% to about 3% or from about 1.2% to about 2% by weight, based on the total weight of the slurry.

In some embodiments, the amount of polymeric material in the slurry is lower than 5%, lower than 4%, lower than 3%, lower than 2%, lower than 1.8%, lower than 1.6%, lower than 1.4%, lower than 1.2%, lower than 1%, lower than 0.8%, lower than 0.6% or lower than 0.4% by weight, based on the total weight of the slurry. In some embodiments, the amount of polymeric material in the slurry is higher than 0.1%, higher than 0.25%, higher than 0.5%, higher than 0.75%, higher than 1%, higher than 1.2%, higher than 1.4%, higher than 1.6%, higher than 1.8%, higher than 2%, higher than 3% or higher than 4% by weight, based on the total weight of the slurry.

In some embodiments, the amount of conductive agent in the slurry is from about 0% to about 5%, from about 0% to about 4.5%, from about 0% to about 4%, from about 0% to about 3.5%, from about 0% to about 3%, from about 0.5% to about 5%, from about 0.5% to about 4.5%, from about 0.5% to about 4%, from about 0.5% to about 3.5%, from about 0.5% to about 3%, from about 1% to about 5%, from about 1% to about 4.5%, from about 1% to about 4%, from about 1% to about 3.5%, from about 1% to about 3%, from about 1.5% to about 5%, from about 1.5% to about 4.5%, from about 1.5% to about 4%, from about 1.5% to about 3.5%, from about 1.5% to about 3%, from about 2% to about 5%, from about 2% to about 4.5%, from about 2% to about 4%, from about 2% to about 3.5% or from about 2% to about 3% by weight, based on the total weight of the slurry.

In some embodiments, the amount of conductive agent in the slurry is lower than 5%, lower than 4.5%, lower than 4%, lower than 3.5%, lower than 3%, lower than 2.5%, lower than 2%, lower than 1.5%, lower than 1% or lower than 0.5% by weight, based on the total weight of the slurry. In some embodiments, the amount of conductive agent in the slurry is higher than 0%, higher than 0.5%, higher than 1%, higher than 1.5%, higher than 2%, higher than 2.5%, higher than 3%, higher than 3.5%, higher than 4% or higher than 4.5% by weight, based on the total weight of the slurry.

In certain embodiments, the amount of anionic stabilizing agent in the slurry is from about 0.005% to about 0.5%, from about 0.005% to about 0.4%, from about 0.005% to about 0.3%, from about 0.005% to about 0.2%, from about 0.005% to about 0.1%, from about 0.01% to about 0.5%, from about 0.01% to about 0.4%, from about 0.01% to about 0.3%, from about 0.01% to about 0.2%, from about 0.01% to about 0.1%, from about 0.02% to about 0.5%, from about 0.02% to about 0.4%, from about 0.02% to about 0.3%, from about 0.02% to about 0.2% or from about 0.02% to about 0.1% by weight, based on the total weight of the slurry.

In some embodiments, the amount of anionic stabilizing agent in the slurry is less than 0.5%, less than 0.45%, less than 0.4%, less than 0.35%, less than 0.3%, less than 0.25%, less than 0.2%, less than 0.15%, less than 0.1%, less than 0.05% or less than 0.01% by weight, based on the total weight of the slurry. In some embodiments, the amount of anionic stabilizing agent in the slurry is more than 0.005%, more than 0.01%, more than 0.02%, more than 0.03%, more than 0.04%, more than 0.05%, more than 0.1%, more than 0.2%, more than 0.3% or more than 0.4% by weight, based on the total weight of the slurry.

In some embodiments, the amount of the electrode active material in the slurry is from about 30% to about 70%, from about 30% to about 65%, from about 30% to about 60%, from about 30% to about 55%, from about 30% to about 50%, from about 35% to about 70%, from about 35% to about 65%, from about 35% to about 60%, from about 35% to about 55%, from about 35% to about 50%, from about 40% to about 70%, from about 40% to about 65%, from about 40% to about 60%, from about 40% to about 55% or from about 40% to about 50% by weight, based on the total weight of the slurry.

In certain embodiments, the amount of the electrode active material in the slurry is at least 30%, at least 35%, at least 40%, at least 45%, at least 50%, at least 55%, at least 60% or at least 65% by weight, based on the total weight of the slurry. In certain embodiments, the amount of the electrode active material in the slurry is at most 70%, at most 65%, at most 60%, at most 55%, at most 50%, at most 45%, at most 40% or at most 35% by weight, based on the total weight of the slurry.

The homogenizer may be equipped with a temperature control system and the temperature of the fourth suspension can be controlled by the temperature control system. Any homogenizer that can reduce or eliminate particle aggregation, and/or promote homogeneous distribution of slurry ingredients can be used herein. Homogeneous distribution plays an important role in fabricating batteries with good battery performance. In some embodiments, the homogenizer is a planetary mixer, a stirring mixer, a blender, an ultrasonicator, or a combination thereof.

In certain embodiments, the fourth suspension is homogenized at a temperature from about 10° C. to about 30° C., from about 10° C. to about 25° C., from about 10° C. to about 20° C. or from about 10° C. to about 15° C. In some embodiments, the fourth suspension is homogenized at a temperature of less than 30° C., less than 25° C., less than 20 C or less than 15° C.

In some embodiments, the planetary mixer comprises at least one planetary blade and at least one high-speed dispersion blade. In certain embodiments, the rotational speed of the planetary blade is from about 10 rpm to about 200 rpm, from about 10 rpm to about 150 rpm, from about 20 rpm to about 150 rpm, or from about 20 rpm to about 100 rpm. In certain embodiments, the rotational speed of the dispersion blade is from about 1,000 rpm to about 4,000 rpm, from about 1,000 rpm to about 3,000 rpm, from about 1,000 rpm to about 2,000 rpm, from about 1,500 rpm to about 3,000 rpm, or from about 1,500 rpm to about 2,500 rpm.

In certain embodiments, the ultrasonicator is an ultrasonic bath, a probe-type ultrasonicator or an ultrasonic flow cell. In some embodiments, the ultrasonicator is operated at a power density from about 10 W/L to about 100 W/L, from about 20 W/L to about 100 W/L, from about 30 W/L to about 100 W/L, from about 40 W/L to about 80 W/L, from about 40 W/L to about 60 W/L, from about 20 W/L to about 80 W/L or from about 20 W/L to about 60 W/L.

When electrode active material is homogenized in an aqueous slurry for a long period of time, water can damage the electrode active material. In some embodiments, the fourth suspension is homogenized for a time period from about 10 mins to about 6 hours, from about 10 mins to about 5 hours, from about 10 mins to about 4 hours, from about 10 mins to about 3 hours, from about 10 mins to about 2 hours, from about 10 mins to about 1 hour, from about 10 mins to about 30 mins, from about 30 mins to about 3 hours, from about 30 mins to about 2 hours, from about 30 mins to about 1 hour, from about 1 hour to about 6 hours, from about 1 hour to about 5 hours, from about 1 hour to about 4 hours, from about 1 hour to about 3 hours, from about 1 hour to about 2 hours, from about 2 hours to about 6 hours, from about 2 hours to about 4 hours, from about 2 hours to about 3 hours, from about 3 hours to about 5 hours, or from about 4 hours to about 6 hours.

In certain embodiments, the fourth suspension is homogenized for a time period less than 6 hours, less than 5 hours, less than 4 hours, less than 3 hours, less than 2 hours, less than 1 hour, or less than 30 mins. In some embodiments, the fourth suspension is homogenized for a time period of more than about 5 hours, more than about 4 hours, more than about 3 hours, more than about 2 hours, more than about 1 hour, more than about 30 mins, more than about 20 mins, or more than about 10 mins.

When the pH value of the slurry varies during homogenization and is outside of certain ranges, it may affect dispersion homogeneity and particle size distribution of the water-insoluble components, e.g., electrode active material and conductive agent in the slurry, thereby resulting in poor electrode performance. Accordingly, it is desirable to maintain a constant pH in the slurry during homogenization.

In some embodiments, the pH of the slurry is from about 8 to about 14, from about 8 to about 13, from about 8 to about 12, from about 8 to about 11, from about 8 to about 10, from about 9 to about 14, from about 9 to about 13, from about 9 to about 12, from about 10 to about 14, from about 10 to about 13, from about 10 to about 12, from about 10.5 to about 14, from about 10.5 to about 13.5, from about 10.5 to about 13, from about 10.5 to about 12.5, from about 11 to about 14, from about 11 to about 13 or from about 12 to about 14. In certain embodiments, the pH of the slurry is less than 14, less than 13.5, less than 13, less than 12.5, less than 12, less than 11.5, less than 11, less than 10.5, less than 10, less than 9.5, less than 9, less than 8.5, or less than 8. In some embodiments, the pH of the slurry is about 7, about 7.5, about 8, about 8.5, about 9, about 9.5, about 10, about 10.5, about 11, about 11.5, about 12, about 12.5, about 13, about 13.5 or about 14.

In some embodiments, the solid content of the homogenized electrode slurry is from about 35% to about 80%, from about 35% to about 75%, from about 35% to about 70%, from about 35% to about 65%, from about 35% to about 60%, from about 35% to about 55%, from about 40% to about 80%, from about 40% to about 75%, from about 40% to about 70%, from about 40% to about 65%, from about 40% to about 60%, from about 45% to about 80%, from about 45% to about 75%, from about 45% to about 70% or from about 45% to about 65% by weight, based on the total weight of the homogenized electrode slurry.

In certain embodiments, the solid content of the homogenized electrode slurry is at least 35%, at least 40%, at least 45%, at least 50%, at least 55%, at least 60%, at least 65%, or at least 70% by weight, based on the total weight of the homogenized electrode slurry. In certain embodiments, the solid content of the homogenized electrode slurry is less than 75%, less than 70%, less than 65%, less than 60%, less than 55%, less than 50%, less than 45% or less than 40% by weight, based on the total weight of the homogenized electrode slurry.

The homogenized electrode slurry of the present invention can have a higher solid content than conventional electrode active material slurries. This allows more electrode active material to be prepared for further processing at any one time, thus improving efficiency and maximizing productivity.

In some embodiments, the viscosity of the slurry is preferably less than about 8,000 mPa·s. In some embodiments, the viscosity of the slurry is from about 1,000 mPa·s to about 8,000 mPa·s, from about 1,000 mPa·s to about 7,000 mPa·s, from about 1,000 mPa·s to about 6,000 mPa·s, from about 1,000 mPa·s to about 5,000 mPa·s, from about 1,000 mPa·s to about 4,000 mPa·s, from about 1,000 mPa·s to about 3,000 mPa·s, from about 1,000 mPa·s to about 2,500 mPa·s, or from about 1,000 mPa·s to about 2,000 mPa·s. In certain embodiments, the viscosity of the slurry is less than 8,000 mPa·s, less than 7,000 mPa·s, less than 6,000 mPa·s, less than 5,000 mPa·s, less than 4,000 mPa·s, less than 3,000 mPa·s, less than 2,500 mPa·s, less than 2,000 mPa·s, less than 1,500 mPa·s, or less than 1,000 mPa·s. In some embodiments, the viscosity of the slurry is higher than 1,000 mPa·s, higher than 2,000 mPa·s, higher than 3,000 mPa·s, higher than 4,000 mPa·s, higher than 5,000 mPa·s, higher than 6,000 mPa·s, higher than 7,000 mPa·s, or higher than 8,000 mPa·s. Thus, the resultant slurry can be fully mixed or homogeneous.

In some embodiments, the conductive composition of the present invention has a particle size $D_{50}$ in the range from about 1 μm to about 40 μm, from about 1 μm to about 35 μm, from about 1 μm to about 30 μm, from about 1 μm to about 25 μm, from about 1 μm to about 20 μm, from about 1 μm to about 15 μm, from about 1 μm to about 10 μm, from about 1 μm to about 5 μm, from about 5 μm to about 40 am, from about 10 μm to about 40 am, from about 15 μm to about 40 am, from about 20 μm to about 40 μm or from about m to about 40 μm.

In certain embodiments, the particle size $D_{50}$ of the conductive composition is less than 40 μm, less than 35 μm, less than 30 μm, less than 25 μm, less than 20 μm, less than 15 μm, less than 10 μm or less than 5 μm. In some embodiments, the particle size $D_{50}$ of the conductive composition is greater than 1 μm, greater than 5 am, greater than 10 μm, greater than 15 am, greater than 20 am, greater than 25 am, greater than 30 μm or greater than 35 μm.

In some embodiments, a coated electrode film is formed on a current collector by applying the homogenized electrode slurry on a current collector. In certain embodiments, the coating process is performed using a doctor blade coater, a slot-die coater, a transfer coater, a spray coater, a roll coater, a gravure coater, a dip coater, or a curtain coater.

The current collector acts to collect electrons generated by electrochemical reactions of the cathode active material or to supply electrons required for the electrochemical reactions. In some embodiments, the current collector can be in the form of a foil, sheet or film. In some embodiments, the current collector is a metal. In some embodiments, the current collector is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof. In some embodiments, the current collector further comprises an electrically-conductive resin.

In certain embodiments, the current collector has a two-layered structure comprising an outer layer and an inner layer, wherein the outer layer comprises a conductive material and the inner layer comprises an insulating material or another conductive material; for example, a polymeric insulating material coated with an aluminum layer or an aluminum mounted with a conductive resin layer. In some embodiments, the conductive material is selected from the group consisting of stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin and combinations thereof.

In some embodiments, the current collector has a three-layered structure comprising an outer layer, a middle layer and an inner layer, wherein the outer and inner layers comprise a conductive material and the middle layer comprises an insulating material or another conductive material; for example, a plastic material coated with a metal layer on both sides. In certain embodiments, each of the outer layer, middle layer and inner layer is independently stainless steel, titanium, nickel, aluminum, copper, platinum, gold, silver, chromium, zirconium, tungsten, molybdenum, silicon, tin, vanadium, zinc, cadmium, or alloys thereof, electrically-conductive resin or combinations thereof.

In some embodiments, the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer and combinations thereof. In certain embodiments, the current collector has more than three layers. In some embodiments, the current collector is coated with a protective coating. In certain embodiments, the protective coating comprises a carbon-containing material. In some embodiments, the current collector is not coated with a protective coating.

In some embodiments, a conductive layer can be coated on a current collector to improve its current conductivity. In certain embodiments, the conductive layer comprises a material selected from the group consisting of carbon, carbon black, graphite, expanded graphite, graphene, graphene nanoplatelets, carbon fibers, carbon nano-fibers, graphitized carbon flake, carbon tubes, carbon nanotubes, activated carbon, mesoporous carbon, and combinations thereof.

Thickness of the conductive layer will affect the volume occupied by the current collector within a battery and the amount of the electrode material and hence the capacity in the battery. In certain embodiments, the thickness of the conductive layer on the current collector is from about 0.5 µm to about 5.0 µm, from about 1.0 µm to about 4.0 µm, from about 1.0 µm to about 3.0 µm, from about 1.5 µm to about 2.0 µm, from about 1.0 am to about 1.8 µm, from about 1.2 µm to about 1.8 µm or from about 1.0 µm to about 1.5 µm. In some embodiments, the thickness of the conductive layer on the current collector is less than 5.0 µm, less than 4.0 µm, less than 3.0 µm, less than 2.0 µm or less than 1.5 µm. In some embodiments, the thickness of the conductive layer on the current collector is more than 0.5 µm, more than 1.0 µm, more than 1.5 µm, more than 2.0 µm, more than 2.5 µm, more than 3.0 µm, or more than 3.5 µm.

The thickness of the current collector affects the volume it occupies within the battery, the amount of the electrode active material needed, and hence the capacity in the battery. In some embodiments, the current collector has a thickness from about 5 µm to about 30 µm, from about 5 µm to about 20 µm, from about 5 µm to about 15 µm, from about 10 µm to about 30 µm, from about 10 µm to about 25 µm, or from about 10 µm to about 20 µm.

In some embodiments, the current collector has a thickness of less than 30 µm, less than 28 µm, less than 26 µm, less than 24 am, less than 22 am, less than 20 am, less than 18 am, less than 16 am, less than 14 am, less than 12 am, less than 10 am, less than 8 µm or less than 6 µm. In some embodiments, the current collector has a thickness of more than 5 am, more than 7 am, more than 10 am, more than 12 am, more than 14 am, more than 16 am, more than 18 am, more than 20 am, more than 22 am, more than 24 am, more than 26 µm or more than 28 µm.

Evaporating the solvent to create a dry porous electrode is required to fabricate the battery. In some embodiments, after applying the homogenized electrode slurry on a current collector, the coated electrode film on the current collector can be dried by a dryer to obtain a battery electrode. Any dryer that can dry the coated electrode film on the current collector can be used herein. Some non-limiting examples of the dryer include a batch drying oven, a conveyor drying oven, and a microwave drying oven. Some non-limiting examples of the conveyor drying oven include a conveyor hot air drying oven, a conveyor resistance drying oven, a conveyor inductive drying oven, and a conveyor microwave drying oven.

The coated electrode film on the current collector should be dried at a temperature of approximately 100° C. or less in approximately 150 mins or less. Drying the electrode at temperatures above 100° C. may result in undesirable deformation of the electrode, thus affecting the performance of the electrode.

In some embodiments, the coated electrode film on the current collector can be dried at a temperature from about 25° C. to about 100° C., from about 25° C. to about 90° C., from about 25° C. to about 80° C., from about 25° C. to about 70° C., from about 30° C. to about 100° C., from about 30° C. to about 90° C., from about 30° C. to about 80° C., from about 35° C. to about 100° C., from about 35° C. to about 90° C., from about 40° C. to about 100° C. or from about 40° C. to about 90° C.

In some embodiments, the coated electrode film on the current collector is dried at a temperature less than 100° C., less than 90° C., less than 80° C., less than 70° C., less than 60° C. or less than 50° C. In some embodiments, the coated electrode film on the current collector is dried at a temperature of higher than 95° C., higher than 85° C., higher than 75° C., higher than 65° C., higher than 55° C., higher than 45° C., higher than 35° C. or higher than 25° C.

After the coated electrode film on the current collector is dried, an electrode is formed. In some embodiments, the electrode is compressed mechanically in order to enhance the density of the electrode. The electrode comprises an electrode layer and a current collector.

In certain embodiments, the thickness of the electrode layer on the current collector is from about 10 µm to about 90 µm, from about 10 µm to about 80 µm, from about m to about 70 µm, from about 10 µm to about 60 µm, from about 10 µm to about 50 µm, from about 10 µm to about 40 µm, from about 10 µm to about 30 µm, from about 10 µm to about 20 µm, from about 25 µm to about 75 am, from about 25 µm to about 50 am, from about 30 µm to about 90 am, from about 30 µm to about 80 am, from about 35 µm to about 90 am, from about 35 µm to about 85 am, from about 35 µm to about 80 am, or from about m to about 75 µm.

In some embodiments, the thickness of the electrode layer on the current collector is less than 25 am, less than 30 am, less than 35 am, less than 40 am, less than 45 am, less than 50 am, less than 55 am, less than 60 am, less than 65 am, less than 70 am, less than 75 am, less than 80 am, less than 85 µm or less than 90 µm. In some embodiments, the thickness of the electrode layer on the current collector is higher than 10 am, higher than 15 m, higher than 20 µm, higher than 25 µm, higher than 30 µm, higher than 35 µm, higher than 40 µm, higher than 45 µm, higher than 50 µm, higher than 55 µm, higher than 60 µm, higher than 65 am, higher than 70 am, higher than 75 µm or higher than 80 µm.

In some embodiments, the surface density of the electrode layer on the current collector is from about 1 mg/cm$^2$ to about 40 mg/cm$^2$, from about 1 mg/cm$^2$ to about 30 mg/cm$^2$, from about 1 mg/cm$^2$ to about 20 mg/cm$^2$, from about 3 mg/cm$^2$ to about 40 mg/cm$^2$, from about 3 mg/cm$^2$ to about 30 mg/cm$^2$, from about 3 mg/cm$^2$ to about 20 mg/cm$^2$, from about 5 mg/cm$^2$ to about 40 mg/cm$^2$, from about 5 mg/cm$^2$ to about 30 mg/cm$^2$, from about 5 mg/cm$^2$ to about 20 mg/cm$^2$, from about 8 mg/cm$^2$ to about 40 mg/cm$^2$, from about 8 mg/cm$^2$ to about 30 mg/cm$^2$, from about 8 mg/cm$^2$ to about 20 mg/cm$^2$, from about 10 mg/cm$^2$ to about 40 mg/cm$^2$, from about 10 mg/cm$^2$ to about 30 mg/cm$^2$, from about 10 mg/cm$^2$ to about 20 mg/cm$^2$, from about 15 mg/cm$^2$ to about 40 mg/cm$^2$, or from about 20 mg/cm$^2$ to about 40 mg/cm$^2$. In some embodiments, the surface density of the electrode layer on the current collector is higher than 1 mg/cm$^2$, higher than 5 mg/cm$^2$, higher than 10 mg/cm$^2$, higher than 15 mg/cm$^2$, higher than 20 mg/cm$^2$, higher than 25 mg/cm$^2$, higher than 30 mg/cm$^2$ or higher than 35 mg/cm$^2$.

In addition, the polymeric material applied in the present invention allows the exhibition of strong adhesion of the electrode layer to the current collector in an electrode. It is important for the electrode layer to have good peeling strength to the current collector as this would greatly influence the mechanical stability of the electrodes and the cyclability of the battery. Therefore, the electrodes should have sufficient peeling strength to withstand the rigors of battery manufacture. In some embodiments, the peeling strength between the current collector and the electrode layer is in the range from about 1.0 N/cm to about 8.0 N/cm, from about 1.0 N/cm to about 6.0 N/cm, from about 1.0 N/cm to about 5.0 N/cm, from about 1.0 N/cm to about 4.0 N/cm, from about 1.0 N/cm to about 3.0 N/cm, from about 1.0 N/cm to about 2.5 N/cm, from about 1.0 N/cm to about 2.0 N/cm, from about 1.2 N/cm to about 3.0 N/cm, from about 1.2 N/cm to about 2.5 N/cm, from about 1.2 N/cm to about 2.0 N/cm, from about 1.5 N/cm to about 3.0 N/cm, from about 1.5 N/cm to about 2.5 N/cm, from about 1.5

N/cm to about 2.0 N/cm from about 1.8 N/cm to about 3.0 N/cm, from about 1.8 N/cm to about 2.5 N/cm, from about 2.0 N/cm to about 6.0 N/cm, from about 2.0 N/cm to about 5.0 N/cm, from about 2.0 N/cm to about 3.0 N/cm, from about 2.0 N/cm to about 2.5 N/cm, from about 2.2 N/cm to about 3.0 N/cm, from about 2.5 N/cm to about 3.0 N/cm, from about 3.0 N/cm to about 8.0 N/cm, from about 3.0 N/cm to about 6.0 N/cm, or from about 4.0 N/cm to about 6.0 N/cm.

In some embodiments, the peeling strength between the current collector and the electrode layer is 1.0 N/cm or more, 1.2 N/cm or more, 1.5 N/cm or more, 2.0 N/cm or more, 2.2 N/cm or more, 2.5 N/cm or more, 3.0 N/cm or more, 3.5 N/cm or more, 4.0 N/cm or more, 4.5 N/cm or more, 5.0 N/cm or more, 5.5 N/cm or more, 6.0 N/cm or more, 6.5 N/cm or more, 7.0 N/cm or more or 7.5 N/cm or more. In some embodiments, the peeling strength between the current collector and the electrode layer is less than 8.0 N/cm, less than 7.5 N/cm, less than 7.0 N/cm, less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.8 N/cm, less than 2.5 N/cm, less than 2.2 N/cm, less than 2.0 N/cm, less than 1.8 N/cm, or less than 1.5 N/cm.

The polymeric material in the present invention exhibits exceptionally strong binding capability. One way in assessing the strength of the adhesion property of a polymeric material is via the adhesive strength between a polymeric material and a current collector. It is important for the polymeric material to have good adhesive strength to the current collector as it promotes the binding force of the electrode layer material to the current collector in the making of battery electrode, prevents separation and enhances the mechanical stability of the electrode. In some embodiments, the adhesive strength between the polymeric material and the current collector is from about 2 N/cm to about 6 N/cm, from about 2 N/cm to about 5.5 N/cm, from about 2 N/cm to about 5 N/cm, from about 2 N/cm to about 4.5 N/cm, from about 2 N/cm to about 4 N/cm, from about 2 N/cm to about 3.5 N/cm, from about 2 N/cm to about 3 N/cm, from about 2.5 N/cm to about 6 N/cm, from about 3 N/cm to about 6 N/cm, from about 3.5 N/cm to about 6 N/cm, from about 4 N/cm to about 6 N/cm, from about 2.5 N/cm to about 5.5 N/cm, from about 2.5 N/cm to about 5 N/cm, from about 2.5 N/cm to about 4.5 N/cm, from about 2.5 N/cm to about 4 N/cm, from about 2.5 N/cm to about 3.5 N/cm or from about 3 N/cm to about 5 N/cm.

In some embodiments, the adhesive strength between the polymeric material and the current collector is less than 6 N/cm, less than 5.5 N/cm, less than 5 N/cm, less than 4.5 N/cm, less than 4 N/cm, less than 3.5 N/cm, less than 3 N/cm, or less than 2.5 N/cm. In some embodiments, the adhesive strength between the polymeric material and the current collector is more than 2 N/cm, more than 2.5 N/cm, more than 3 N/cm, more than 3.5 N/cm, more than 4 N/cm, more than 4.5 N/cm, more than 5 N/cm or more than 5.5 N/cm.

The method disclosed herein has the advantage that aqueous solvents can be used in the manufacturing process, which can save on processing time and equipment, as well as improve safety by eliminating the need to handle or recycle hazardous organic solvents. Since aqueous solvents are used in the present invention, the electrode would require less time and energy to dry. In addition, costs are reduced by simplifying the overall process. Therefore, this method is especially suited for industrial processes because of its low cost and ease of handling.

As described above, by incorporating an anionic stabilizing agent into a mixture comprising a carbon nanomaterial and a polymeric material disclosed herein, the slurry preparation method disclosed herein has a well-dispersed slurry, favorably enhancing the slurry's stability. The development of water-based slurries without lowering the battery performance such as cyclability and capacity is achieved by the present invention. Batteries comprising electrodes prepared in accordance with the present invention show high cycle stability.

A fully dispersed carbon nanomaterials can decrease the composite volume resistivity of the electrode produced therefrom due to its enhanced electrical conductivity. In some embodiments, the composite volume resistivity of the electrode is from about 0.5 $\Omega \cdot cm$ to about 10 $\Omega \cdot cm$, from about 0.5 $\Omega \cdot cm$ to about 8 $\Omega \cdot cm$, from about 0.5 $\Omega \cdot cm$ to about 6 $\Omega \cdot cm$, from about 0.5 $\Omega \cdot cm$ to about 4 $\Omega \cdot cm$, from about 0.5 $\Omega \cdot cm$ to about 2 $\Omega \cdot cm$, from about 1 $\Omega \cdot cm$ to about 10 $\Omega \cdot cm$, from about 2 $\Omega \cdot cm$ to about 10 $\Omega \cdot cm$, from about 4 $\Omega \cdot cm$ to about 10 $\Omega \cdot cm$, from about 6 $\Omega \cdot cm$ to about 10 $\Omega \cdot cm$, from about 1 $\Omega \cdot cm$ to about 8 $\Omega \cdot cm$, from about 2 $\Omega \cdot cm$ to about 8 $\Omega \cdot cm$, from about 4 $\Omega \cdot cm$ to about 9 $\Omega \cdot cm$ or from about 5 $\Omega \cdot cm$ to about 9 $\Omega \cdot cm$.

In some embodiments, the composite volume resistivity of the electrode is less than 10 $\Omega \cdot cm$, less than 8 $\Omega \cdot cm$, less than 6 $\Omega \cdot cm$, less than 4 $\Omega \cdot cm$ or less than 2 $\Omega \cdot cm$. In some embodiments, the composite volume resistivity of the electrode is more than 0.5 $\Omega \cdot cm$, more than 1 $\Omega \cdot cm$, more than 2 $\Omega \cdot cm$, more than 4 $\Omega \cdot cm$, more than 6 $\Omega \cdot cm$ or more than 8 $\Omega \cdot cm$.

Incidentally, a highly stable conductive composition with carbon nanomaterials that are fully dispersed within can noticeably reduce the interface resistance between the electrode layer and the current collector due to its enhanced electrical conductivity. In some embodiments, the interface resistance between the electrode layer and the current collector is from about 0.01 $\Omega \cdot cm^2$ to about 10 $\Omega \cdot cm^2$, from about 0.01 $\Omega \cdot cm^2$ to about 9 $\Omega \cdot cm^2$, from about 0.01 $\Omega \cdot cm^2$ to about 8 $\Omega \cdot cm^2$, from about 0.01 $\Omega \cdot cm^2$ to about 7 $\Omega \cdot cm^2$, from about 0.01 $\Omega \cdot cm^2$ to about 6 $\Omega \cdot cm^2$, from about 0.01 $\Omega \cdot cm^2$ to about 5 $\Omega \cdot cm^2$, from about 0.01 $\Omega \cdot cm^2$ to about 4 $\Omega \cdot cm^2$, from about 0.01 $\Omega \cdot cm^2$ to about 3 $\Omega \cdot cm^2$, from about 0.01 $\Omega \cdot cm^2$ to about 2 $\Omega \cdot cm^2$, from about 0.01 $\Omega \cdot cm^2$ to about 1 $\Omega \cdot cm^2$, from about 0.01 $\Omega \cdot cm^2$ to about 0.5 $\Omega \cdot cm^2$ or from about 0.01 $\Omega \cdot cm^2$ to about 0.1 $\Omega \cdot cm^2$.

In some embodiments, the interface resistance between the electrode layer and the current collector is less than 10 $\Omega \cdot cm^2$, less than 9 $\Omega \cdot cm^2$, less than 8 $\Omega \cdot cm^2$, less than 7 $\Omega \cdot cm^2$, less than 6 $\Omega \cdot cm^2$, less than 5 $\Omega \cdot cm^2$, less than 4 $\Omega \cdot cm^2$, less than 3 $\Omega \cdot cm^2$, less than 2 $\Omega \cdot cm^2$, less than 1 $\Omega \cdot cm^2$, less than 0.5 $\Omega \cdot cm^2$ or less than 0.1 $\Omega \cdot cm^2$. In some embodiments, the interface resistance between the electrode layer and the current collector is more than 0.01 $\Omega \cdot cm^2$, more than 0.05 $\Omega \cdot cm^2$, more than 0.1 $\Omega \cdot cm^2$, more than 0.5 $\Omega \cdot cm^2$, more than 1 $\Omega \cdot cm^2$, more than 2 $\Omega \cdot cm^2$, more than 3 $\Omega \cdot cm^2$, more than 4 $\Omega \cdot cm^2$, more than 5 $\Omega \cdot cm^2$, more than 6 $\Omega \cdot cm^2$, more than 7 $\Omega \cdot cm^2$, more than 8 $\Omega \cdot cm^2$ or more than 9 $\Omega \cdot cm^2$.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The interface resistance between the electrode layer and the current collector was measured using an electrode resistance measurement system (RM9004, HIOKI).

Example 1

Production of Conductive Composition
A) Preparation of Cathode Polymeric Composition 5.13 g of lithium hydroxide was dissolved in 3.85 g of DI water. Thereafter, 8.98 g of lithium hydroxide solution was added into a 500 mL round-bottom flask containing 289.17 g of distilled water. The solution was stirred at 200 rpm for 30 mins to obtain a first mixture.

Further, 31.54 g of AA was added into the first mixture. The combination of ingredients was further stirred at 200 rpm for 30 mins to obtain a second mixture.

13.52 g of AM was dissolved in 51.67 g of DI water. Thereafter, 65.19 g of AM solution was added into the second mixture. The combination of ingredients was further stirred at 200 rpm for 30 mins to obtain a third mixture.

67.60 g of AN was then added into the third mixture. The fourth mixture was obtained by stirring the combination of ingredients at 200 rpm for 40 mins.

The fourth mixture was heated up to 60° C. and stirred at 60 rpm for 45 mins. 0.23 g of water-soluble radical initiator (ammonium persulfate, APS; obtained from Aladdin Industries Corporation, China) was dissolved in 82.68 g of DI water and 0.04 g of reducing agent (sodium bisulfite; obtained from Tianjin Damao Chemical Reagent Factory, China) was dissolved in 17.22 g of DI water. 17.26 g of sodium bisulfite solution was added into the fourth mixture and the combination of ingredients was stirred for 10 mins. 82.91 g of APS solution was added into the combination of ingredients dropwise for 3 h to form a fifth mixture. The fifth mixture was further stirred at 200 rpm for 20 h at 65° C.

After the complete reaction, the temperature of the fifth mixture was lowered to 40° C. and 5.62 g of lithium hydroxide (dissolved in 116.64 g of DI water) was added into the fifth mixture to adjust pH to 7.44 to form the sixth mixture. The temperature of the sixth mixture was lowered to 30° C. and the polymeric composition was furnished by filtration using 200 μm nylon mesh. The solid content of the polymeric composition was 14.93 wt. %. The adhesive strength between the polymeric material and the current collector was 3.41 N/cm.

B) Preparation of Conductive Composition 0.1 g of carbon nanotube, CNT was dispersed in 5.425 g of deionized water to prepare the first suspension. The aspect ratio of the carbon nanotube is 250, with a length of 2 μm and a diameter of 8 nm. The carbon nanotube has a BET specific surface area of 350 $m^2/g$. After the dispersion, the first suspension was further stirred for about 120 mins at 25° C. at a speed of 2000 rpm.

0.01 g of anionic stabilizing agent (lithium dodecyl sulphate, LiDS) was dispersed in the first suspension to prepare the second suspension. After the dispersion, the second suspension was further stirred for about 10 mins at 25° C. at a speed of 2000 rpm.

5.34 g of polymeric composition was dispersed in the second suspension to prepare the conductive composition. After the dispersion, the conductive composition was further stirred for about 30 mins at 25° C. at a speed of 500 rpm. The components and dispersibility of the conductive composition of Example 1 and the respective proportions of components in the conductive composition are shown in Table 1 below.

Production of Conductive Composition of Example 2

Conductive composition was produced in the same manner as in Example 1, except that in the preparation of the conductive composition, 0.01 g of LiDS was replaced with sodium dodecyl benzene sulfonate (SDBS) of the same weight in the preparation of the second suspension.

Production of Conductive Composition of Example 3

Conductive composition was produced in the same manner as in Example 1, except that in the preparation of the conductive composition, 0.01 g of LiDS was replaced with sodium dodecyl sulphate (SDS) of the same weight in the preparation of the second suspension.

Production of Conductive Composition of Example 4

Conductive composition was produced in the same manner as in Example 1, except that in the preparation of the conductive composition, 5.415 g of deionized water was added in the preparation of the first suspension and 0.02 g of LiDS was added in the preparation of the second suspension.

Production of Conductive Composition of Example 5

Conductive composition was produced in the same manner as in Example 1, except that in the preparation of the conductive composition, 5.395 g of deionized water was added in the preparation of the first suspension and 0.04 g of LiDS was added in the preparation of the second suspension.

Production of Conductive Composition of Example 6

Conductive composition was produced in the same manner as in Example 1, except that in the preparation of the conductive composition, 5.429 g of deionized water was added in the preparation of the first suspension and 0.006 g of LiDS was added in the preparation of the second suspension.

Production of Conductive Composition of Example 7

Conductive composition was produced in the same manner as in Example 1, except that in the preparation of the polymeric composition, 24.64 g of AA was added in the preparation of the second mixture, 14.86 g of AM was added in the preparation of the third mixture and 71.58 g of AN was added in the preparation of the fourth mixture.

Production of Conductive Composition of Example 8

Conductive composition was produced in the same manner as in Example 1, except that in the preparation of the polymeric composition, 23.28 g of AA was added in the preparation of the second mixture, 44.57 g of AM was added in the preparation of the third mixture and 50.41 g of AN was added in the preparation of the fourth mixture.

Production of Conductive Composition of Example 9

Conductive composition was produced in the same manner as in Example 1, except that in the preparation of the polymeric composition, 67.77 g of AA was added in the preparation of the second mixture, 35.79 g of AM was added in the preparation of the third mixture, 24.20 g of AN was added in the preparation of the fourth mixture and 17.50 g of lithium hydroxide (dissolved in 116.64 g of DI water) was added in the preparation of the sixth mixture.

Production of Conductive Composition of Example 10

Conductive composition was produced in the same manner as in Example 1, except that in the preparation of the polymeric composition, 98.58 g of AA was added in the preparation of the second mixture, 16.21 g of AM was added in the preparation of the third mixture, 16.13 g of AN was added in the preparation of the fourth mixture and 27.60 g of lithium hydroxide (dissolved in 116.64 g of DI water) was added in the preparation of the sixth mixture.

Production of Conductive Composition of Example 11

Conductive composition was produced in the same manner as in Example 1, except that in the preparation of the polymeric composition, 68.46 g of AA was added in the preparation of the second mixture, 44.57 g of AM was added in the preparation of the third mixture, 17.14 g of AN was added in the preparation of the fourth mixture and 17.80 g of lithium hydroxide (dissolved in 116.64 g of DI water) was added in the preparation of the sixth mixture.

Production of Conductive Composition of Example 12

Conductive composition was produced in the same manner as in Example 1, except that in the preparation of the polymeric composition, 54.77 g of AA was added in the preparation of the second mixture, 16.21 g of AM was added in the preparation of the third mixture, 48.39 g of AN was added in the preparation of the fourth mixture and 13.20 g of lithium hydroxide (dissolved in 116.64 g of DI water) was added in the preparation of the sixth mixture.

Production of Conductive Composition of Comparative Example 1

Conductive composition was produced in the same manner as in Example 1, except that in the preparation of the conductive composition, 5.435 g of deionized water was added in the preparation of the first suspension and LiDS was not added in the preparation of the second suspension.

Production of Conductive Composition of Comparative Example 2

Conductive composition was produced in the same manner as in Example 9, except that in the preparation of the conductive composition, 5.435 g of deionized water was added in the preparation of the first suspension and LiDS was not added in the preparation of the second suspension.

Production of Conductive Composition of Comparative Example 3

Conductive composition was produced in the same manner as in Example 1, except that in the preparation of the conductive composition, 5.43 g of deionized water was added in the preparation of the first suspension and 0.005 g of LiDS was added in the preparation of the second suspension.

Production of Conductive Composition of Comparative Example 4

Conductive composition was produced in the same manner as in Example 1, except that in the preparation of the conductive composition, 5.385 g of deionized water was added in the preparation of the first suspension and 0.05 g of LiDS was added in the preparation of the second suspension.

Production of Conductive Composition of Comparative Example 5

Conductive composition was produced in the same manner as in Example 1, except that in the preparation of the polymeric composition, 109.53 g of AA was added in the preparation of the second mixture, AM was not added in the preparation of the third mixture, 20.16 g of AN was added in the preparation of the fourth mixture and 31.50 g of lithium hydroxide (dissolved in 116.64 g of DI water) was added in the preparation of the sixth mixture; and in the preparation of the conductive composition, 5.435 g of deionized water was added in the preparation of the first suspension and LiDS was not added in the preparation of the second suspension.

Production of Conductive Composition of Comparative Example 6

Conductive composition was produced in the same manner as in Example 1, except that in the preparation of the polymeric composition, 103.03 g of AA was added in the preparation of the second mixture, 32.75 g of AM was added in the preparation of the third mixture, AN was not added in the preparation of the fourth mixture and 29.40 g of lithium hydroxide (dissolved in 116.64 g of DI water) was added in the preparation of the sixth mixture; and in the preparation of the conductive composition, 5.435 g of deionized water was added in the preparation of the first suspension and LiDS was not added in the preparation of the second suspension.

Production of Conductive Composition of Comparative Example 7

Conductive composition was produced in the same manner as in Example 1, except that in the preparation of the conductive composition, 0.01 g of LiDS was replaced with Triton X-100 (obtained from Sigma-Aldrich, United States) of the same weight in the preparation of the second suspension.

Production of Conductive Composition of Comparative Example 8

Conductive composition was produced in the same manner as in Example 1, except that in the preparation of the conductive composition, 0.01 g of LiDS was replaced with C TAB (Cetyltrimethylammonium bromide; obtained from Sigma-Aldrich, United States) of the same weight in the preparation of the second suspension.

Production of Conductive Composition of Comparative Example 9

Conductive composition was produced in the same manner as in Example 1, except that in the preparation of the conductive composition, 0.01 g of LiDS was replaced with NP-40 Surfact-Amps (obtained from Thermo Fisher Scientific, Massachusetts, United States) of the same weight in the preparation of the second suspension.

Production of Conductive Composition of Comparative Example 10

Conductive composition was produced in the same manner as in Example 1, except that polyacrylic acid (PAA) was used as the polymeric composition; and in the preparation of the conductive composition, 5.435 g of deionized water was added in the preparation of the first suspension and LiDS was not added in the preparation of the second suspension.

Production of Conductive Composition of Comparative Example 11

Conductive composition was produced in the same manner as in Example 1, except that polyacrylamide (PAM) was used as the polymeric composition; and in the preparation of the conductive composition, 5.435 g of deionized water was added in the preparation of the first suspension and LiDS was not added in the preparation of the second suspension.

Production of Conductive Composition of Comparative Example 12

Conductive composition was produced in the same manner as in Example 1, except that sodium alginate was used as the polymeric composition; and in the preparation of the conductive composition, 5.435 g of deionized water was added in the preparation of the first suspension and LiDS was not added in the preparation of the second suspension.

Production of Conductive Composition of Comparative Example 13

Conductive composition was produced in the same manner as in Example 1, except that poly(methyl acrylate) was used as the polymeric composition; and in the preparation of the conductive composition, 5.435 g of deionized water was added in the preparation of the first suspension and LiDS was not added in the preparation of the second suspension.

Production of Conductive Composition of Comparative Example 14

Conductive composition was produced in the same manner as in Example 1, except that in the preparation of the conductive composition, 0.01 g of LiDS was replaced with polyvinylpyrrolidone (PVP) of the same weight in the preparation of the second suspension.

Production of Conductive Composition of Comparative Example 15

Conductive composition was produced in the same manner as in Example 1, except that in the preparation of the conductive composition, 5.34 g of polymeric composition was dispersed in the first suspension to prepare the second suspension which was stirred for about 30 mins at 25° C. at a speed of 500 rpm; and 0.01 g of LiDS was dispersed in the second suspension to prepare the conductive composition which was stirred for about 10 mins at 25° C. at a speed of 2000 rpm.

Production of Conductive Composition of Comparative Example 16

Conductive composition was produced in the same manner as in Example 1, except that in the preparation of the conductive composition, 5.34 g of polymeric composition was dispersed in 5.425 g of deionized water to prepare the first suspension which was stirred for about 30 mins at 25° C. at a speed of 500 rpm; 0.01 g of LiDS was dispersed in the first suspension to prepare the second suspension which was stirred for about 10 mins at 25° C. at a speed of 2000 rpm; and 0.1 g of CNT was dispersed in second suspension to prepare the conductive composition which was stirred for about 120 mins at 25° C. at a speed of 2000 rpm.

Example 13

A) Production of Conductive Composition

Conductive composition was produced in the same manner as in Example 1.

B) Preparation of Positive Electrode

A third suspension was prepared by dispersing 1.10 g of conductive agent (Super P; obtained from TIMCAL. Ltd) and 13.56 g of deionized water in the conductive composition prepared in Example 1 while stirring with an overhead stirrer (R20, IKA). After the dispersion, the third suspension was further stirred for about 10 mins at 25° C. at a speed of 1200 rpm.

Thereafter, a fourth suspension was obtained by dispersing 18.00 g of cathode active material (NMC811; obtained from Hubei Ronbay Lithium Material Co. Ltd) in third suspension at 25° C. while stirring with an overhead stirrer for about 1.5 hours at a speed of 2000 rpm. Then, the fourth suspension was degassed under a pressure of about 15 kPa for 1 hour. The suspension was further stirred for about 20 mins at 25° C. at a speed of 15 rpm to form a homogenized cathode slurry. The components of the cathode slurry of Example 13 and their respective proportions are shown in Table 2 below.

The homogenized cathode slurry was coated onto one side of a carbon-coated aluminum foil having a thickness of 16 μm as a current collector using a doctor blade coater with a gap width of about 150 mm. The thickness of the slurry coating and carbon coating were 50 μm and 2 μm respectively. The cathode film on the carbon-coated aluminum foil was dried at about 85° C. for 120 mins by a hot air dryer (DHG 10H, Huyue Equipment Co., Ltd., China) to obtain a cathode electrode layer. The electrode was then pressed to decrease the thickness of the cathode electrode layer to 24 μm and the surface density was 5.0 mg/cm$^2$.

C) Assembly of Coin Cell

The electrochemical performance of the cathode prepared above was tested in CR2032 coin-type Li cells assembled in an argon-filled glove box. The coated cathode sheet was cut into disc-form positive electrodes for coin-type cell assembly. A lithium metal foil having a thickness of 500 μm was used as a counter electrode. The cathode and counter electrode plates were kept apart by separators. The separator was a ceramic coated microporous membrane made of nonwoven fabric (MPM, Japan), which had a thickness of about 25 µm. The electrode assembly was then dried in a box-type resistance oven under vacuum (DZF-6020, obtained from Shenzhen Kejing Star Technology Co. Ltd., China) at 105° C. for about 16 hours.

An electrolyte was then injected into the case holding the packed electrodes under a high-purity argon atmosphere with a moisture and oxygen content of less than 3 ppm respectively. The electrolyte was a solution of $LiPF_6$ (1 M) in a mixture of ethylene carbonate (EC), ethyl methyl carbonate (EMC) and dimethyl carbonate (DMC) at a volume ratio of 1:1:1. After electrolyte filling, the coin cell was vacuum sealed and then mechanically pressed using a punch tooling with a standard circular shape.

D) Electrochemical Measurements

The coin cells were analyzed in a constant current mode using a multi-channel battery tester (BTS-4008-5V10 mA, obtained from Neware Electronics Co. Ltd, China). After 1 cycle at C/20 was completed, they were charged and discharged at a rate of C/2. The charging/discharging cycling tests of the cells were performed between 3.0 and 4.3 V at a current density of C/2 at 25° C. to obtain the discharge capacity. The electrochemical performance of the coin cell of Example 13 was measured and is shown in Table 2 below.

Production of Conductive Composition of Example 14

Conductive composition was produced in the same manner as in Example 4.

Production of Conductive Composition of Example 15

Conductive composition was produced in the same manner as in Example 5.

Production of Conductive Composition of Example 16

Conductive composition was produced in the same manner as in Example 6.

Production of Conductive Composition of Example 17

Conductive composition was produced in the same manner as in Example 2.

Production of Conductive Composition of Example 18

Conductive composition was produced in the same manner as in Example 3.

Production of Conductive Composition of Example 19

Conductive composition was produced in the same manner as in Example 1.

Production of Conductive Composition of Example 20

Conductive composition was produced in the same manner as in Example 9.

Production of Conductive Composition of Example 21

Conductive composition was produced in the same manner as in Example 8.

Production of Conductive Composition of Example 22

Conductive composition was produced in the same manner as in Example 10.

Production of Conductive Composition of Example 23

Conductive composition was produced in the same manner as in Example 12.

Production of Conductive Composition of Comparative Example 17

Conductive composition was produced in the same manner as in Comparative Example 3.

Production of Conductive Composition of Comparative Example 18

Conductive composition was produced in the same manner as in Comparative Example 4.

Production of Conductive Composition of Comparative Example 19

Conductive composition was produced in the same manner as in Example 1, except that CNT was not added and 5.435 g of deionized water was added in the preparation of the first suspension and LiDS was not added in the preparation of the second suspension.

Production of Conductive Composition of Comparative Example 20

Conductive composition was produced in the same manner as in Example 9, except that CNT was not added and 5.435 g of deionized water was added in the preparation of the first suspension and LiDS was not added in the preparation of the second suspension.

Production of Conductive Composition of Comparative Example 21

Conductive composition was produced in the same manner as in Comparative Example 5, except that in the preparation of the conductive composition, 5.425 g of deionized water was added in the preparation of the first suspension and 0.01 g of LiDS was added in the preparation of the second suspension.

Production of Conductive Composition of Comparative Example 22

Conductive composition was produced in the same manner as in Example 1, except that in the preparation of the polymeric composition, AA was not added in the preparation of the second mixture, 101.63 g of AM was added in the preparation of the third mixture and 25.96 g of AN was added in the preparation of the fourth mixture.

Production of Conductive Composition of Comparative Example 23

Conductive composition was produced in the same manner as in Comparative Example 6, except that in the preparation of the conductive composition, 5.425 g of deionized water was added in the preparation of the first suspension and 0.01 g of LiDS was added in the preparation of the second suspension.

Production of Conductive Composition of Comparative Example 24

Conductive composition was produced in the same manner as in Example 1, except that polyacrylic acid (PAA) was used as the polymeric composition.

Preparation of Positive Electrodes of Examples 14-18 and 20-23 and Comparative Examples 17-18 and 21-24

The positive electrodes were prepared in the same manner as in Example 13.

Preparation of Positive Electrode of Example 19

The positive electrode of Example 19 was prepared in the same manner as in Example 13, except that 18.00 g of NMC811 was replaced with LCO of the same weight in the preparation of the fourth suspension.

Preparation of Positive Electrodes of Comparative Examples 19-20

The positive electrodes were prepared in the same manner as in Example 13, except that 1.20 g of Super P was added in the conductive composition in the preparation of the third suspension.

Assembling of Coin Cells of Examples 14-23 and Comparative Examples 17-24

The coin cells were assembled in the same manner as in Example 13.

Electrochemical Measurements of Examples 14-23 and Comparative Examples 17-24

The electrochemical performance of the coin cells were measured in the same manner as in Example 13.

TABLE 1

| | Conductive composition | | | | | | | |
|---|---|---|---|---|---|---|---|---|
| | Polymeric material | | | | Stabilizing agent | | Carbon nanomaterial | |
| | Proportion of structural unit in the copolymer (mol %) | | | | | | | |
| | Derived from polar group-containing monomer (a) | Derived from polar group-containing monomer (b) | Derived from acid group-containing monomer | Proportion in solid of conductive composition (wt %) | Type | Proportion in solid of conductive composition (wt %) | Proportion in solid of conductive composition (wt %) | Dispersion property |
| Example 1 | 66.99 | 10.00 | 23.01 | 87.88 | LiDS | 1.10 | 11.02 | Well-dispersed |
| Example 2 | 66.99 | 10.00 | 23.01 | 87.88 | SDBS | 1.10 | 11.02 | Well-dispersed |
| Example 3 | 66.99 | 10.00 | 23.01 | 87.88 | SDS | 1.10 | 11.02 | Well-dispersed |
| Example 4 | 66.99 | 10.00 | 23.01 | 86.92 | LiDS | 2.18 | 10.90 | Well-dispersed |
| Example 5 | 66.99 | 10.00 | 23.01 | 85.06 | LiDS | 4.27 | 10.67 | Well-dispersed |
| Example 6 | 66.99 | 10.00 | 23.01 | 88.26 | LiDS | 0.66 | 11.07 | Well-dispersed |
| Example 7 | 71.00 | 11.00 | 18.00 | 87.88 | LiDS | 1.10 | 11.02 | Well-dispersed |
| Example 8 | 50.00 | 33.00 | 17.00 | 87.88 | LiDS | 1.10 | 11.02 | Well-dispersed |
| Example 9 | 24.00 | 26.50 | 49.50 | 87.88 | LiDS | 1.10 | 11.02 | Well-dispersed |
| Example 10 | 16.00 | 12.00 | 72.00 | 87.88 | LiDS | 1.10 | 11.02 | Well-dispersed |
| Example 11 | 17.00 | 33.00 | 50.00 | 87.88 | LiDS | 1.10 | 11.02 | Well-dispersed |
| Example 12 | 48.00 | 12.00 | 40.00 | 87.88 | LiDS | 1.10 | 11.02 | Well-dispersed |
| Comparative Example 1 | 66.99 | 10.00 | 23.01 | 88.85 | — | 0.00 | 11.15 | Agglomeration |
| Comparative Example 2 | 24.00 | 26.50 | 49.50 | 88.85 | — | 0.00 | 11.15 | Agglomeration |
| Comparative Example 3 | 66.99 | 10.00 | 23.01 | 88.36 | LiDS | 0.55 | 11.08 | Agglomeration |
| Comparative Example 4 | 66.99 | 10.00 | 23.01 | 84.16 | LiDS | 5.28 | 10.56 | Foaming |
| Comparative Example 5 | 20.00 | 0.00 | 80.00 | 88.85 | — | 0.00 | 11.15 | Well-dispersed |
| Comparative Example 6 | 0.00 | 24.37 | 75.63 | 88.85 | — | 0.00 | 11.15 | Well-dispersed |
| Comparative Example 7 | 66.99 | 10.00 | 23.01 | 87.88 | Triton X-100 | 1.10 | 11.02 | Agglomeration |
| Comparative Example 8 | 66.99 | 10.00 | 23.01 | 87.88 | CTAB | 1.10 | 11.02 | Agglomeration |
| Comparative Example 9 | 66.99 | 10.00 | 23.01 | 87.88 | NP-40 | 1.10 | 11.02 | Agglomeration |
| Comparative Example 10 | 0.00 | 0.00 | 100.00 | 88.85 | — | 0.00 | 11.15 | Well-dispersed |
| Comparative Example 11 | 0.00 | 100.00 | 0.00 | 88.85 | — | 0.00 | 11.15 | Well-dispersed |

TABLE 1-continued

| | Conductive composition | | | | | | | |
|---|---|---|---|---|---|---|---|---|
| | Polymeric material | | | | Stabilizing agent | | Carbon nanomaterial | |
| | Proportion of structural unit in the copolymer (mol %) | | | | | | | |
| | Derived from polar group-containing monomer (a) | Derived from polar group-containing monomer (b) | Derived from acid group-containing monomer | Proportion in solid of conductive composition (wt %) | Type | Proportion in solid of conductive composition (wt %) | Proportion in solid of conductive composition (wt %) | Dispersion property |
| Comparative Example 12 | | Sodium alginate | | 88.85 | — | 0.00 | 11.15 | Well-dispersed |
| Comparative Example 13 | 100.00 | 0.00 | 0.00 | 88.85 | — | 0.00 | 11.15 | Well-dispersed |
| Comparative Example 14 | 66.99 | 10.00 | 23.01 | 87.88 | PVP | 1.10 | 11.02 | Agglomeration |
| Comparative Example 15 | 66.99 | 10.00 | 23.01 | 87.88 | LiDS | 1.10 | 11.02 | Agglomeration |
| Comparative Example 16 | 66.99 | 10.00 | 23.01 | 87.88 | LiDS | 1.10 | 11.02 | Agglomeration |

TABLE 2

| | | Conductive composition | | | | | | | | | | |
|---|---|---|---|---|---|---|---|---|---|---|---|---|
| | | Polymeric material | | | | Carbon nanomaterial | Stabilizing agent | | | Interface resistance ($\Omega \cdot cm^2$) | 0.5C Initial discharging capacity (mAh/g) | Capacity retention after 50 cycles (%) |
| | | Proportion of structural unit in the copolymer (mol %) | | | | | | | | | | |
| | Cathode active material | Derived from polar group-containing monomer (a) | Derived from polar group-containing monomer (b) | Derived from acid group-containing monomer | Proportion in slurry (wt %) | Proportion in slurry (wt %) | Type | Proportion in slurry (wt %) | Dispersion property | | | |
| Example 13 | NMC811 | 66.99 | 10.00 | 23.01 | 1.83 | 0.23 | LiDS | 0.023 | Well-dispersed | 0.070 | 182.7 | 95.3 |
| Example 14 | NMC811 | 66.99 | 10.00 | 23.01 | 1.83 | 0.23 | LiDS | 0.046 | Well-dispersed | 0.073 | 179.4 | 93.7 |
| Example 15 | NMC811 | 66.99 | 10.00 | 23.01 | 1.83 | 0.23 | LiDS | 0.092 | Well-dispersed | 0.075 | 179.5 | 92.4 |
| Example 16 | NMC811 | 66.99 | 10.00 | 23.01 | 1.83 | 0.23 | LiDS | 0.014 | Well-dispersed | 0.098 | 178.7 | 89.1 |
| Example 17 | NMC811 | 66.99 | 10.00 | 23.01 | 1.83 | 0.23 | SDBS | 0.023 | Well-dispersed | 0.084 | 181.6 | 94.6 |
| Example 18 | NMC811 | 66.99 | 10.00 | 23.01 | 1.83 | 0.23 | SDS | 0.023 | Well-dispersed | 0.074 | 182.9 | 94.4 |
| Example 19 | LCO | 66.99 | 10.00 | 23.01 | 1.83 | 0.23 | LiDS | 0.023 | Well-dispersed | 0.057 | 183.2 | 92.1 |
| Example 20 | NMC811 | 24.00 | 26.50 | 49.50 | 1.83 | 0.23 | LiDS | 0.023 | Well-dispersed | 0.092 | 181.3 | 94.3 |
| Example 21 | NMC811 | 50.00 | 33.00 | 17.00 | 1.83 | 0.23 | LiDS | 0.023 | Well-dispersed | 0.081 | 182.4 | 93.1 |
| Example 22 | NMC811 | 16.00 | 12.00 | 72.00 | 1.83 | 0.23 | LiDS | 0.023 | Well-dispersed | 0.077 | 180.7 | 92.3 |
| Example 23 | NMC811 | 48.00 | 12.00 | 40.00 | 1.83 | 0.23 | LiDS | 0.023 | Well-dispersed | 0.072 | 184.6 | 94.8 |
| Comparative Example 17 | NMC811 | 66.99 | 10.00 | 23.01 | 1.83 | 0.23 | LiDS | 0.0115 | Agglomeration | — | — | — |
| Comparative Example 18 | NMC811 | 66.99 | 10.00 | 23.01 | 1.83 | 0.23 | LiDS | 0.115 | Foaming | — | — | — |
| Comparative Example 19 | NMC811 | 66.99 | 10.00 | 23.01 | 1.83 | — | — | — | Well-dispersed | 0.0185 | 172.4 | 76.8 |

TABLE 2-continued

| | | Conductive composition | | | | | | | | | |
|---|---|---|---|---|---|---|---|---|---|---|---|
| | | Polymeric material | | | | | | | | 0.5C | |
| | | Proportion of structural unit in the copolymer (mol %) | | | | Carbon | Stabilizing agent | | Inter-face resist-ance ($\Omega \cdot cm^2$) | Initial dis-charging capacity (mAh/g) | Capacity retention after 50 cycles (%) |
| | Cathode active material | Derived from polar group-containing monomer (a) | Derived from polar group-containing monomer (b) | Derived from acid group-containing monomer | Pro-portion in slurry (wt %) | nano-material Proportion in slurry (wt %) | Type | Proportion in slurry (wt %) | Dispersion property | | |
| Comparative Example 20 | NMC811 | 24.00 | 26.50 | 49.50 | 1.83 | — | — | — | Well-dispersed | 0.297 | 164.6 | 74.1 |
| Comparative Example 21 | NMC811 | 20.00 | 0.00 | 80.00 | 1.83 | 0.23 | LiDS | 0.023 | Well-dispersed | 0.129 | 170.1 | 71.8 |
| Comparative Example 22 | NMC811 | 25.49 | 74.51 | 0.00 | 1.83 | 0.23 | LiDS | 0.023 | Well-dispersed | 0.142 | 168.1 | 73.2 |
| Comparative Example 23 | NMC811 | 0.00 | 24.37 | 75.63 | 1.83 | 0.23 | LiDS | 0.023 | Well-dispersed | 0.136 | 169.1 | 72.3 |
| Comparative Example 24 | NMC811 | 0.00 | 0.00 | 100.00 | 1.83 | 0.23 | LiDS | 0.023 | Well-dispersed | 0.123 | 170.3 | 70.8 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A conductive composition for a secondary battery, comprising a polymeric material, a carbon nanomaterial and an anionic stabilizing agent; wherein the polymeric material comprises a copolymer comprising a structural unit derived from an acid group-containing monomer and a structural unit derived from a polar group-containing monomer; wherein the weight ratio of the polar group-containing monomer that assists in the construction of the polymeric material to the carbon nanomaterial is from about 0.1 to about 20; and wherein the weight ratio of the acid group-containing monomer that assists in the construction of the polymeric material to the anionic stabilizing agent is from about 4.5 to about 65.

2. The conductive composition of claim 1, wherein the polar group-containing monomer is selected from the group consisting of a nitrile group-containing monomer, an amide group-containing monomer, a hydroxyl group-containing monomer, an ester group-containing monomer, an epoxy group-containing monomer, a fluorine-containing monomer, an amine group-containing monomer, an ether group-containing monomer, a carbonyl group-containing monomer and combinations thereof; and wherein the acid group-containing monomer is selected from the group consisting of a carboxylic acid group-containing monomer, a sulfonic acid group-containing monomer, a phosphonic acid group-containing monomer, a phosphoric acid group-containing monomer, a nitric acid group-containing monomer, a sulphuric acid group-containing monomer and combinations thereof.

3. The conductive composition of claim 1, wherein the proportion of structural unit derived from an acid group-containing monomer is from about 15% to about 85% by mole, based on the total number of moles of monomeric units in the copolymer in the polymeric material.

4. The conductive composition of claim 1, wherein the proportion of structural unit derived from a polar group-containing monomer is from about 15% to about 85% by mole, based on the total number of moles of monomeric units in the copolymer in the polymeric material.

5. The conductive composition of claim 1, wherein the amount of polymeric material in the conductive composition is from about 40% to about 99.9% by weight, based on the total weight of solids in the conductive composition; wherein the carbon nanomaterial is selected from the group consisting of carbon nanotube, graphene, carbon nanofiber and combinations thereof; and wherein the amount of carbon nanomaterial in the conductive composition is from about 0.1% to about 45% by weight, based on the total weight of solids in the conductive composition.

6. The conductive composition of claim 5, wherein the carbon nanotube is selected from the group consisting of multi-walled carbon nanotube, few-walled carbon nanotube, double-walled carbon nanotube, single-walled carbon nanotube and combinations thereof; and wherein the aspect ratio (ratio of length to diameter) of the carbon nanotube is from about 1×10 to about 1×10$^4$.

7. The conductive composition of claim 1, wherein the anionic stabilizing agent is selected from the group consisting of alkyl sulfate, alkyl sulfonate, alkyl carboxylate, alkyl phosphate, alkyl phosphonate, alkyl aromatic sulfate, alkyl aromatic sulfonate, alkyl aromatic carboxylate, alkyl aromatic phosphate, alkyl aromatic phosphonate, alkyl alkoxy sulfate, alkyl alkoxy sulfonate, alkyl alkoxy carboxylate, alkyl alkoxy phosphate, alkyl alkoxy phosphonate, alkyl ester sulfate, alkyl ester sulfonate, alkyl ester carboxylate, alkyl ester phosphate, alkyl ester phosphonate and combinations thereof.

8. The conductive composition of claim 1, wherein the anionic stabilizing agent is selected from the group consisting of metal dodecyl sulfate, metal dodecyl sulfonate, metal dodecyl carboxylate, metal dodecyl phosphate, metal dodecyl phosphonate, metal dodecyl ether sulfate, metal dodecyl ether sulfonate, metal dodecyl ether carboxylate, metal dodecyl ether phosphate, metal dodecyl ether phosphonate, metal dodecyl benzene sulfate, metal dodecyl benzene sulfonate, metal dodecyl benzene carboxylate, metal dodecyl benzene phosphate, metal dodecyl benzene phosphonate, metal stearate, olefin sulfonate, alpha olefin sulfonate and combinations thereof.

9. The conductive composition of claim 1, wherein the anionic stabilizing agent is selected from the group consisting of sodium dodecyl sulphate, lithium dodecyl sulphate, sodium lauryl ether sulfate, lithium dodecyl benzene sulfonate, sodium dodecyl benzene sulfonate, paraffin sulfonate, ammonium or other alkali or alkaline-earth metal sarcosinate, ammonium or other alkali or alkaline-earth metal sulfosuccinate, ammonium or other alkali or alkaline-earth metal isethionate, ammonium or other alkali or alkaline-earth metal taurate, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric acid monoglyceride sodium sulfate, sodium lauryl sulfate, sodium laureth sulfate, potassium lauryl sulfate, potassium laureth sulfate, sodium lauryl phosphate, sodium tridecyl phosphate, sodium behenyl phosphate, sodium laureth-2 phosphate, sodium dilauryl phosphate, sodium ditridecyl phosphate, sodium lauroyl sarcosinate, lauroyl sarcosine, cocoyl sarcosine, ammonium cosyl sulfate, sodium cosyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium lauryl sulfate, potassium cosyl sulfate, potassium lauryl sulfate, monoethanolamine cosyl sulfate, sodium tridecylbenzenesulfonate, ether sulfonate, lithium stearate, sodium stearate and combinations thereof; and wherein the amount of the anionic stabilizing agent in the conductive composition is from about 0.6% to about 7% by weight, based on the total weight of solids in the conductive composition.

10. The conductive composition of claim 1, wherein the weight ratio of the anionic stabilizing agent to the carbon nanomaterial is from about 0.1% to about 45%; and wherein the weight ratio of the polymeric material to the anionic stabilizing agent is from about 11 to about 155.

11. The conductive composition of claim 1, wherein the weight ratio of the polymeric material to carbon nanomaterial is from about 0.5 to about 30; and wherein the conductive composition further comprises an aqueous solvent.

12. The conductive composition of claim 11, wherein the aqueous solvent is water or a solution containing a major component and a minor component, and wherein the major component is water.

13. The conductive composition of claim 12, wherein the proportion of water in the aqueous solvent is from about 51% to about 100% by weight; and wherein the minor component is selected from the group consisting of methanol, ethanol, isopropanol, n-propanol, tert-butanol, n-butanol, acetone, dimethyl ketone, methyl ethyl ketone, ethyl acetate, isopropyl acetate, propyl acetate, butyl acetate and combinations thereof.

14. A slurry for a secondary battery, comprising an electrode active material and a conductive composition as claimed in claim 1.

15. The slurry of claim 14, wherein the slurry further comprises a conductive agent.

16. The slurry of claim 15, wherein the weight ratio of the carbon nanomaterial to the conductive agent is from about 1% to about 35%.

17. An electrode for a secondary battery, comprising an electrode active material and a conductive composition as claimed in claim 1.

18. The electrode of claim 17, wherein the electrode active material is a cathode active material selected from the group consisting of $LiCoO_2$, $LiNiO_2$, $LiNi_xMn_yO_2$, $LiCo_xNi_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, $Li_{1+a}Ni_bMn_cCo_dAl_{(1-b-c-d)}O_2$, $LiM^1PO_4$, $LiNi_eMn_fO_4$, $gLi_2MnO_3 \cdot (1-g)LiM^2O_2$, $Li_3V_2(PO_4)_3$, $LiVPO_4F$, $Li_2M_3SiO_4$, and combinations thereof; wherein each x is independently from 0.1 to 0.9; each y is independently from 0 to 0.9; each z is independently from 0 to 0.4; $-0.2 \leq a \leq 0.2$, $0 \leq b < 1$, $0 \leq c < 1$, $0 \leq d < 1$, and $b+c+d \leq 1$; $M^1$ is selected from the group consisting of Fe, Co, Ni, Mn, Al, Mg, Zn, Ti, La, Ce, Sn, Zr, Ru, Si, Ge and combinations thereof; $0.1 \leq e \leq 0.9$; $0 \leq f \leq 2$; $0 < g < 1$; $M^2$ is selected from the group consisting of Ni, Co, Mn and combinations thereof, and; $M^3$ is selected from the group consisting of Fe, Co, Mn, Ni, and combinations thereof.

19. A method of preparing a conductive composition for a secondary battery of claim 1, comprising the steps of:
  1) dispersing a carbon nanomaterial in an aqueous solvent to form a first suspension;
  2) dispersing an anionic stabilizing agent in the first suspension to form a second suspension;
  3) dispersing a polymeric material in the second suspension to form a conductive composition,
wherein the polymeric material comprises a copolymer comprising a structural unit derived from an acid group-containing monomer and a structural unit derived from a polar group-containing monomer.

20. The conductive composition of claim 1, wherein the secondary battery is a lithium-ion battery.

* * * * *